(12) United States Patent
Thevamaran et al.

(10) Patent No.: US 12,692,161 B2
(45) Date of Patent: Jul. 28, 2026

(54) ARCHITECTED CARBON NANOTUBE FOAMS AND METHODS OF MAKING SAME

(71) Applicant: Wisconsin Alumni Research Foundation, Madison, WI (US)

(72) Inventors: Ramathasan Thevamaran, Madison, WI (US); Abhishek Gupta, Madison, WI (US); Komal Chawla, Madison, WI (US); Bhanugoban Maheswaran, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 458 days.

(21) Appl. No.: 18/448,297

(22) Filed: Aug. 11, 2023

(65) Prior Publication Data
US 2024/0109778 A1    Apr. 4, 2024

Related U.S. Application Data

(60) Provisional application No. 63/402,719, filed on Aug. 31, 2022.

(51) Int. Cl.
*C01B 32/158* (2017.01)

(52) U.S. Cl.
CPC ........ *C01B 32/158* (2017.08); *C01B 2202/08* (2013.01); *C01B 2202/26* (2013.01)

(58) Field of Classification Search
CPC .............. C01B 32/158; C01B 2202/08; C01B 2202/26; C01B 32/159; C01B 32/16; C01B 32/162; C01B 32/164; C01B 32/166; C01B 32/168; C01B 32/17; C01B 32/172; C01B 32/174; C01B 32/176;

C01B 32/178; C01B 2202/00; C01B 2202/02; C01B 2202/04; C01B 2202/06; C01B 2202/10; C01B 2202/20; C01B 2202/22; C01B 2202/24;

(Continued)

(56) References Cited

PUBLICATIONS

Chawla, et al., Superior mechanical properties by exploiting size-effects and multiscale interactions in hierarchically architected forms, Extreme Mechanics Letters 2022; 57: 101899, pp. 1-9 (published online Oct. 7, 2022) (Year: 2022).*

(Continued)

*Primary Examiner* — Daniel C. Mccracken
(74) *Attorney, Agent, or Firm* — Bell & Manning, LLC

(57) ABSTRACT

Carbon nanotube foams are provided which comprise tubes substantially aligned longitudinally in a first direction, wherein: each tube defines an outer wall and an inner wall, and each tube comprises an entangled bundle of carbon nanotubes substantially aligned longitudinally in the first direction; and tubes in at least a subset of the tubes are positioned with respect to each other to form one or more first hexagonal units, wherein each first hexagonal unit comprises first-hexagonal-unit tubes, wherein the first-hexagonal-unit tubes comprise six peripheral first-hexagonal-unit tubes and a central first-hexagonal-unit tube, wherein the six peripheral first-hexagonal-unit tubes surround the central first-hexagonal-unit tube in a juxtaposed, hexagonal configuration. Articles of manufacture, e.g., helmets, comprising the foams are also provided which are configured to cover at least a portion of an object, e.g., a human head, and to attenuate an external force acting on the object, including external forces originating from oblique impacts.

18 Claims, 49 Drawing Sheets

Juxtaposed, hexagonal configuration k = 0

Partially immediately nested configuration, also a first bounded unit

Common unit

(58) Field of Classification Search
CPC ............ C01B 2202/28; C01B 2202/30; C01B
2202/32; C01B 2202/34; C01B 2202/36;
D01F 9/12; D01F 9/127; D01F 9/1271;
D01F 9/1272; D01F 9/1273; D01F
9/1274; D01F 9/1275; D01F 9/1276;
D01F 9/1277; D01F 9/1278; D01F 9/133
See application file for complete search history.

(56) References Cited

PUBLICATIONS

Gong, et al., Fabrication of multi-level carbon nanotube arrays with adjustable patterns, Nanoscale 2012; 4: 278-283 (Year: 2012).*

Lattanzi, et al., Geometry-Induced Mechanical Properties of Carbon Nanotube Foams, Advanced Engineering Materials 2014; 16(8): 1026-1031 (Year: 2014).*

Lattanzi, et al., Dynamic Behavior of Vertically Aligned Carbon Nanotube Foams With Patterned Microstructure, Adv. Eng. Mater. 2015; 17(10): 1470-1479 (Year: 2015).*

Gui, et al., Three-Dimensional Carbon Nanotube Sponge-Array Architectures with High Energy Dissipation, Adv. Mater. 2013: 1-6 (Year: 2013).*

Malecek, A., "New carbon nanotube-based foam promises superior protection against concussions," College of Engineering, University of Wisconsin-Madison, College of Engineering, University of Wisconsin-Madison, available at https://engineering.wisc.edu/news/new-carbon-nanotube-based-foam-promises-superior-protection-against-concussions/ as of Nov. 17, 2022, 5 pages.

Chawla, et al., "Superior mechanical properties by exploiting size-effects and multiscale interactions hierarchically architected foams," available at https://arxiv.org/abs/2207.03023 as of Jul. 7, 2022, 17 pages.

* cited by examiner

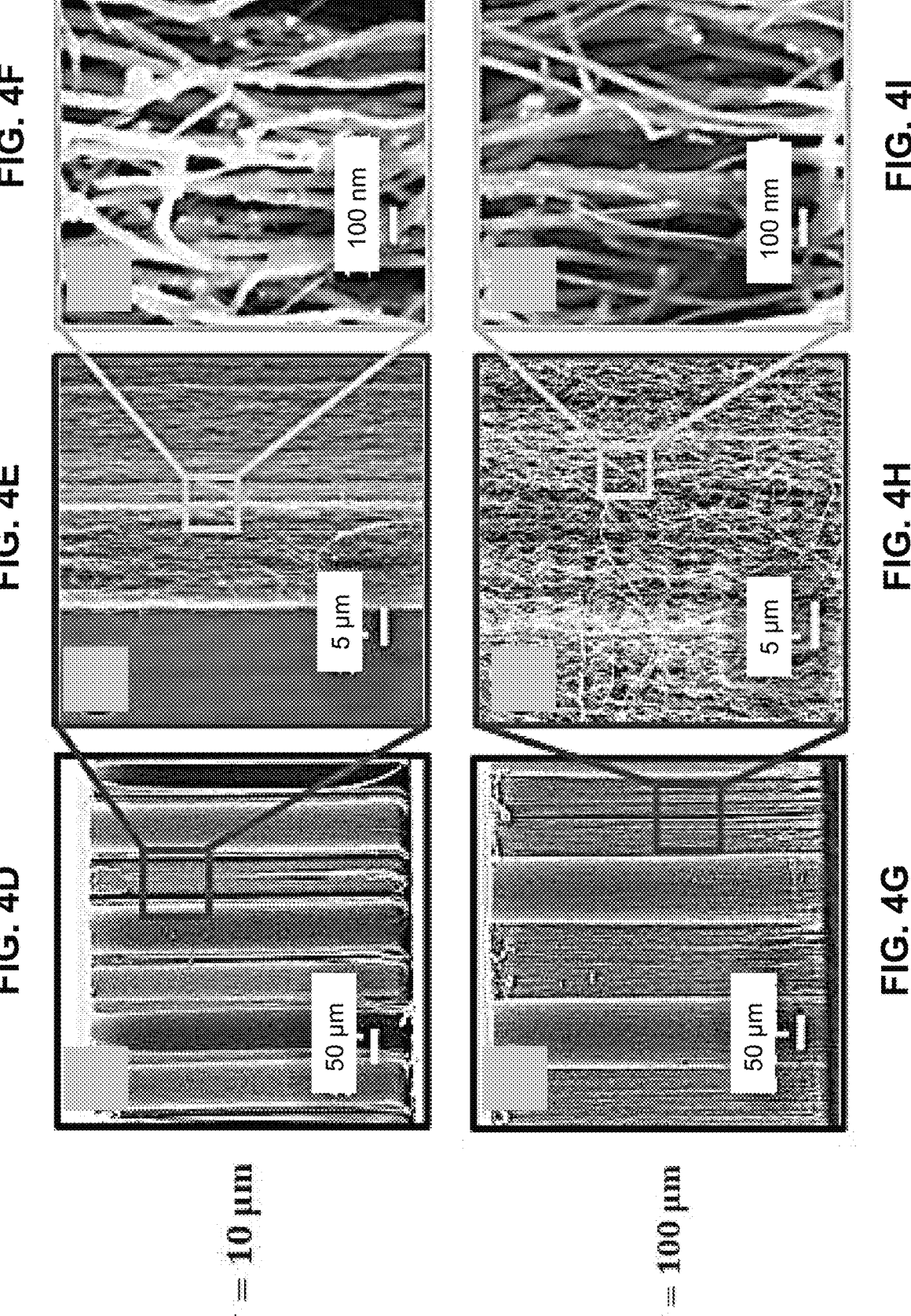

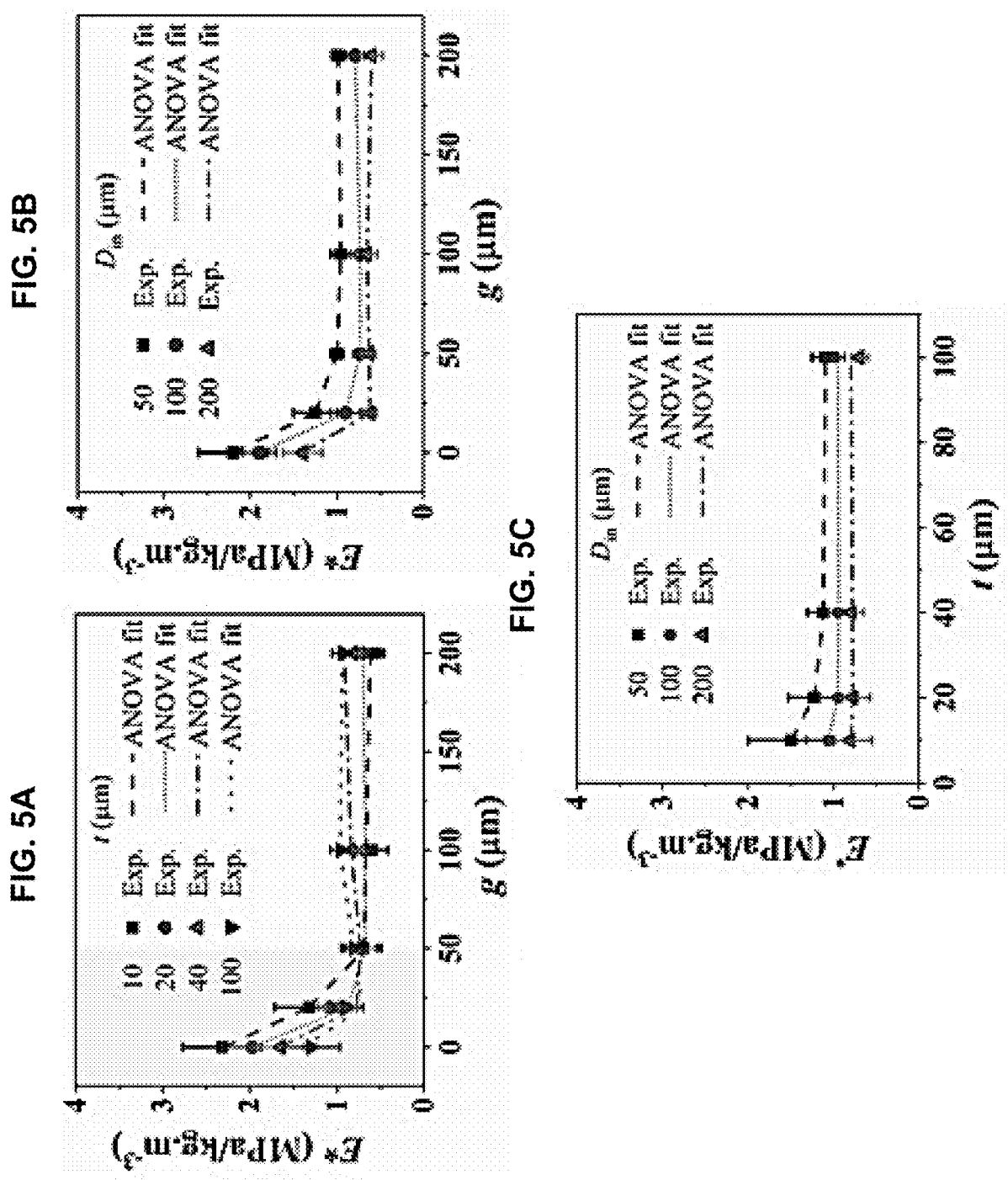

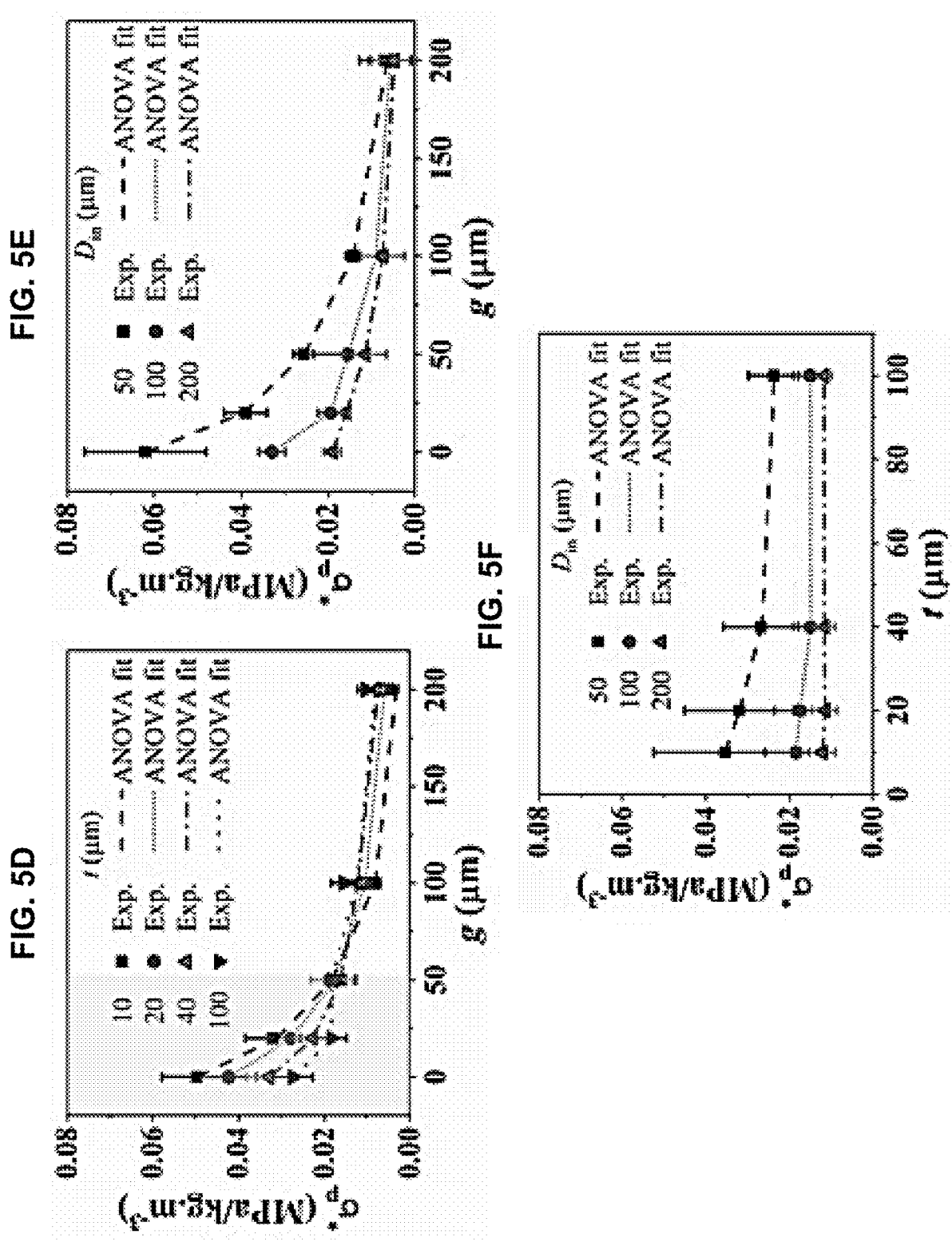

FIG. 6A
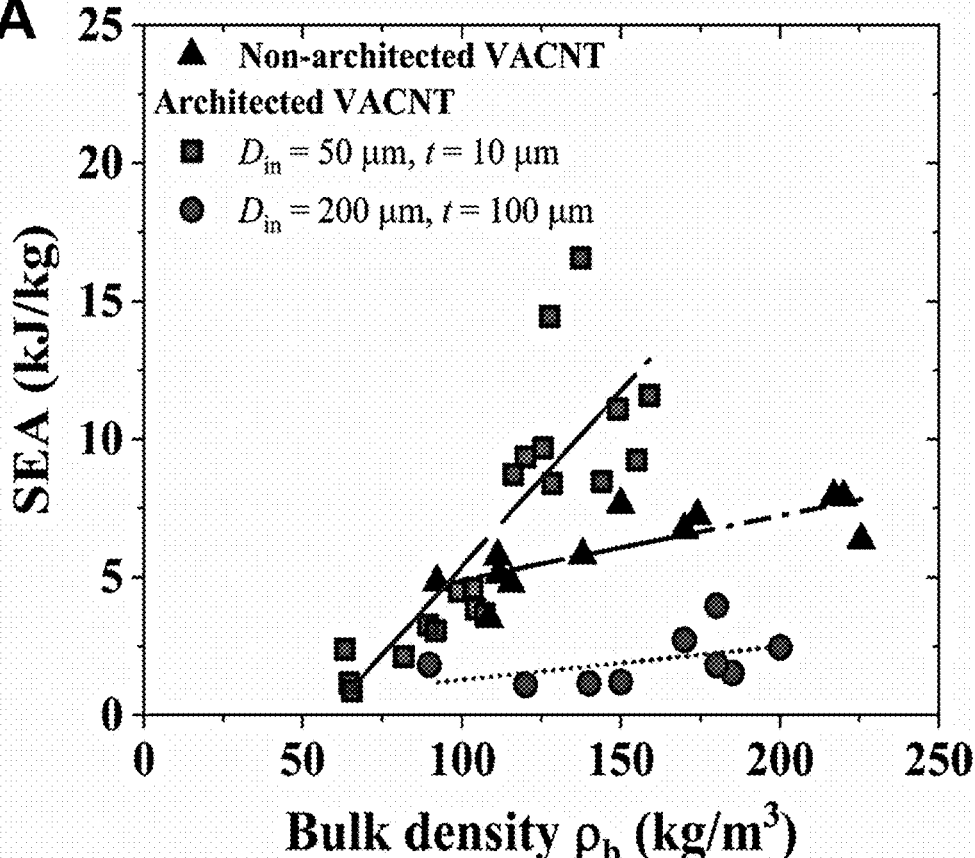
FIG. 6C
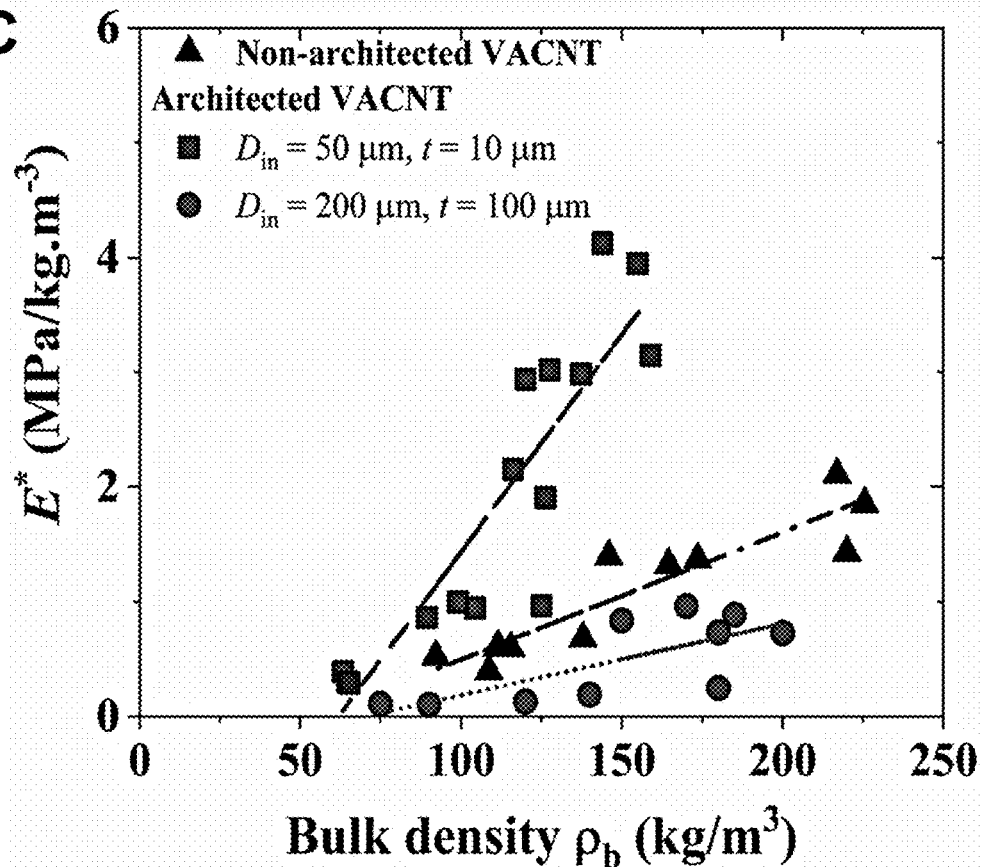

$$\frac{n}{A} = \frac{2}{\sqrt{3}(D_{in} + 2t + g)^2}$$

Serially nested configuration

Entirely immediately nested configuration $n = 2$ $n = 6$

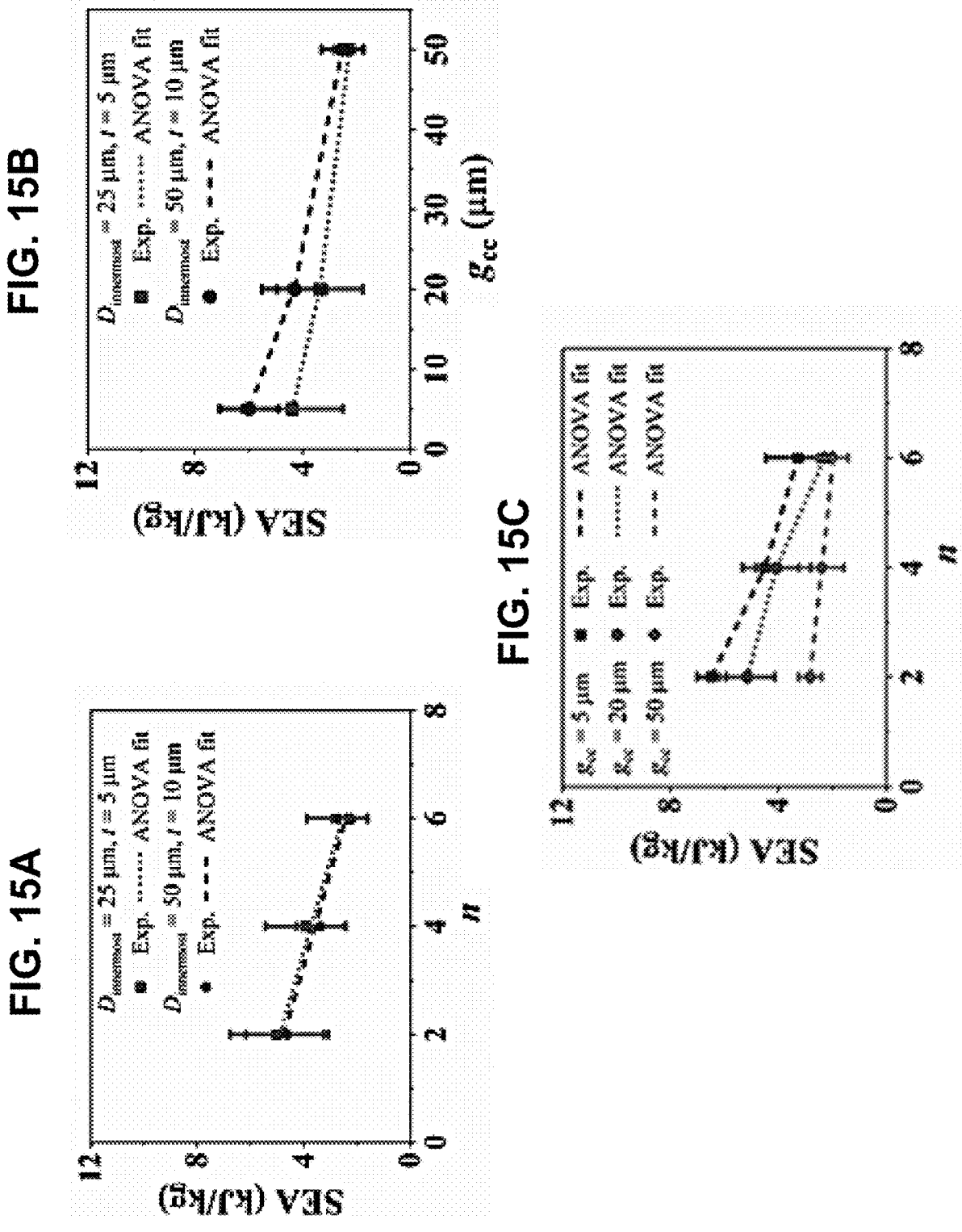

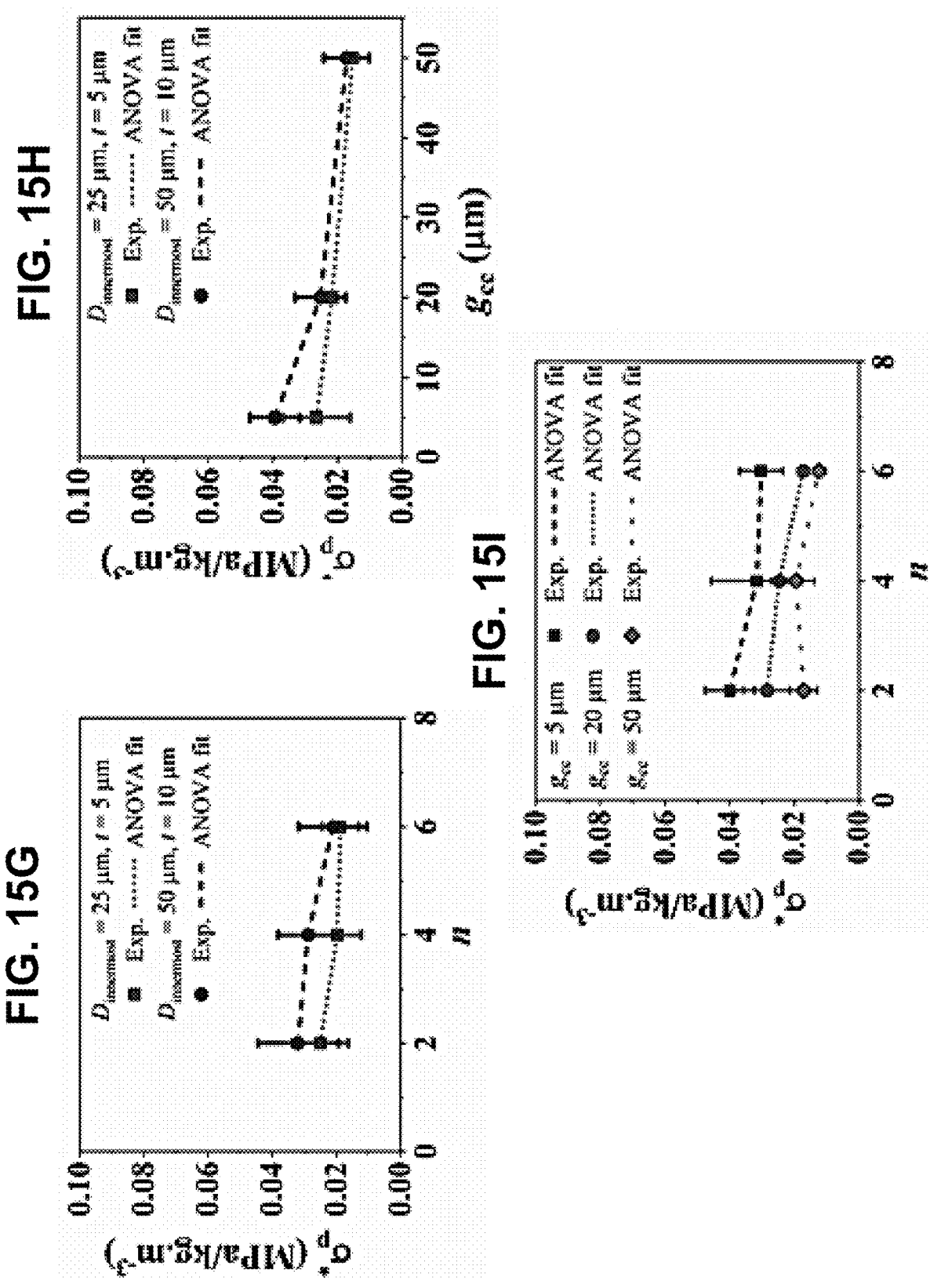

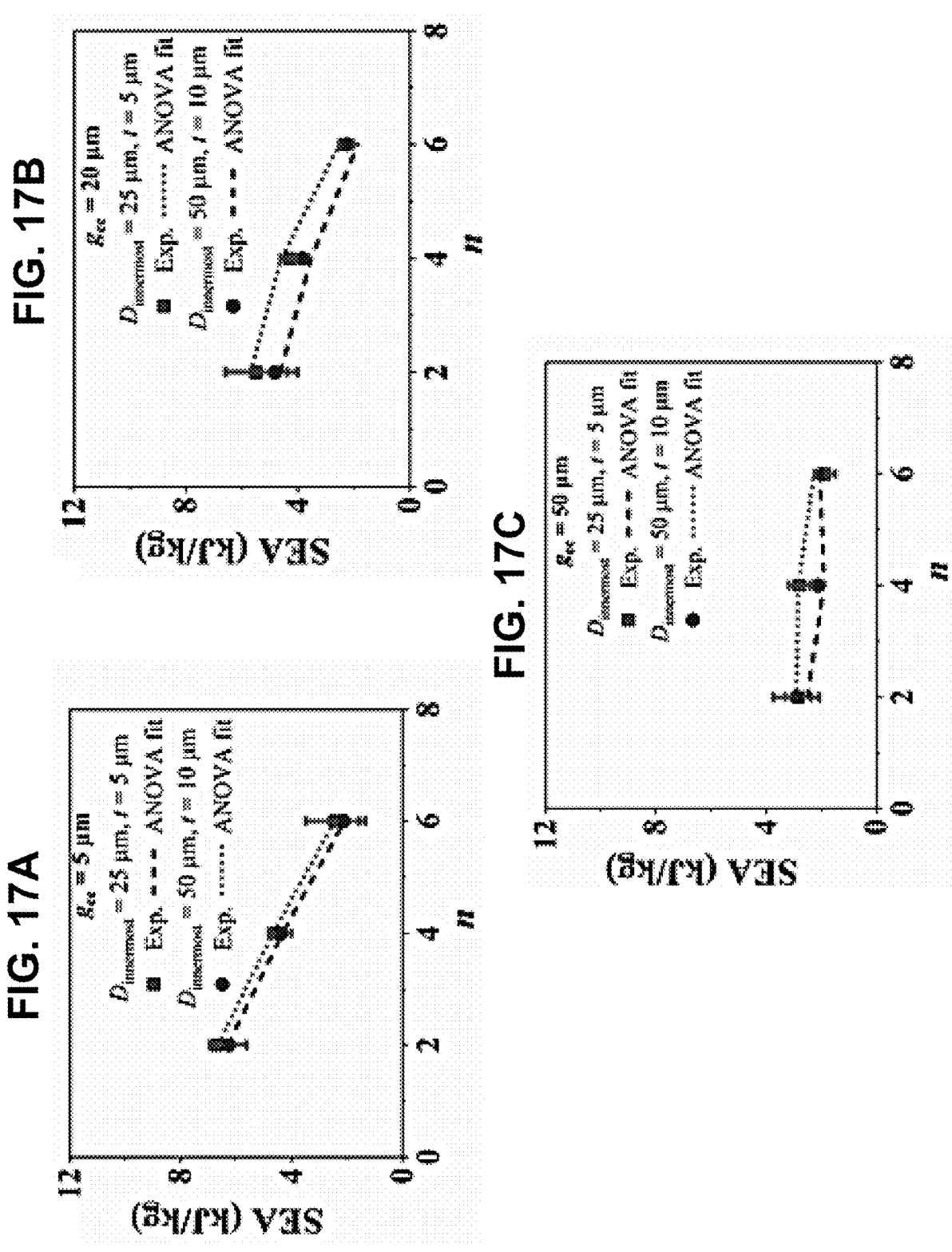

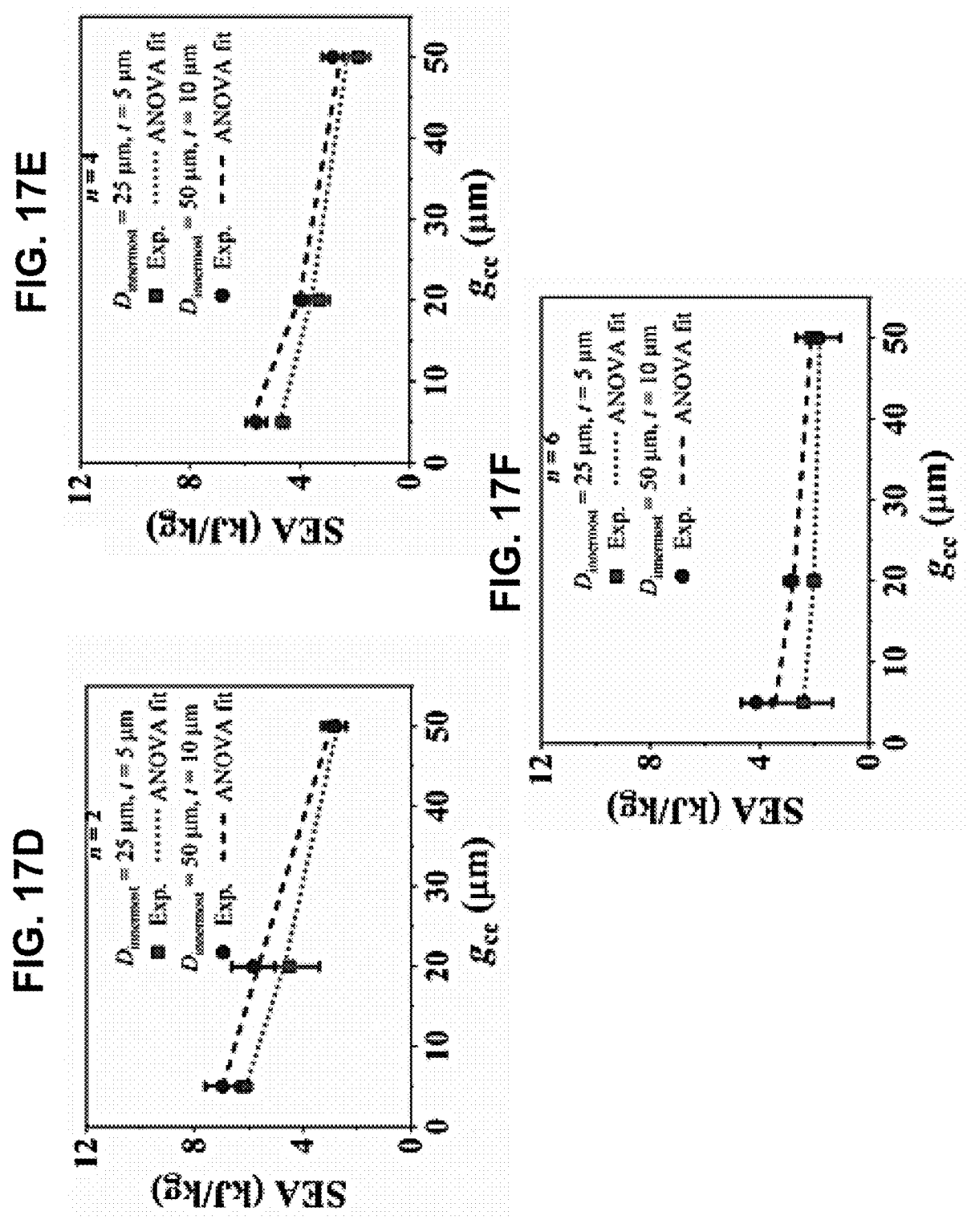

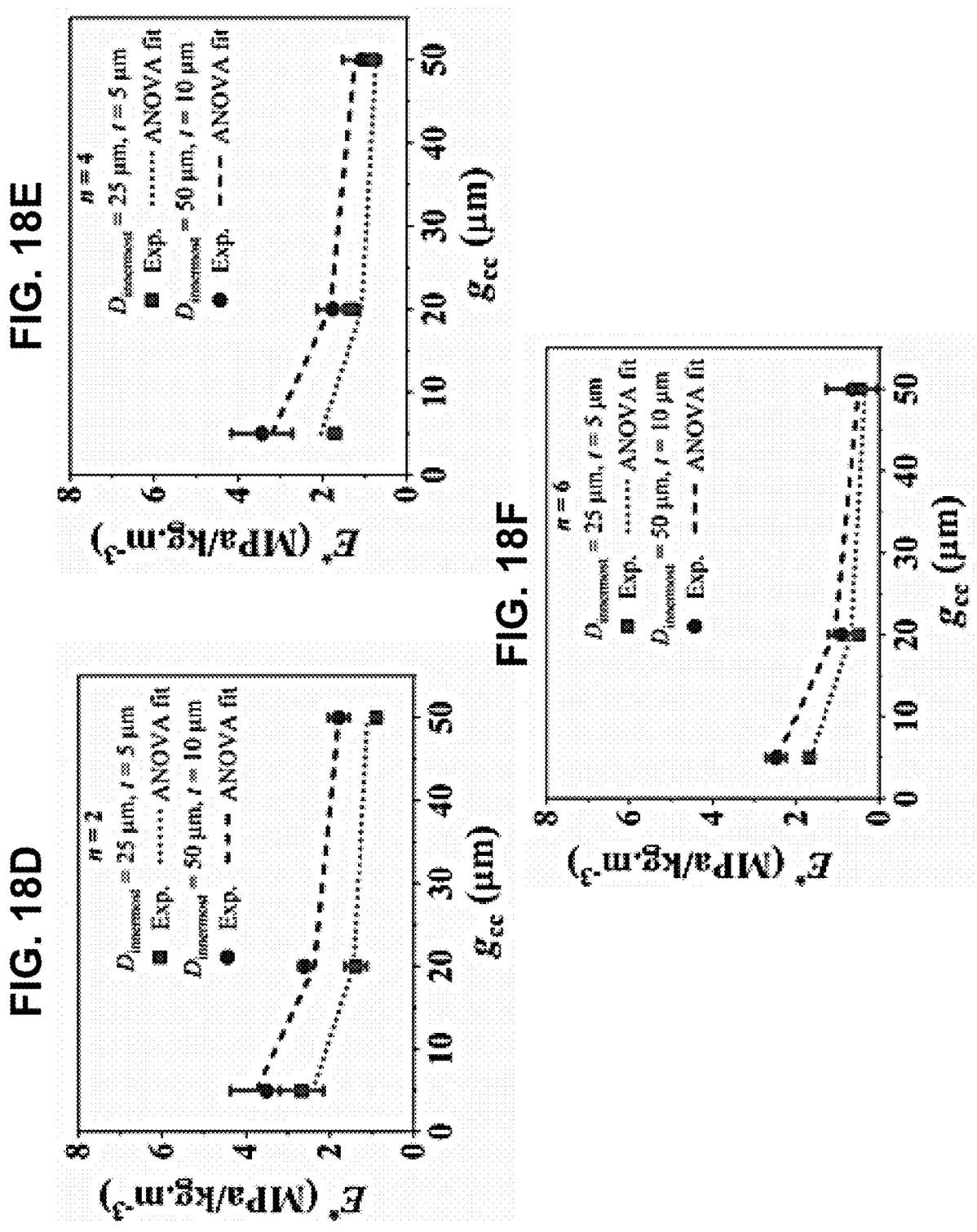

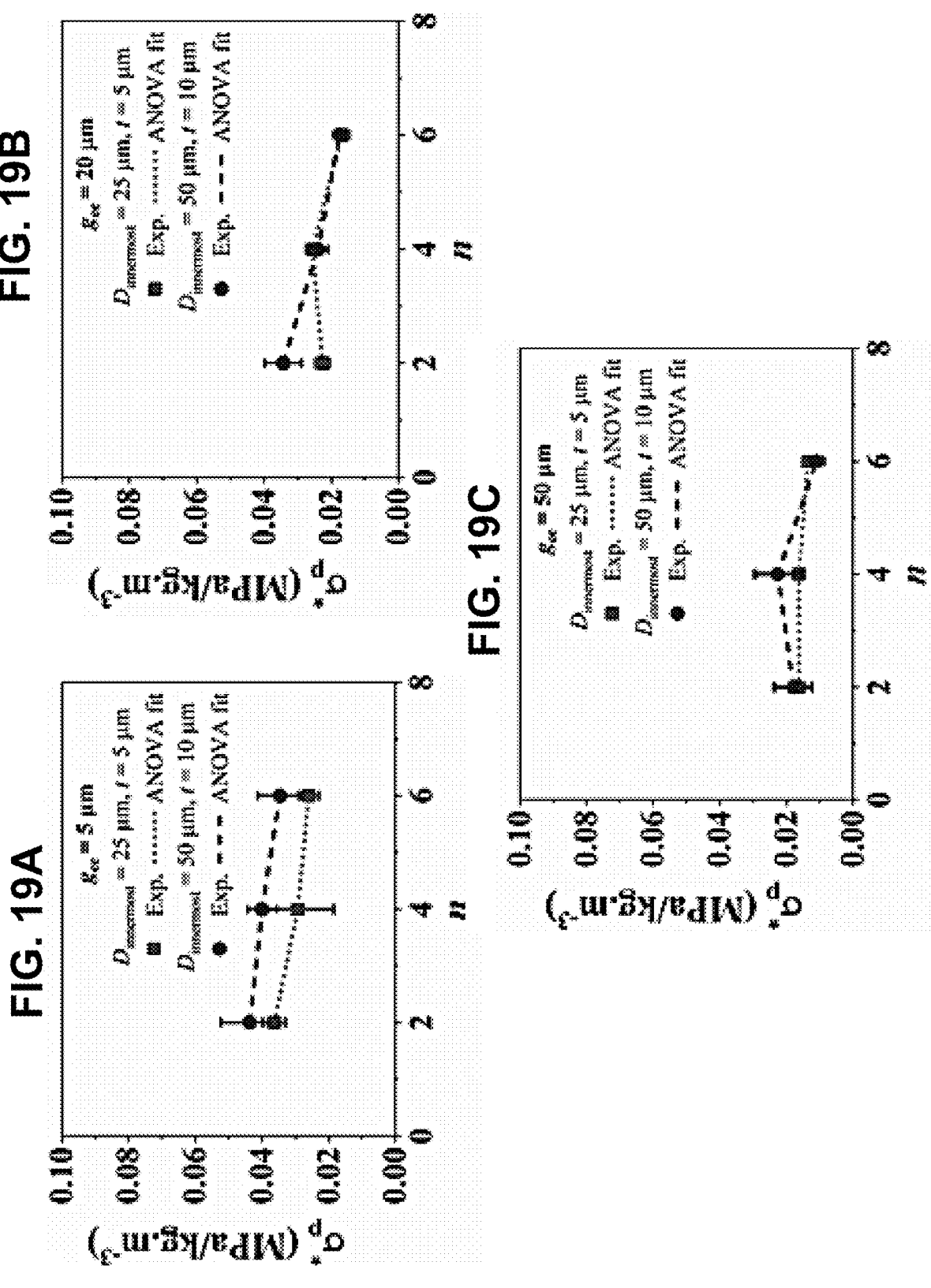

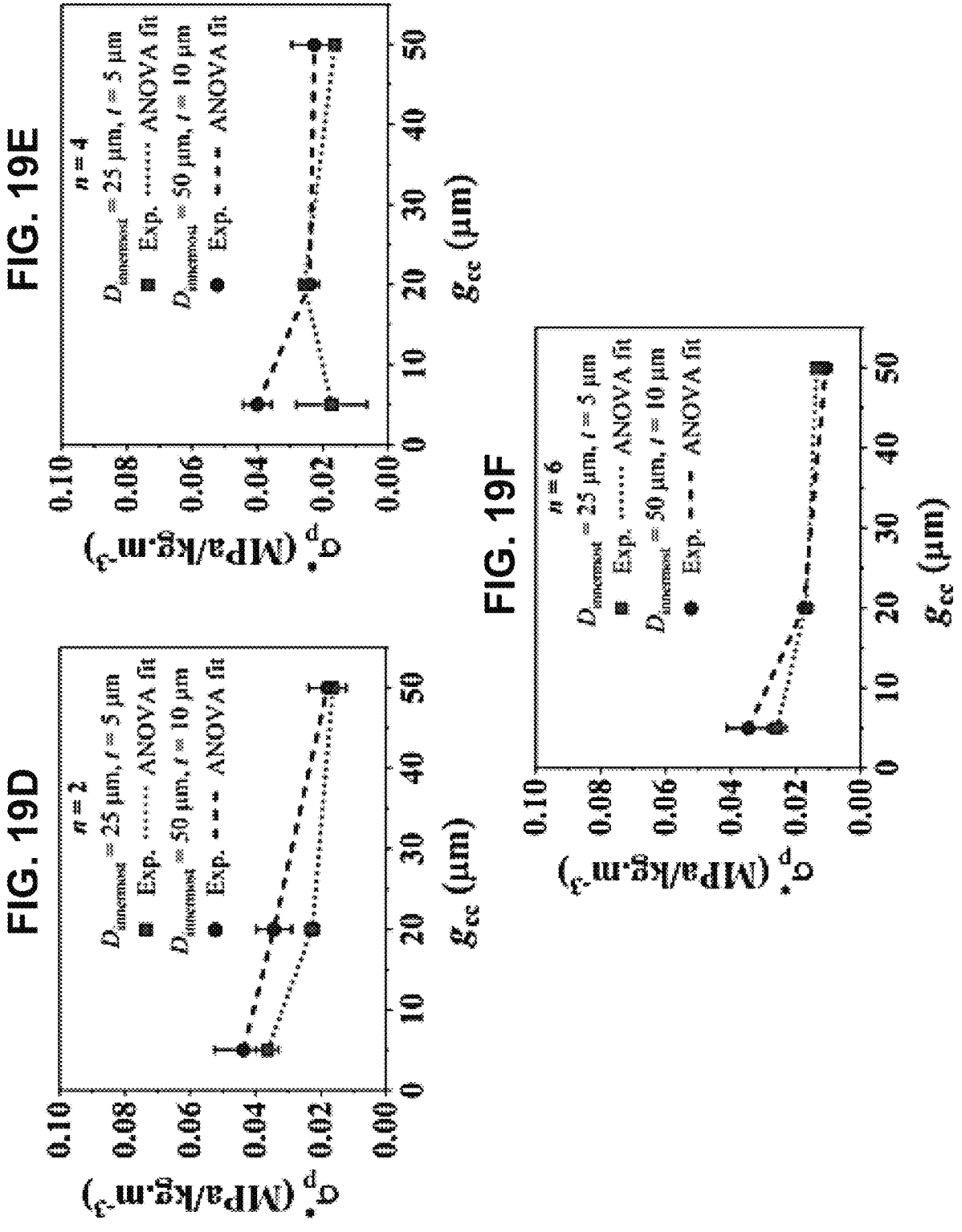

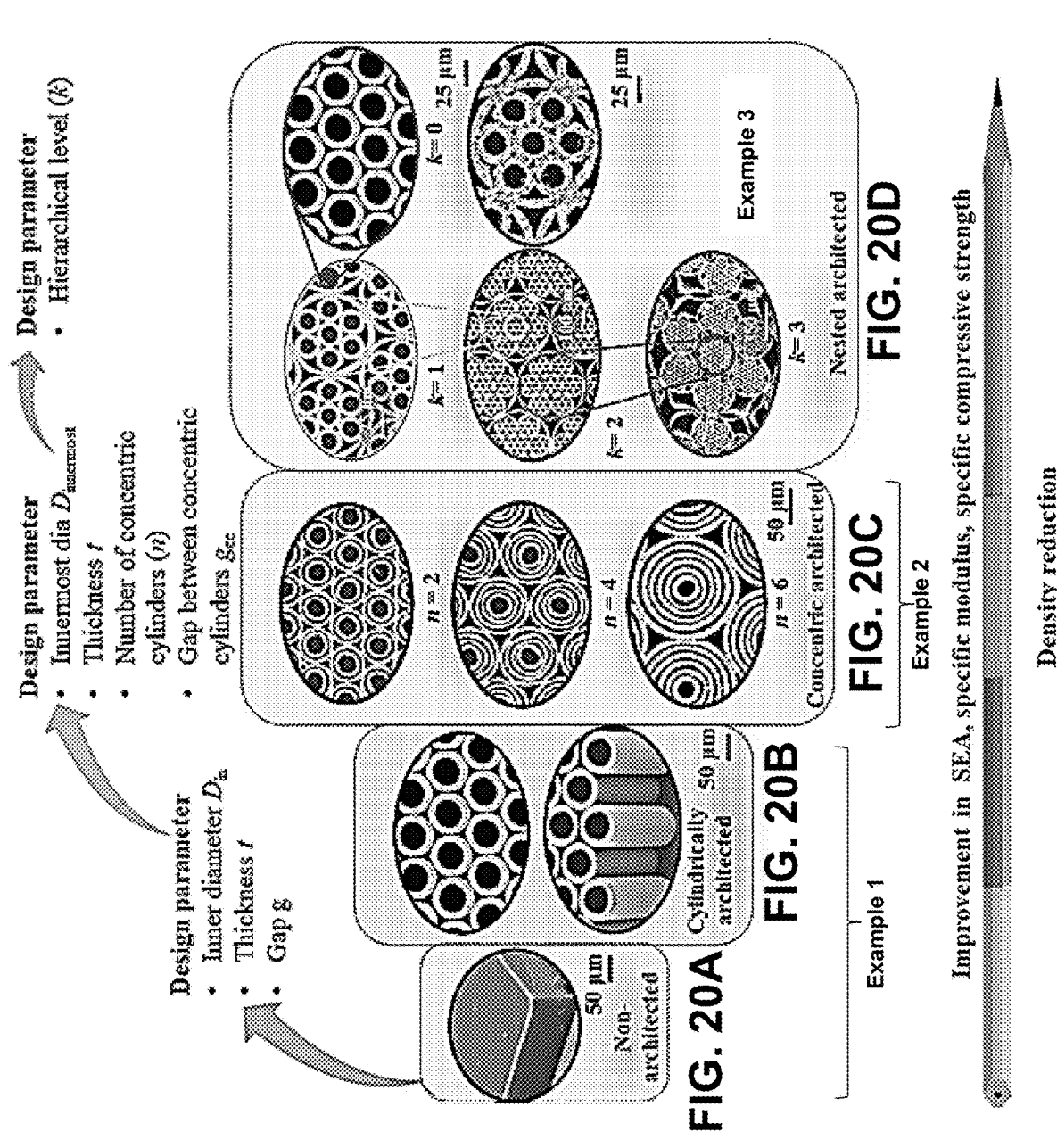

Partially immediately nested configuration, also a first bounded unit

Common unit

Juxtaposed, hexagonal configuration

A third bounded unit

A second bounded unit k=0 k=1 k=2 k=3

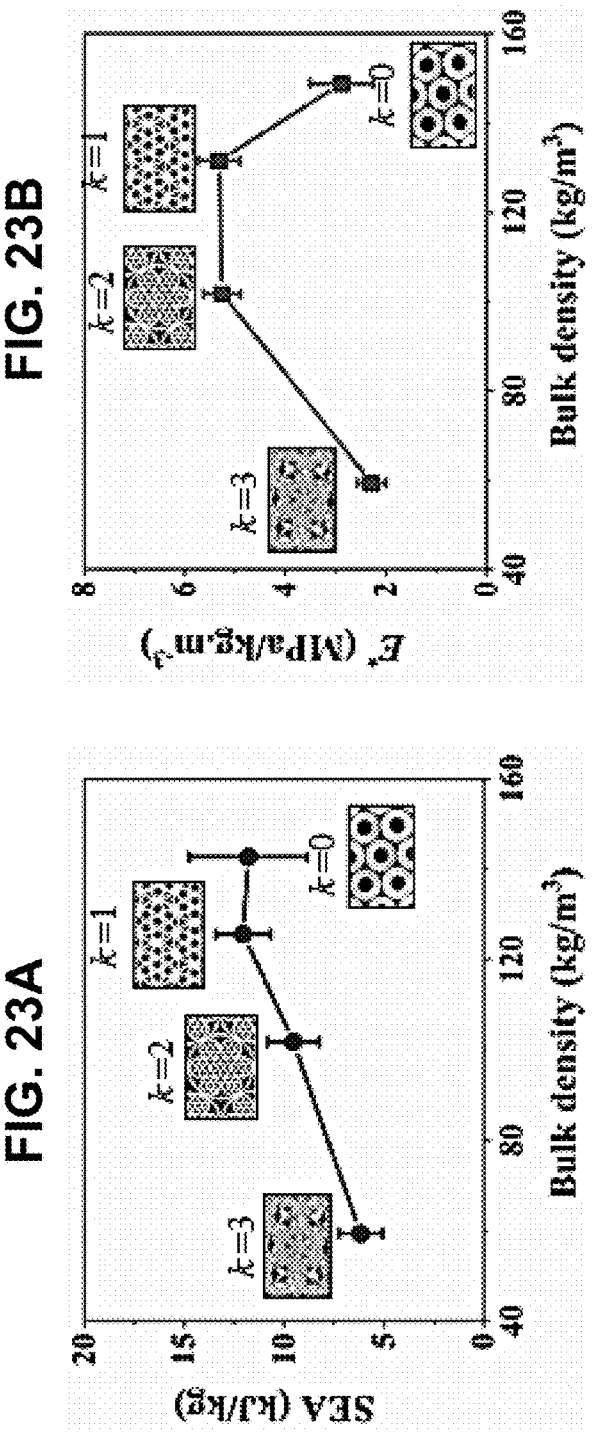
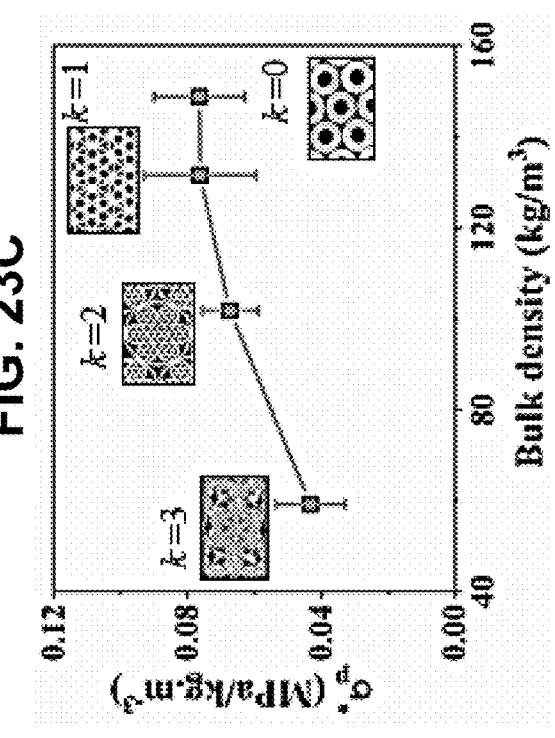

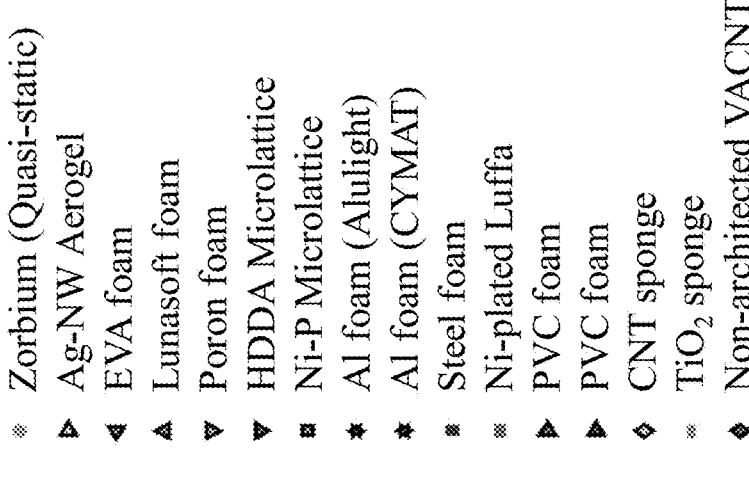
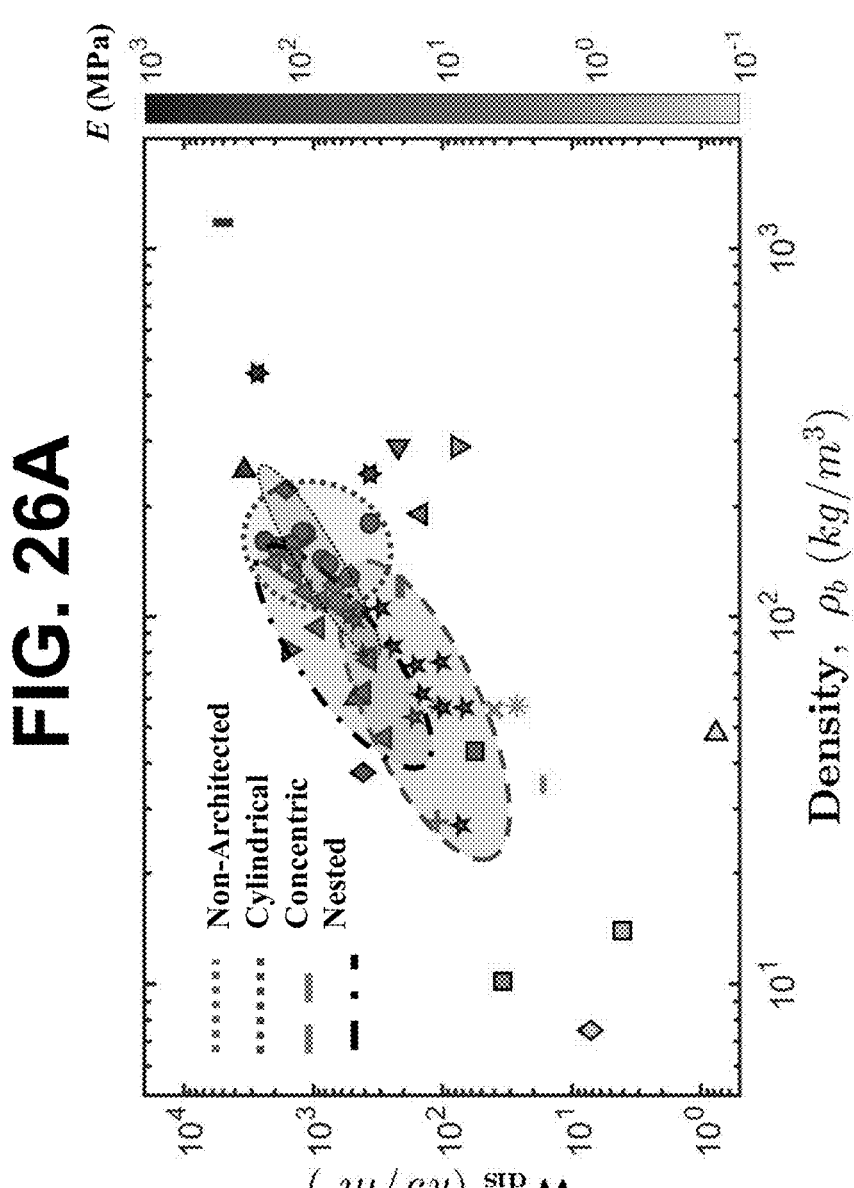
FIG. 26A

ARCHITECTED CARBON NANOTUBE FOAMS AND METHODS OF MAKING SAME

CROSS REFERENCE TO RELATED APPLICATIONS

The present application claims priority to U.S. provisional patent application No. 63/402,719 that was filed Aug. 31, 2022, the entire contents of which are incorporated herein by reference.

REFERENCE TO GOVERNMENT RIGHTS

This invention was made with government support under W911NF-20-1-0160 awarded by the ARMY/ARO and under N00014-21-1-2044 awarded by the NAVY/ONR. The government has certain rights in the invention.

BACKGROUND

Exceptional modulus, strength, and toughness with lesser mass density are critical characteristics of materials that are required in aerospace, automotive, robotics, structural, and defense applications. These qualities, however, are not found together in conventional materials. For example, stiffer materials are typically poor in dissipating energy and high-strength materials generally have lesser toughness. Moreover, properties of many conventional materials scale with a density such that a decrease in density results in substantial degradation of the strength and stiffness of the material.

SUMMARY

The present disclosure is directed to carbon nanotube foams preferably configured for improved stiffness, strength, and energy absorption capabilities. The carbon nanotube foams in preferred versions have a hierarchical and gradient structure and/or dimensional properties with designed mesoscale architecture that achieve synergistically improved specific elastic modulus, specific energy absorption, and specific compressive strength, among other improvements.

In one aspect, foams are provided. In embodiments, a foam comprises tubes substantially aligned longitudinally in a first direction, wherein: each tube defines an outer wall and an inner wall, and each tube comprises an entangled bundle of carbon nanotubes substantially aligned longitudinally in the first direction; and tubes in at least a subset of the tubes are positioned with respect to each other to form one or more first hexagonal units, wherein each first hexagonal unit comprises first-hexagonal-unit tubes, wherein the first-hexagonal-unit tubes comprise six peripheral first-hexagonal-unit tubes and a central first-hexagonal-unit tube, wherein the six peripheral first-hexagonal-unit tubes surround the central first-hexagonal-unit tube in a juxtaposed, hexagonal configuration.

Articles of manufacture, e.g., helmets, comprising the foams are also provided which are configured to cover at least a portion of an object and to attenuate an external force acting on the object. In embodiments, the foam is configured to attenuate both linear and rotational accelerations from an oblique impact to an article of manufacture comprising the foam.

It is noted that versions of the present carbon nanotube foams exhibit mechanical behavior similar to polymeric foams used in paddings but with superior properties for a given density. They additionally have thermally stable properties from cold to hot temperatures and higher thermal conductivity and diffusivity as compared to polymeric foams. The present carbon nanotube foams can be used for impact and blast protection applications in extreme environments that require lightweight in addition to high energy absorption, for example, as protective liners in combat and sports helmets.

The objects and advantages of the disclosure will appear more fully from the following detailed description of the preferred embodiments made in conjunction with the accompanying drawings.

BRIEF DESCRIPTION OF THE DRAWINGS

FIG. 1A shows a chemical vapor deposition (CVD)-synthesized pristine VACNT sample on a 5 mm×5 mm substrate. FIGS. 1B, 1C show scanning electron microscope (SEM) images showing the mesoscale hexagonally packed hollow cylinders, each cylinder made of vertically aligned carbon nanotubes; inner diameter $(D_{in})$ and thickness (t) of a cylinder and the gap (g) between adjacent cylinders are indicated. FIG. 1D shows an SEM image showing the entangled forest-like morphology of the vertically aligned carbon nanotubes making up individual cylinders of the VACNT foam. FIG. 1E shows a transmission electron microscopy (TEM) image showing the multi-walled structure of an individual carbon nanotube at the nanoscale.

FIGS. 4D-4I show SEM images of pristine architected VACNT foams with cylinders' thickness t=10 μm (FIGS. 4D-4F) and t=100 μm (FIGS. 4G-4I).

FIGS. 5A-5F show the effects of design variable interactions on response variables—$E^*$ (FIGS. 5A-5C) and $\sigma_p^*$ (FIGS. 5D-5F).

FIG. 6A compares SEA for architected and non-architected VACNTs. For the architected VACNTs, the properties are tailored by varying the gap g for a given $D_{in}$ and t. FIG. 6C compares specific modulus for architected and non-architected VACNTs.

FIG. 12C shows stress-strain response as a function of $g_{cc}$ for $D_{innermost}$=25 μm, t=5 μm, n=2 and FIG. 12D shows stress-strain response as a function of $g_{cc}$ for $D_{innermost}$=50 μm, t=10 μm, n=6.

FIGS. 13A-13D show specific stress-strain response as a function of the number of concentric cylinders (n) in architected VACNTs compared to non-architected VACNTs and cylindrically architected VACNTs (Example 1) for: (FIG. 13A) $D_{innermost}$=25 μm, t=5 μm, $g_{cc}$=5 μm; and (FIG. 13B) $D_{innermost}$=50 μm, t=10 μm, $g_{cc}$=5 μm. Stress-strain response as a function of $g_{cc}$ for: (FIG. 13C) $D_{innermost}$=25 μm, t=5 μm, n=2; and (FIG. 13D) $D_{innermost}$=50 μm, t=10 μm, n=6.

FIGS. 14A-14D show a comparison of SEA and E* for concentric cylindrically architected (Example 2), cylindrically architected (Example 1), and non-architected (Example 1) VACNT samples as a function of density. Properties are tailored by varying the concentration of hydrogen during the synthesis for non-architected VACNT samples, by varying the g for a given $D_{in}$ and t for cylindrically architected VACNT samples, and by varying the number of concentric cylinders for concentric cylindrically architected VACNT samples with: (FIGS. 14A, 14C) $D_{innermost}$=25 μm, t=5 μm; and (FIGS. 14B, 14D) $D_{innermost}$=50 μm, t=10 μm.

FIGS. 15A-15I show interaction plots for $D_{innermost}$ & t:n, $D_{innermost}$ & t:$g_{cc}$, and n:$g_{cc}$ for (FIGS. 15A-15C) SEA, (FIGS. 15D-15F) E* and (FIGS. 15G-15I) $\sigma^*_p$.

FIGS. 17A-17H show second-order interactions (FIGS. 17A-17C) $D_{innermost}$, t:n, (FIGS. 17D-17F) $D_{innermost}$, t:$g_{cc}$, and (FIGS. 17G-17H) n:$g_{cc}$ for SEA across different levels of third variables: $g_{cc}$, n and $D_{innermost}$, t.

FIGS. 18A-18H show second-order interactions (FIGS. 18A-18C) $D_{innermost}$, t:n, (FIGS. 18D-18F) $D_{innermost}$, t:$g_{cc}$, and (FIGS. 18G-18H) n:$g_{cc}$ for E* across different levels of third variables $g_{cc}$, n and $D_{innermost}$, t.

FIGS. 19A-19H show second-order interactions (FIGS. 19A-19C) $D_{innermost}$, t:n, (FIGS. 19D-19F) $D_{innermost}$, t:$g_{cc}$, and (FIGS. 19G-19H) n:$g_{cc}$ for a across different levels of third variables $g_{cc}$, n and $D_{innermost}$, t.

FIGS. 20A-20D illustrate various VACNT foams. FIG. 20A shows a SEM image of a non-architected VACNT (Example 1). FIG. 20B shows SEM images of cylindrically architected VACNTs (Example 1). Design parameters include cylinders of varying inner diameter $D_{in}$, thickness t, and the gap between neighboring cylinders g. FIG. 20C shows SEM images of concentric cylindrically architected VACNTs (Example 2). Design parameters include Design parameters include innermost diameter $D_{innermost}$, thickness of concentric cylinders t, number of concentric cylinders n, and gap between concentric cylinders $g_{cc}$. FIG. 20D shows SEM images of nested VACNTs cylinders using optimized $D_{innermost}$ and t (from concentric design) as the inner diameter and thickness for the smallest cylinder unit (level 1) (Example 3). The remaining design parameter includes the hierarchical level, k. Nested architected VACNTs demonstrate superior specific properties at a much lighter weight compared to non-architected as well as cylindrical architected and concentric cylindrical architected VACNTs.

FIG. 22A shows stress-strain curve and FIG. 22B shows specific stress-strain (normalized with bulk density) of nested architected VACNTs as a function of the hierarchical level k.

FIGS. 23A-23C show specific properties for nested architected VACNTs as a function of hierarchical level k.

FIG. 26A shows a $W_{dis}$-bulk density-modulus properties landscape of concentric cylindrically architected, cylindrically architected, nested architected, and non-architected VACNTs.

FIG. 27A shows an impact that acts through the center of gravity (COG) of the head-helmet system causing pure linear acceleration. FIG. 27B shows an impact that acts away from the center of gravity of the head-helmet system causing both linear and rotational accelerations about the center of gravity. Such an impact may be referred to as an oblique impact. FIG. 27C shows that the helmet liner is subjected to both compressive and shear stresses simultaneously.

DETAILED DESCRIPTION

One aspect of the present disclosure is directed to carbon nanotube foams. Illustrative carbon nanotube foams are shown in FIGS. 1A-1E, 9A-9H, 20A-20D, and 21A-21F. The carbon nanotube foams preferably exhibit a hysteretic, energy-dissipative response under compression. (See FIG. 2A.)

Figures 1A, 1B, 1C, 1D, 1E:
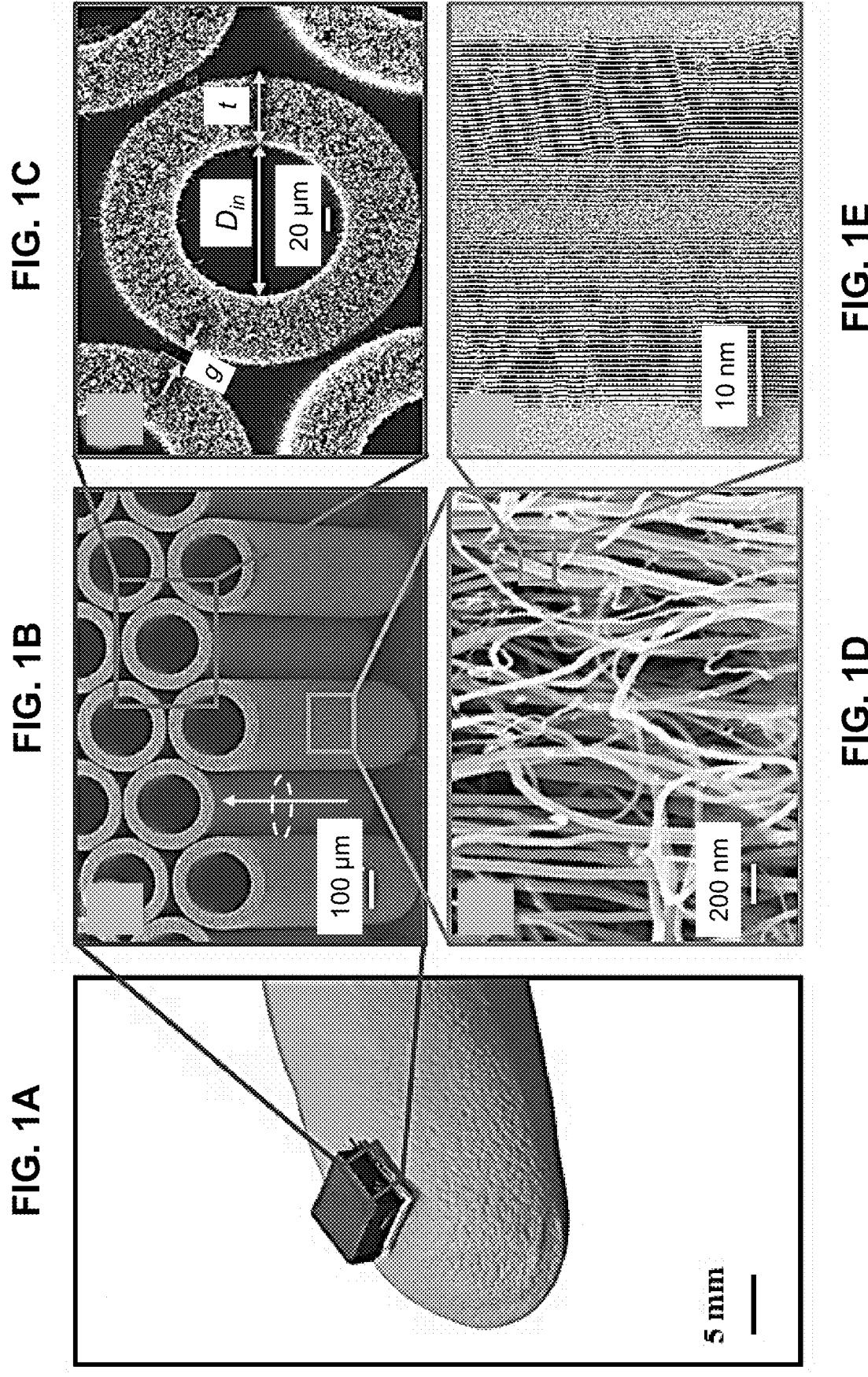
FIGS. 1A-1E illustrate the multilevel hierarchy of an exemplary architected vertically aligned carbon nanotube (VACNT) foam.
Figures 9A, 9B, 9C, 9D, 9E:
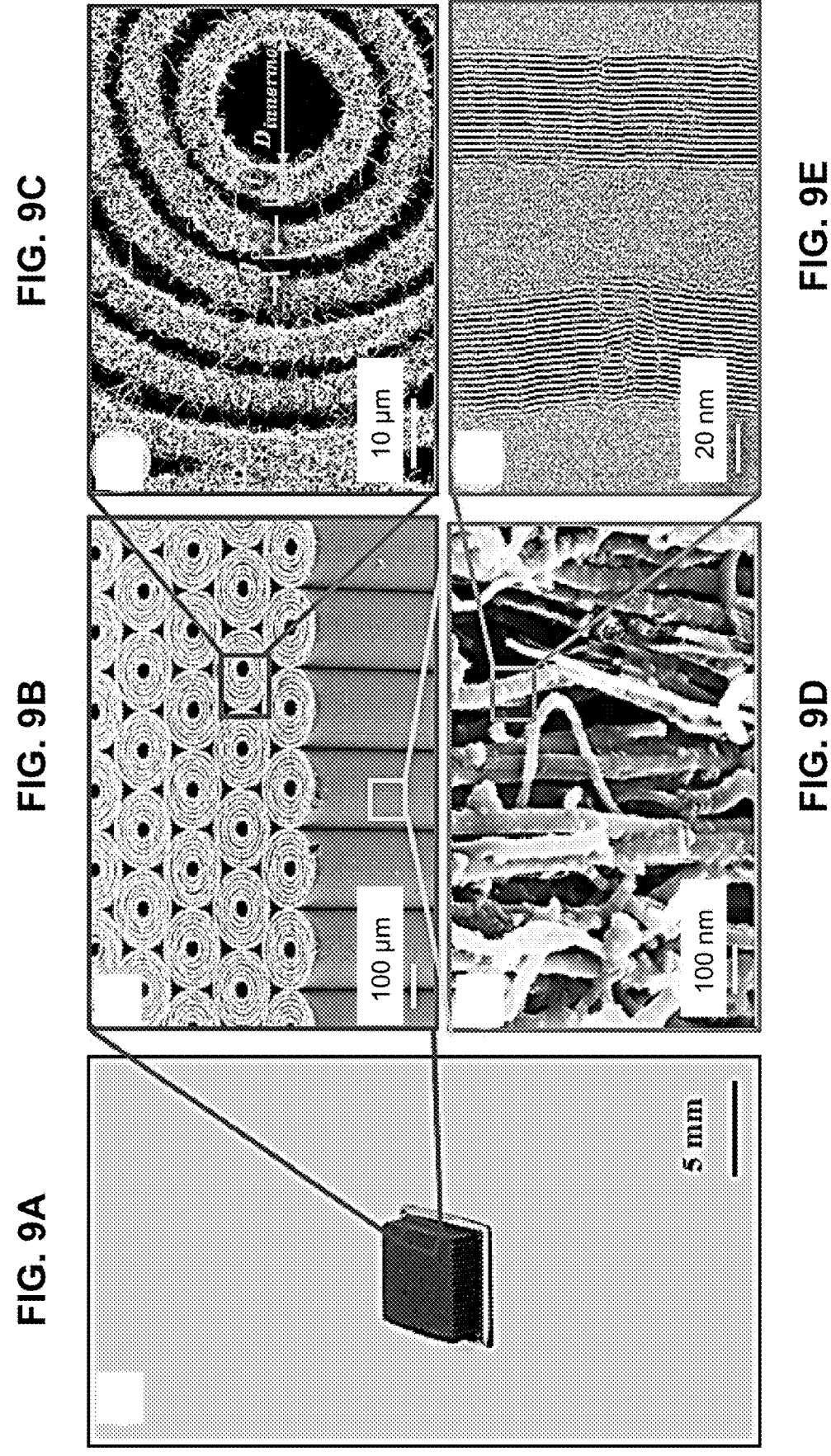
FIG. 9A shows a CVD synthesized pristine sample and FIGS. 9B-9E show SEM images of the sample showing hexagonally packed concentric cylindrically architected vertically aligned carbon nanotubes (VACNTs). The innermost diameter, the thickness of concentric cylinders, and the gap between the concentric cylinders are indicated as $D_{innermost}$, t, and $g_{cc}$, respectively. SEM images showing (FIG. 9F) two, (FIG. 9G) four, and (FIG. 9H) six concentric cylinders in different concentric cylindrically architected VACNT foams.

The carbon nanotube foams comprise carbon nanotubes substantially aligned longitudinally in a first direction and which are further assembled into entangled bundles. "Substantially aligned" as used herein refers to a general longitudinal extension of the carbon nanotubes in a single (e.g., "first") direction but accounts for the entanglement of the carbon nanotubes with one another and lack of a perfectly parallel orientation. Entangled bundles of substantially aligned carbon nanotubes are shown in FIGS. 1D, 4F, 4I, 9D, 11B, 11C, 11E, and 11F. The carbon nanotubes can be single-walled nanotubes, multi-walled carbon nanotubes, or a combination of single-walled nanotubes and multi-walled carbon nanotubes may be used. Multiwalled carbon nanotubes are shown in FIGS. 1E and 9E. The carbon nanotubes can be solely composed of carbon or can be functionalized with various substances. See, e.g., US 2017/0029274 A1.

At least some of the entangled bundles of substantially aligned carbon nanotubes are themselves organized in the form of tubes, which are also substantially aligned longitudinally in the first direction. "Substantially aligned" in this context, as above, refers to a general longitudinal extension of the tubes in a single (e.g., "first") direction but accounts for a lack of a perfectly aligned orientation. Illustrative tubes are shown and the first direction is labeled (with a white arrow) in FIG. 1B. FIG. 1D shows the organization of the entangled bundles of substantially aligned carbon nanotubes to form the walls of the tubes. The entangled bundles of substantially aligned carbon nanotubes forming the tubes are preferably continuous in cross-section (i.e., lacking distinct termini within the bundles along a plane orthogonal to the first direction). The orthogonal plane is also labeled in FIG. 1B with a white dashed circle. "Cross section" or "cross-sectional" as used herein with reference to a tube refers to aspects or characteristics with respect to the plane orthogonal to the first direction unless the context dictates otherwise. This cross-sectional continuity results at least in part from the entanglement of the carbon nanotubes and their attraction to each other via van der Waals forces. The tubes do not have to be solely composed of carbon nanotubes, as other elements can be interspersed within.

The tubes each comprise an inner wall that defines an internal boundary and central cavity of the tube and an outer wall that defines an outer boundary of the tube. The region including and between the inner and outer walls is composed of the entangled bundles of substantially aligned carbon nanotubes (see FIG. 1D). The central cavity is a longitudinally extended region that may, but not necessarily, consist of a void, i.e., an open space. For example, other tubes, isolated nanotube pillars, or other structures can be included within the central cavity of any given tube. Similarly, the outer wall does not have to be continuously exposed to open space, as some portions can be in contact, and even have some carbon nanotube entanglement, with the walls of neighboring tubes. In some versions, no portions of the outer walls of neighboring tubes are exposed to open space and are all entirely in contact with each other, thereby forming a grid-like pattern. In preferred versions, at least a portion of the outer walls are exposed to open space such that such portions are not in direct contact with or do not have carbon nanotubes entangled with the outer walls of neighboring tubes. In preferred versions, at least a portion of the outer walls are in direct contact with and/or have carbon nanotubes entangled with the outer walls of neighboring tubes. The outer walls of the neighboring tubes, and thus the outer boundaries of the neighboring tubes, in cases of such contact and/or entanglement is defined as the region one-half the distance between the inner walls of the neighboring tubes.

Figures 21A, 21B, 21C, 21D, 21E, 21F:
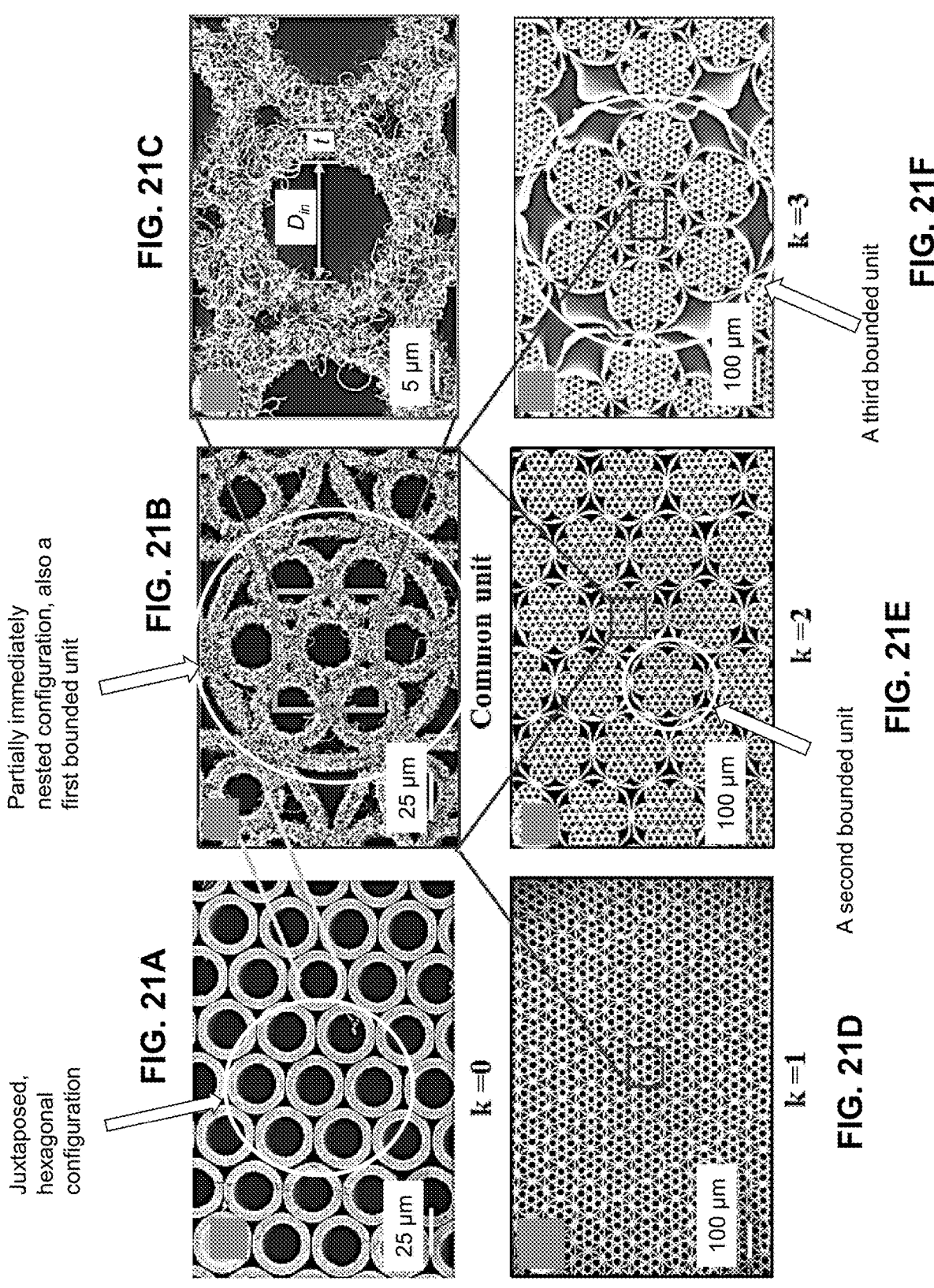
FIGS. 21A-21F show SEM images and design parameters for nested architected VACNTs ($D_{in}$, t, k).

FIG. 1C shows an illustrative version of tubes having outer walls which are not in contact with outer walls of neighboring tubes due to a gap g defined between outer walls. By contrast, FIG. 21A shows another illustrative version of tubes having outer walls which are in contact with outer walls of neighboring tubes (i.e., g=0).

The tubes can embody any cross-sectional shape that defines a central cavity. The cross-sectional shape can be curvilinear, rectilinear, or a combination thereof. Exemplary curvilinear cross-sectional shapes include circles and ellipses. Exemplary rectilinear shapes include triangles, quadrilaterals (trapezium, parallelogram, rectangle, rhombus, square, kite), and other polygons. The tubes in some versions are in the form of cylinders. "Cylinder" as used herein refers to tubes having a cross section that is entirely curvilinear. Examples of cylinders include circular cylinders, which are cylinders having a substantially circular cross section, and elliptical cylinders, which are cylinders having an elliptical cross section.

The tubes may be arranged into various configurations that enhance various properties of the foam, as further described below. The arrangement may refer to a cross-sectional arrangement (i.e., arrangement of the tubes along the plane orthogonal to the first direction) of the tubes with respect to each other. Two basic types of configurations include juxtaposed configurations and nested configurations.

Juxtaposed configurations of tubes are configurations of one or more first tubes with respect to one or more second tubes in which the one or more first tubes are not encompassed within the central cavities of the one or more second tubes and the one or more second tubes are not encompassed within the central cavities of the one or more first tubes. The juxtaposed configurations can take a variety of forms. One such form is referred to herein as a hexagonal configuration. Hexagonal configurations are juxtaposed configurations of tubes in which six peripheral tubes arranged in a hexagonal pattern (as defined by imaginary lines connecting the central cavities of the peripheral tubes) surround a central tube.

Each peripheral tube neighbors two other of the six peripheral tubes as well as the central tube, and the central tube neighbors each of the six peripheral tubes. By way of example, a juxtaposed, hexagonal configuration of tubes is labeled with a solid white circle in FIG. 21A. "Neighbor" (or grammatical variants thereof such as "neighbors" or "neighboring") as used herein refers to two juxtaposed tubes having at least one section of each's outer walls directly facing each other without any additional tubes disposed therebetween. In some versions, the configurations include isolated units of tubes configured in a hexagonal pattern. In some versions the configurations include multiple overlapping units of tubes configured in a hexagonal pattern, such as a configuration in which circular cross-sections of the tubes form a so-called "hexagonal packing" or "hexagonal close packing" configuration, which is a configuration permitting the densest packing of circles along a plane. Nested configurations are configurations of one or more first tubes with respect to one or more second tubes in which the one or more first tubes are completely encompassed within the central cavity (or cavities) of the one or more second tubes. The nested configurations can take a variety of forms. An immediately nested configuration is a configuration of two tubes with respect to each other in which at least one section of the outer wall of a first tube directly faces at least one section of the inner wall of a second tube without any additional tubes disposed therebetween. An entirely immediately nested configuration is a configuration of two tubes with respect to each other in which the entirety of the outer wall of a first tube directly faces the inner wall of a second tube without any additional tubes disposed therebetween. By way of example, an entirely immediately nested configuration is labeled in FIG. 9F. A serially nested configuration is a configuration of three or more tubes all successively being in an entirely immediately nested configuration. By way of example, serially nested configurations are labeled in FIGS. 9G and 9H. A partially immediately nested configuration is a configuration of two tubes with respect to each other in which less than the entirety of the outer wall of a first tube directly faces the inner wall of a second tube without any additional tubes disposed therebetween. A first tube, for example, may partially immediately nest multiple second tubes when the multiple second tubes are arranged with respect to each other in a juxtaposed configuration. By way of example, a partially immediately nested configuration is labeled in FIG. 21B.

Figures 9F, 9G, 9H:
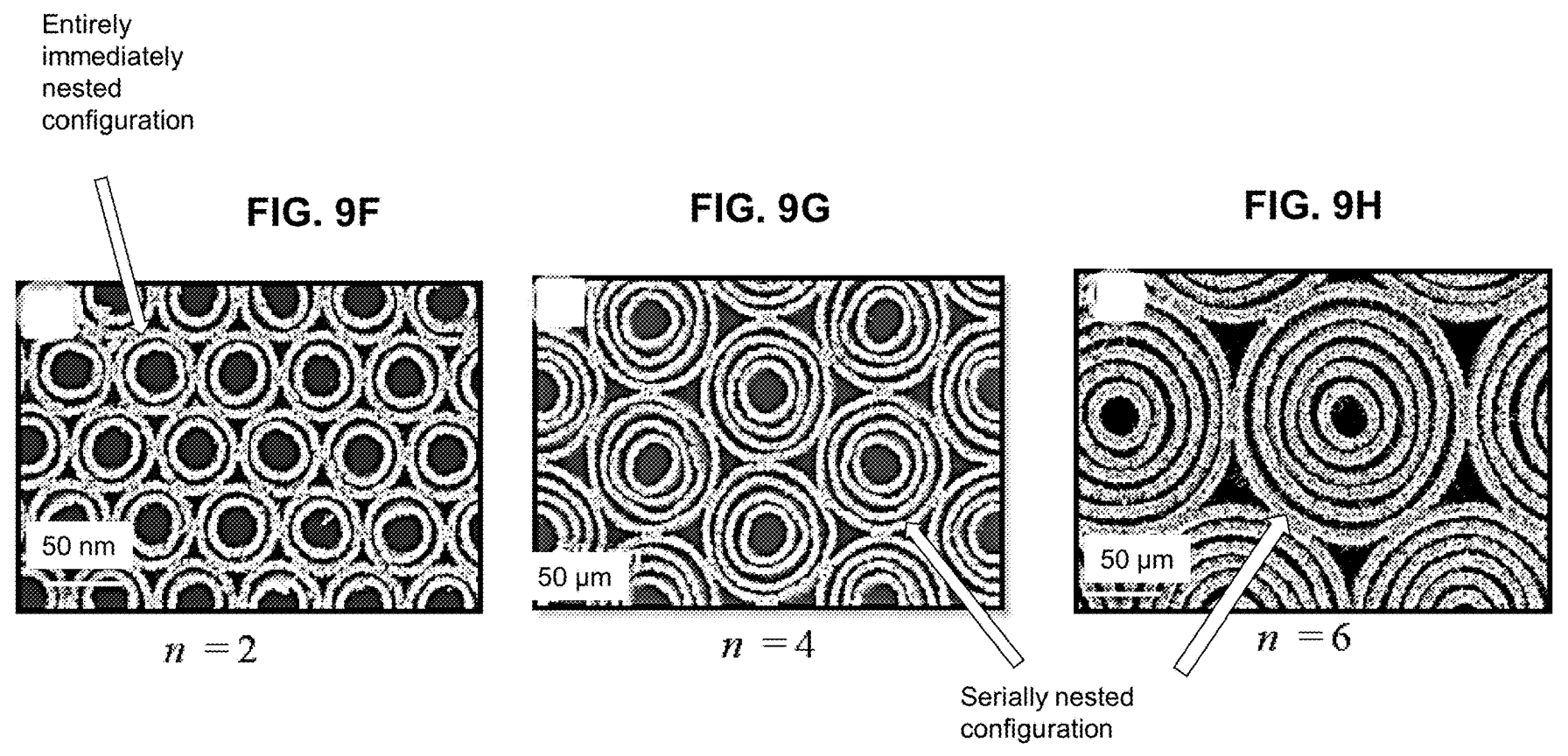

In some versions, the tubes in a nested configuration can be concentrically arranged, such that the center of the central cavity of each tube in the nested configuration is coincident. The tubes in the entirely immediately nested configured labeled in FIG. 9F and the serially nested configurations labeled in FIGS. 9G and 9H are concentrically arranged. In some versions, the tubes in a nested configuration can be non-concentrically arranged, such that the center of the central cavity of one or more of the tubes in the nested configuration are not coincident with one or more of the others. The tubes in the partially immediately nested configuration labeled in FIG. 21B include tubes which are non-concentrically arranged.

Figure 8A:
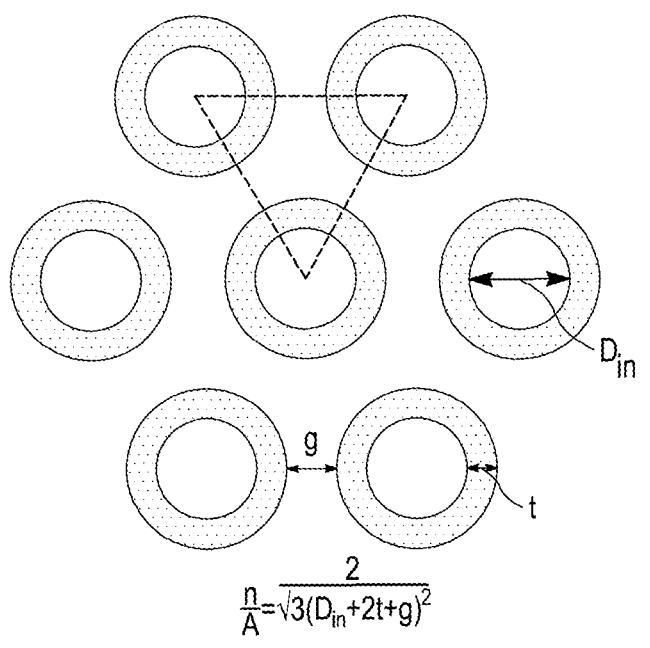
FIG. 8A shows the calculation of number of cylinders per unit area.

Configurations of tubes may comprise a "first hexagonal unit" comprising first-hexagonal-unit tubes. The first-hexagonal-unit tubes comprise six peripheral first-hexagonal-unit tubes and a central first-hexagonal-unit tube. The six peripheral first-hexagonal-unit tubes surround the central first-hexagonal-unit tube in a juxtaposed, hexagonal configuration. A first hexagonal unit is schematically illustrated in FIG. 8A which includes seven first-hexagonal-unit tubes.

In some versions, the present foams comprise multiple overlapping first hexagonal units. In various versions, a given first-hexagonal-unit tube can constitute a member of more than one first hexagonal unit, such as two, three, four, five, six, or seven different first hexagonal units. In various versions, a given central first-hexagonal-unit tube of one first hexagonal unit can constitute a peripheral first-hexagonal-unit tube of one, two, three, four, five, or six other different first hexagonal units. In various versions, a given peripheral first-hexagonal-unit tube of one first hexagonal unit can constitute a peripheral first-hexagonal-unit tube of one, two, three, four, or five other different first hexagonal units. In some versions, a given first peripheral first-hexagonal-unit tube of one first hexagonal unit can constitute a central first-hexagonal-unit tube of another first hexagonal unit. In some versions, the foams comprise at least 10, at least 20, at least 30, at least 40, at least 50, at least 60, at least 70, at least 80, at least 90, at least 100, at least 500, at least 1,000, at least 5,000 or more cylindrical first-hexagonal-unit tubes arranged cross-sectionally in a hexagonal close packing configuration.

In some versions, one or more of the first hexagonal units can be nested within a tube, referred to herein as a first boundary tube, to thereby form a first bounded unit comprising the one or more first hexagonal units and the first boundary tube. By way of example, a first bounded unit is labeled in FIG. 21B. In some versions, at least one first bounded unit includes only one first hexagonal unit, wherein the first boundary tube encompasses one and only one first hexagonal unit. In some versions, each first bounded unit includes only one first hexagonal unit, wherein the first boundary tube encompasses one and only one first hexagonal unit. (See FIG. 21D.)

In some versions, the present foams can comprise a structure exhibited by the first bounded unit at several hierarchical levels, in a fractal-like configuration.

For example, in some versions, the present foams can comprise multiple first bounded units. The multiple first bounded units can be positioned with respect to each other in one or more second hexagonal units. Each second hexagonal unit can comprise six peripheral first bounded units surrounding a central first bounded unit in a juxtaposed, hexagonal configuration. The foam can optionally further comprise a second boundary tube surrounding at least one second hexagonal unit in a nested configuration to thereby form a second bounded unit. By way of example, a second bounded unit is labeled in FIG. 21E. In some versions, at least one second bounded unit includes only one second hexagonal unit, wherein the second boundary tube encompasses one and only one second hexagonal unit. In some versions, each second bounded unit includes only one second hexagonal unit, wherein the second boundary tube encompasses one and only one second hexagonal unit. (See FIG. 21E.)

In some versions, the present foams can comprise multiple second bounded units. The multiple second bounded units can be positioned with respect to each other in one or more third hexagonal units. Each third hexagonal unit can comprise six peripheral second bounded units surrounding a central second bounded unit in a juxtaposed, hexagonal configuration. The foam can optionally further comprise a third boundary tube surrounding at least one third hexagonal unit in a nested configuration to thereby form a third bounded unit. By way of example, a third bounded unit is labeled in FIG. 21F. In some versions, at least one third bounded unit includes only one third hexagonal unit, wherein the third boundary tube encompasses one and only one third hexagonal unit. In some versions, each third bounded unit includes only one third hexagonal unit, wherein the third boundary tube encompasses one and only one third hexagonal unit. (See FIG. 21F.)

In some versions, the present foams can comprise multiple third bounded units. The multiple third bounded units can be positioned with respect to each other in one or more fourth hexagonal units. Each fourth hexagonal unit can comprise six peripheral third bounded units surrounding a central third bounded unit in a juxtaposed, hexagonal configuration. The foam can optionally further comprise a fourth boundary tube surrounding at least one fourth hexagonal unit in a nested configuration to thereby form a bounded fourth unit. In some versions, at least one fourth bounded unit includes only one fourth hexagonal unit, wherein the fourth boundary tube encompasses one and only one fourth hexagonal unit. In some versions, each fourth bounded unit includes only one fourth hexagonal unit, wherein the fourth boundary tube encompasses one and only one fourth hexagonal unit. In some versions, the foam can comprise multiple fourth bounded units.

The structures exhibited by the first, second, third, and fourth bounded units can be replicated in one or more additional higher-order hierarchical structures to form, for example, fifth, sixth, seventh, eighth, etc., bounded units.

In some versions, each first hexagonal unit can comprise first-hexagonal-unit tube sets composed of constituent first-hexagonal-unit tubes. The constituent first-hexagonal-unit tubes can comprise the first-hexagonal-unit tube and, optionally, one or more internal first-hexagonal-unit tubes. The one or more internal first-hexagonal-unit tubes in some versions are preferably in an entirely immediately nested and concentric configuration with at least one other of the constituent first-hexagonal-unit tubes. In such a configuration, the outer wall of the first-hexagonal-unit tube in each first-hexagonal-unit tube set defines an outer wall of the first-hexagonal-unit tube set, and the inner wall of an innermost constituent first-hexagonal-unit tube in each first-hexagonal-unit tube set defines an inner wall and central cavity of the first-hexagonal-unit tube set.

In some versions, one or more of the first-hexagonal-unit tube sets consists only of the first-hexagonal-unit tube. In such versions, the first-hexagonal-unit tube by default constitutes the innermost constituent first-hexagonal-unit tube, the inner wall of the first-hexagonal-unit tube constitutes the inner wall of the first-hexagonal-unit tube set, and the outer wall of the first-hexagonal-unit tube constitutes the outer wall of the first-hexagonal-unit tube set. For the avoidance of doubt, the term "innermost" in "innermost constituent first-hexagonal-unit tube" as used herein does not imply more than one constituent first-hexagonal-unit tube. By way of example, FIGS. 1A-1E show a foam composed of a plurality of first hexagonal units, each first hexagonal unit composed of seven first-hexagonal-unit tube sets, each of which consists of one constituent first-hexagonal-unit tube.

In some versions, one or more of the first-hexagonal-unit tube sets comprise one or more internal first-hexagonal-unit tubes that are in an entirely immediately nested and concentric configuration with at least one other of the constituent first-hexagonal-unit tubes. The one or more internal first-hexagonal-unit tubes can comprise an inner first-hexagonal-unit tube, and, optionally, one or more intermediate first-hexagonal-unit tubes concentrically nested between the first-hexagonal-unit tube and the inner first-hexagonal-unit tube. In such versions, the inner first-hexagonal-unit tube constitutes the innermost constituent first-hexagonal-unit tube, and the inner wall of the inner first-hexagonal-unit tube constitutes the inner wall of the first-hexagonal-unit tube set.

In some versions, the first-hexagonal-unit tube sets comprise from 2 to 20, from 2 to 15, from 2 to 10, or from 2 to 6 (i.e., 2, 3, 4, 5, 6) constituent first-hexagonal-unit tubes that are in an entirely immediately nested and concentric configuration with respect to each other. By way of example, FIG. 9F shows a foam composed of a plurality of first hexagonal units, each first hexagonal unit composed of seven first-hexagonal-unit tube sets, each of which consists of two constituent first-hexagonal-unit tubes in an entirely immediately nested and concentric configuration with respect to each other; FIG. 9G shows a foam composed of a plurality of first hexagonal units, each first hexagonal unit composed of seven first-hexagonal-unit tube sets, each of which consists of four constituent first-hexagonal-unit tubes in an entirely immediately nested and concentric configuration with respect to each other; FIG. 9H shows a foam composed of a plurality of first hexagonal units, each first hexagonal unit composed of seven first-hexagonal-unit tube sets, each of which consists of six constituent first-hexagonal-unit tubes in an entirely immediately nested and concentric configuration with respect to each other.

In addition to the particular arrangement of the tubes in the present foams, certain dimensional characteristics of the tubes may be selected to enhance various properties of the present foams, as further described below.

One such dimensional characteristic is the gap between tubes in the present foams. \ For neighboring, juxtaposed tubes, the gap refers to a shortest distance between respective outer walls (see g in FIG. 1C). For immediately nested tubes, the gap refers to a shortest distance between respective outer and inner walls (see $g_{cc}$ in FIG. 9C). Exemplary gaps (whether g or $g_{cc}$) include from 0 µm to 500 µm or more. This includes no more than 500 µm, such as no more than 450 µm, no more than 400 µm, no more than 350 µm, no more than 300 µm, no more than 250 µm, no more than 200 µm, no more than 175 µm, no more than 150 µm, no more than 125 µm, no more than 100 µm, no more than 75 µm, no more than 50 µm, no more than 45 µm, no more than 40 µm, no more than 35 µm, no more than 30 µm, no more than 25 µm, no more than 20 µm, no more than 15 µm, no more than 10 µm, no more than 5 µm, or 0 µm. However, as demonstrated in the Examples, below, shorter gaps between neighboring, juxtaposed tubes and between partially immediately nested tubes in some embodiments can confer advantageous properties to the present foams, such as increased specific energy absorption, increased specific peak stress, and/or increased specific modulus.

In various versions, the gap between all tubes within a foam is no more than 500 µm, such as no more than 450 µm, no more than 400 µm, no more than 350 µm, no more than 300 µm, no more than 250 µm, no more than 200 µm, no more than 175 µm, no more than 150 µm, no more than 125 µm, no more than 100 µm, no more than 75 µm, no more than 50 µm, no more than 45 µm, no more than 40 µm, no more than 35 µm, no more than 30 µm, no more than 25 µm, no more than 20 µm, no more than 15 µm, no more than 10 µm, no more than 5 µm, or 0 µm.

In various versions, the gap between some or all neighboring, juxtaposed tubes within a foam is no more than 500 µm, such as no more than 450 µm, no more than 400 µm, no more than 350 µm, no more than 300 µm, no more than 250 µm, no more than 200 µm, no more than 175 µm, no more than 150 µm, no more than 125 µm, no more than 100 µm, no more than 75 µm, no more than 50 µm, no more than 45 µm, no more than 40 µm, no more than 35 µm, no more than 30 μm, no more than 25 μm, no more than 20 μm, no more than 15 μm, no more than 10 μm, no more than 5 μm, or 0 μm. Exemplary gaps having the above values include those between some or all of the neighboring, juxtaposed first-hexagonal-unit tubes, between some or all of the neighboring, juxtaposed first boundary tubes, between some or all of the neighboring, juxtaposed second boundary tubes, between some or all of the neighboring, juxtaposed third boundary tubes, and/or between some or all of the neighboring, juxtaposed fourth boundary tubes.

In various versions, the gap between some or all partially immediately nested tubes within a foam is no more than 500 μm, such as no more than 450 μm, no more than 400 μm, no more than 350 μm, no more than 300 μm, no more than 250 μm, no more than 200 μm, no more than 175 μm, no more than 150 μm, no more than 125 μm, no more than 100 μm, no more than 75 μm, no more than 50 μm, no more than 45 μm, no more than 40 μm, no more than 35 μm, no more than 30 μm, no more than 25 μm, no more than 20 μm, no more than 15 μm, no more than 10 μm, no more than 5 μm, or 0 μm. Exemplary gaps having the above values include those between some or all of the pairs of peripheral first-hexagonal-unit tubes and first boundary tubes, between some or all of the pairs of first boundary tubes of the peripheral first bounded units and second boundary tubes, between some or all of the pairs of second boundary tubes of the peripheral second bounded units and third boundary tubes, and/or between some or all of the pairs of third boundary tubes of the peripheral third bounded units and fourth boundary tubes.

In various versions, the gap between some or all entirely immediately nested tubes within a foam is at least 0.1 μm, at least 0.5 μm, at least 1 μm, at least 2 μm, at least 3 μm, at least 4 μm, at least 5 μm, at least 6 μm, at least 7 μm, at least 8 μm, at least 9 μm, at least 10 μm, at least 15 μm, or at least 20 μm, and/or no more than 100 μm, no more than 75 μm, no more than 50 μm, no more than 45 μm, no more than 40 μm, no more than 35 μm, no more than 30 μm, no more than 25 μm, no more than 20 μm, no more than 15 μm, no more than 10 μm, no more than 5 μm, or no more than 0.1 μm. Exemplary ranges include from 0.1 μm to 20 μm, from 0.1 μm to 15 μm, from 0.1 μm to 10 μm, from 0.1 μm to 7.5 μm, from 0.1 μm to 5 μm, from 0.1 μm to 2.5 μm, from 1 μm to 10 μm, or from 2.5 μm to 7.5 μm. Exemplary gaps having the above values include those between some or all of the constituent first-hexagonal-unit tubes in the first-hexagonal-unit sets. In preferred versions, such gaps are consistent (i.e., same) between the entireties of pairs of immediately nested constituent first-hexagonal-unit tubes.

Another dimensional characteristic is diameter. "Diameter" refers to a largest cross-sectional distance between directly opposed portions of the inner wall of a given tube, i.e., the cross-sectional distance across the central cavity of a given tube. For the avoidance of doubt, the term "diameter" does not imply that the central cavity of any given tube has a circular cross section. The diameter of the tubes can have a wide range of values depending on the number of hierarchical levels of hexagonal units and the boundary tubes encompassing same. However, as demonstrated in the Examples, below, smaller diameters for the innermost constituent first-hexagonal-unit tube in the first-hexagonal-unit tube sets (i.e., the first-hexagonal-unit tube in embodiments of the first-hexagonal-unit tube sets lacking internal first-hexagonal-unit tubes, and the innermost first-hexagonal-unit tube in embodiments of the first-hexagonal-unit tube sets including internal first-hexagonal-unit tubes), which defines the inner wall and central cavity of the first-hexagonal-unit tube set, can confer advantageous properties to the present foams, such as increased specific energy absorption, increased specific peak stress, and increased specific modulus. In embodiments of the first-hexagonal-unit tube sets lacking internal first-hexagonal-unit tubes (and thus, consisting of one first-hexagonal-unit tube), the diameter may be referred to as $D_{in}$ (see FIG. 1C). In embodiments of the first-hexagonal-unit tube sets comprising internal first-hexagonal-unit tubes (and thus, comprising an innermost first-hexagonal-unit tube), the diameter may be referred to as $D_{innermost}$ (see FIG. 9C).

Exemplary diameters (whether $D_{in}$ or $D_{innermost}$) include from 0.1 μm or less to 300 μm or more. This includes at least 1 μm, at least 2 μm, at least 3 μm, at least 4 μm, at least 5 μm, at least 6 μm, at least 7 μm, at least 8 μm, at least 9 μm, at least 10 μm, at least 15 μm, or at least 20 μm, and/or no more than 200 μm, no more than 175 μm, no more than 150 μm, no more than 125 μm, no more than 100 μm, no more than 75 μm, no more than 50 μm, no more than 45 μm, no more than 40 μm, no more than 35 μm, or no more than 30 μm. Exemplary ranges include from 1 μm to 75 μm, from 5 μm to 100 μm, from 5 μm to 75 μm, from 10 μm to 75 μm, from 20 μm to 60 μm, or from 20 μm to 50 μm.

In some versions, some or all of the innermost constituent first-hexagonal-unit tubes have a diameter from 0.1 μm or less to 300 μm or more. In various versions, the diameter of some or all of the innermost constituent first-hexagonal-unit tubes within a foam is at least 1 μm, at least 2 μm, at least 3 μm, at least 4 μm, at least 5 μm, at least 6 μm, at least 7 μm, at least 8 μm, at least 9 μm, at least 10 μm, at least 15 μm, or at least 20 μm, and/or no more than 200 μm, no more than 175 μm, no more than 150 μm, no more than 125 μm, no more than 100 μm, no more than 75 μm, no more than 50 μm, no more than 45 μm, no more than 40 μm, no more than 35 μm, or no more than 30 μm. Exemplary ranges include from 1 μm to 75 μm, from 5 μm to 100 μm, from 5 μm to 75 μm, from 10 μm to 75 μm, from 20 μm to 60 μm, or from 20 μm to 50 μm.

In some versions, the first-hexagonal-unit tubes in one, some, or all of the first hexagonal units have the same diameter. In some versions, the innermost constituent first-hexagonal-unit tubes within one, some, or all of the first-hexagonal units have the same diameter. In some versions, some or all of the first boundary tubes have the same diameter. In some versions, some or all of the second boundary tubes have the same diameter. In some versions, some or all of the third boundary tubes have the same diameter. In some versions, some or all of the fourth boundary tubes have the same diameter.

Another dimensional characteristic is thickness. "Thickness" refers to the shortest distance between the inner and outer walls of a given section of a given tube (see t in FIGS. 1C and 9C). Exemplary thicknesses include from 0.1 μm to 500 μm or more. This includes thicknesses of at least 0.1 μm, at least 0.5 μm, at least 1 μm, at least 2 μm, at least 3 μm, at least 4 μm, at least 5 μm, at least 6 μm, at least 7 μm, at least 8 μm, at least 9 μm, at least 10 μm, at least 15 μm, or at least 20 μm, and/or no more than 500 μm, no more than 450 μm, no more than 400 μm, no more than 350 μm, no more than 300 μm, no more than 250 μm, no more than 200 μm, no more than 175 μm, no more than 150 μm, no more than 125 μm, no more than 100 μm, no more than 75 μm, no more than 50 μm, no more than 45 μm, no more than 40 μm, no more than 35 μm, no more than 30 μm, no more than 25 μm, no more than 20 μm, no more than 15 μm, no more than 10 μm, or no more than 5 μm. Exemplary ranges include from 0.1 μm to 200 μm, such as from 0.1 μm to 100 μm, from 0.1 µm to 75 µm, from 0.1 µm to 50 µm, from 0.1 µm to 40 µm, from 0.1 µm to 30 µm, from 0.1 µm to 25 µm, from 0.1 µm to 20 µm, from 0.1 µm to 15 µm, from 0.1 µm to 10 µm, from 0.1 µm to 7.5 µm, from 0.1 µm to 5 µm, from 1 µm to 100 µm, from 1 µm to 75 µm, from 1 µm to 50 µm, from 1 µm to 40 µm, from 1 µm to 30 µm, from 1 µm to 25 µm, from 1 µm to 20 µm, from 1 µm to 15 µm, from 1 µm to 10 µm, from 1 µm to 7.5 µm, or from 2.5 µm to 7.5 µm. However, as demonstrated in the Examples, below, smaller thickness for the tubes in some embodiments can confer advantageous properties to the present foams, such as increased specific energy absorption, increased specific peak stress, and/or increased specific modulus. In exemplary versions, the thickness of each tube is substantially uniform along its length, i.e., along the first direction. The term "substantially" is used to encompass small deviations in thickness along the tube length that may be unavoidable and are inherent to the synthetic techniques used to fabricate the present foams.

In various versions, the thickness of some or all of the tubes within a foam is at least 0.1 µm, at least 0.5 µm, at least 1 µm, at least 2 µm, at least 3 µm, at least 4 µm, at least 5 µm, at least 6 µm, at least 7 µm, at least 8 µm, at least 9 µm, at least 10 µm, at least 15 µm, or at least 20 µm, and/or no more than 500 µm, no more than 450 µm, no more than 400 µm, no more than 350 µm, no more than 300 µm, no more than 250 µm, no more than 200 µm, no more than 175 µm, no more than 150 µm, no more than 125 µm, no more than 100 µm, no more than 75 µm, no more than 50 µm, no more than 45 µm, no more than 40 µm, no more than 35 µm, no more than 30 µm, no more than 25 µm, no more than 20 µm, no more than 15 µm, no more than 10 µm, or no more than 5 µm. Exemplary ranges include from 0.1 µm to 200 µm, such as from 0.1 µm to 100 µm, from 0.1 µm to 75 µm, from 0.1 µm to 50 µm, from 0.1 µm to 40 µm, from 0.1 µm to 30 µm, from 0.1 µm to 25 µm, from 0.1 µm to 20 µm, from 0.1 µm to 15 µm, from 0.1 µm to 10 µm, from 0.1 µm to 7.5 µm, from 0.1 µm to 5 µm, from 1 µm to 100 µm, from 1 µm to 75 µm, from 1 µm to 50 µm, from 1 µm to 40 µm, from 1 µm to 30 µm, from 1 µm to 25 µm, from 1 µm to 20 µm, from 1 µm to 15 µm, from 1 µm to 10 µm, from 1 µm to 7.5 µm, or from 2.5 µm to 7.5 µm. Exemplary tubes having the above values include some or all of the first-hexagonal-unit tubes, some or all of the first boundary tubes, some or all of the second boundary tubes, some or all of the third boundary tubes, some or all of the fourth boundary tubes, and/or some or all of the constituent first-hexagonal-unit tubes in some or all of the first-hexagonal-unit tube sets.

In some versions, the first-hexagonal-unit tubes in one, some, or all of the first hexagonal units have the same thickness. In some versions, the innermost constituent first-hexagonal-unit tubes within one, some, or all of the first hexagonal units have the same thickness. In some versions, the constituent first-hexagonal-unit tubes within one, some, or all of the first hexagonal units have the same thickness. In some versions, some or all of the first boundary tubes have the same thickness length. In some versions, some or all of the second boundary tubes have the same thickness length. In some versions, some or all of the third boundary tubes have the same thickness length. In some versions, some or all of the fourth boundary tubes have the same thickness length.

In some versions, the diameter of the innermost constituent first-hexagonal-unit tube and the thickness of one or more of the constituent first-hexagonal-unit tubes in one or more of the first-hexagonal-unit tube sets can be fixed at certain ratios. Exemplary ratios include from 1:1 to 50:1, from 1:1 to 10:1, or from 2.5:1 to 7.5:1 (diameter:thickness).

Another dimensional characteristic is perimeter. "Perimeter" refers to a distance around the perimeter of the outer wall at a given cross-sectional section of a given tube. In some versions, the first-hexagonal-unit tubes in one, some, or all of the first hexagonal units have the same perimeter. In some versions, the innermost constituent first-hexagonal-unit tubes within one, some, or all of the first hexagonal units have the same perimeter. In some versions, the constituent first-hexagonal-unit tubes within one, some, or all of the first hexagonal units have the same perimeter. In some versions, some or all of the first boundary tubes have the same perimeter. In some versions, some or all of the second boundary tubes have the same perimeter. In some versions, some or all of the third boundary tubes have the same perimeter. In some versions, some or all of the fourth boundary tubes have the same perimeter.

Tube height (or length), the distance from one end of a given tube to its opposing end, taken along the first direction, is not particularly limited. However, tube height is generally significantly greater than the other dimensional characteristics of the tubes. Illustrative tube heights include at least 1 mm, at least 1.2 mm, at least 1.4 mm, at least 1.6 mm, at least 1.8 mm, at least 2.0 mm, or in a range of from 1 mm to 10 mm.

Figure 6B:
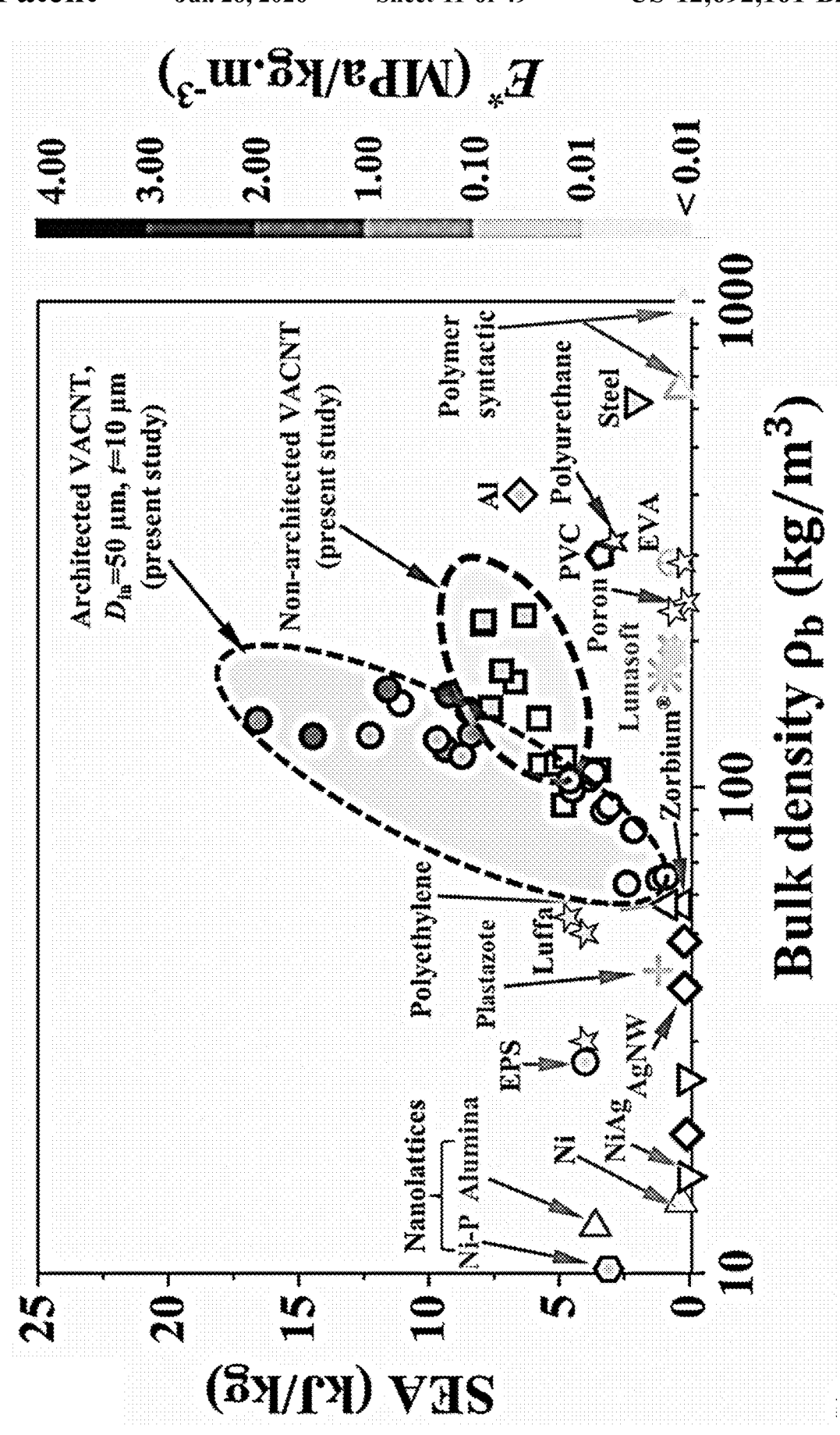
FIG. 6B shows SEA-bulk density-specific modulus property landscape of architected and non-architected VACNTs compared with other existing materials demonstrating synergistic property enhancement at low density for the present architected VACNTs.
Figure 6D:
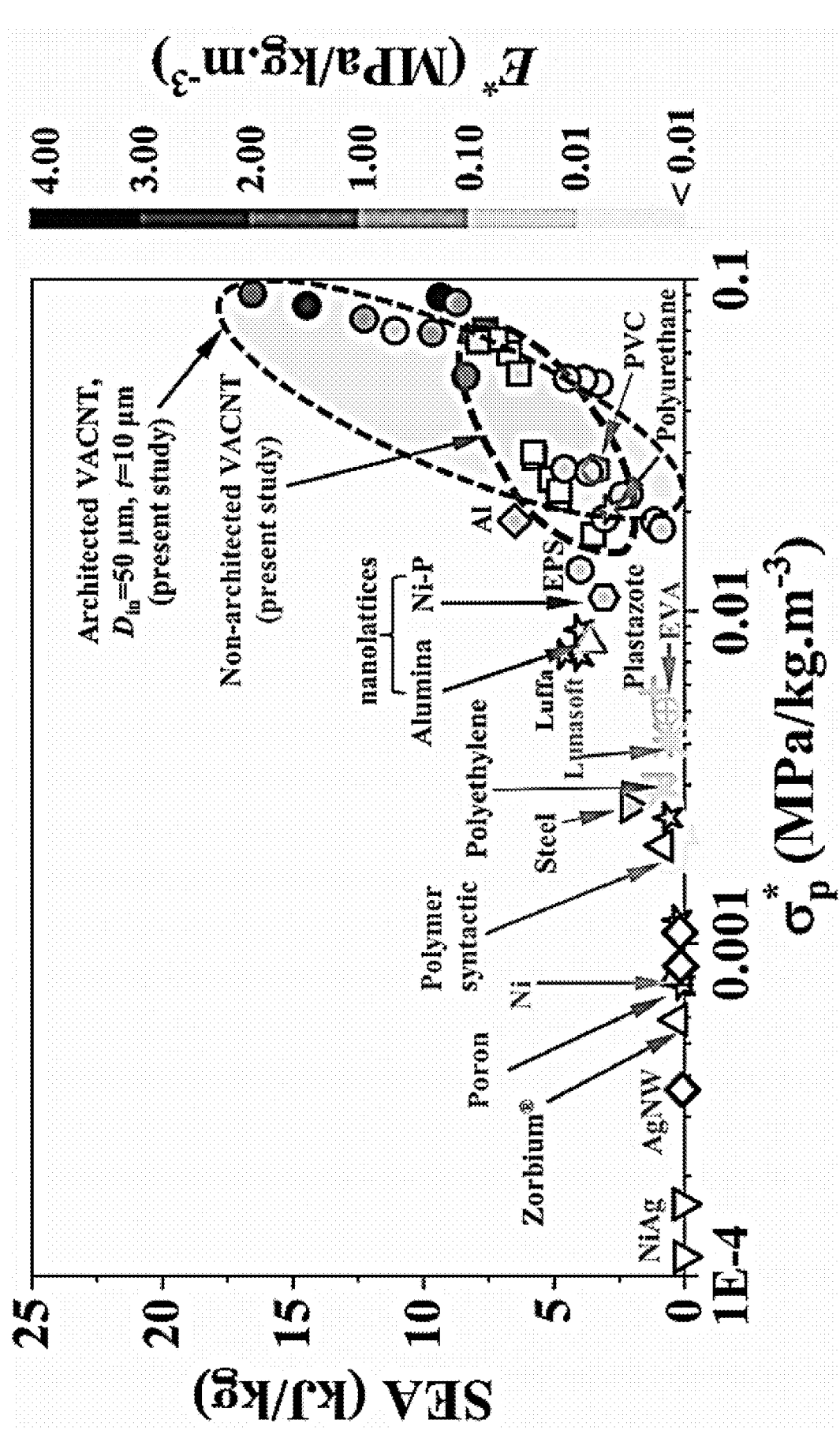
FIG. 6D shows SEA-specific compressive strength-specific modulus property landscape demonstrating synergistic property enhancement for the present architected VACNTs compared to all other materials.
Figure 26B:
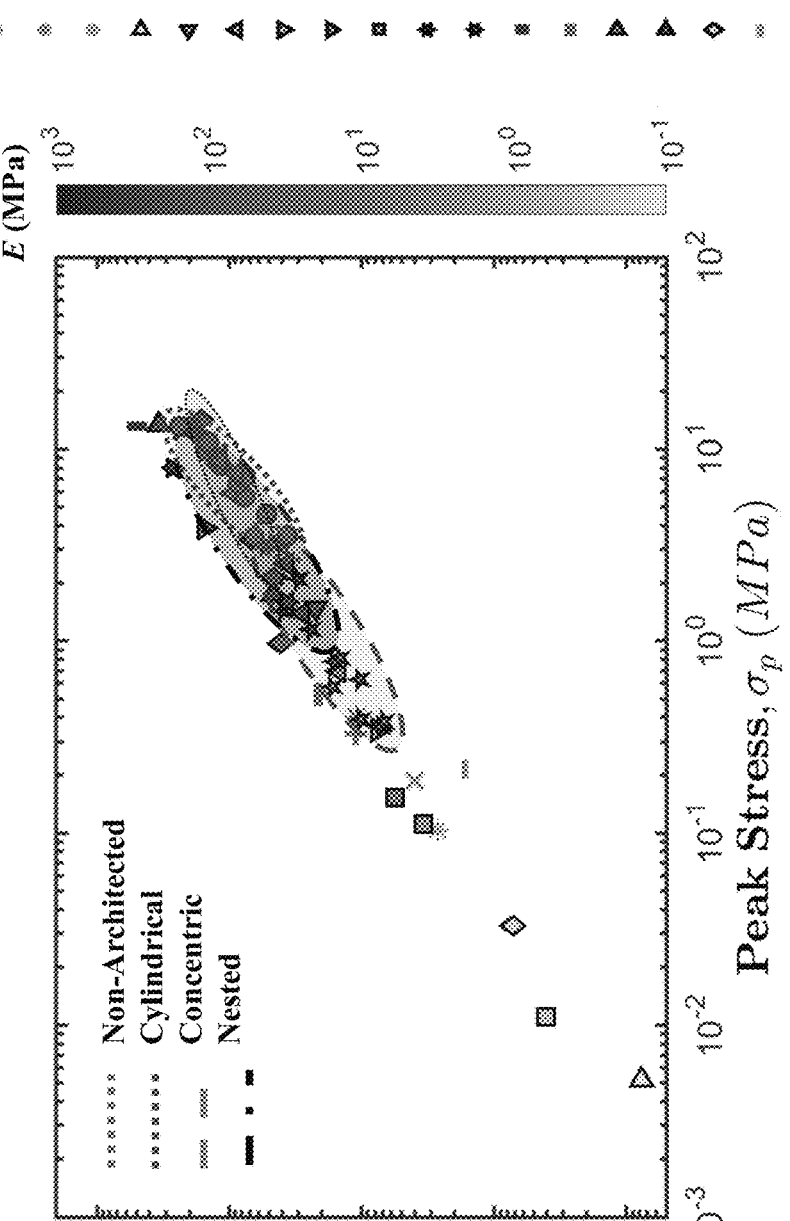
FIG. 26B shows a $W_{dis}$-compressive strength-modulus properties landscape of concentric cylindrically architected, cylindrically architected, nested architected, and non-architected VACNTs.

The present foams may be characterized by properties, including specific energy absorption (SEA), specific modulus ($E^*$), and specific peak stress ($\sigma_p^*$). These properties may be measured using the techniques and conditions described in Examples 1-3, below. As discussed above, desired values for each property and combinations thereof may be achieved by selecting certain tube arrangements and dimensional characteristics. As also noted above, it has been found that certain tube arrangements and dimensional characteristics are able to provide the foams with unexpectedly high values of SEA, $E^*$, and $\sigma_p^*$. In embodiments, the present foams are characterized by one or more of a SEA of at least 10 kJ/kg, at least 15 kJ/kg, at least 20 kJ/kg, or in a range of from 10 kJ/kg to 20 kJ/kg or 15 kJ/kg to 20 kJ/kg; a $E^*$ of at least 0.8 MPa/kg·m$^{-3}$, at least 1 MPa/kg·m$^{-3}$, at least 2 MPa/kg·m$^{-3}$, at least 3 MPa/kg·m$^{-3}$, or in a range of from 0.8 MPa/kg·m$^{-3}$ to 4 MPa/kg·m$^{-3}$, 1 MPa/kg·m$^{-3}$ to 4 MPa/kg·m$^{-3}$, or 1 MPa/kg·m$^{-3}$ to 3 MPa/kg·m$^{-3}$; a $\sigma_p^*$ of at least 0.7 MPa/kg·m$^{-3}$, at least 0.9 MPa/kg·m$^{-3}$, at least 1.0 MPa/kg·m$^{-3}$, or in a range of from 0.7 MPa/kg·m$^{-3}$ to 1.0 MPa/kg·m$^{-3}$ or 0.8 MPa/kg·m$^{-3}$ to 1.0 MPa/kg·m$^{-3}$. As shown in FIGS. 6D, 16B, and 26B, these values are remarkably and unexpectedly superior as compared to a variety of conventional foam materials.

The present foams may be further characterized by other properties, including thermal diffusivity ($\alpha$), specific heat capacity ($C_p$), and effective thermal conductivity ($k_{eff}$). These properties may be measured using the techniques and conditions described in Example 4, below. Similar to the mechanical properties of the present foams, desired values for each thermal property may be achieved by selecting certain tube arrangements and dimensional characteristics. It has been found that certain tube arrangements and dimensional characteristics are able to provide the foams with higher values of $\alpha$, $C_p$, and $k_{eff}$ as compared to a variety of conventional foam materials. Illustrative values are provided in Example 3, below. Regarding $k_{eff}$, embodiments of the present foams exhibit a desirable sub-linear scaling of $k_{eff}$ with density, including a power exponent 0.92 ($k_{eff} \propto \rho 0.92$). This sub-linear scaling law shows a unique advantage of the present foams where the density can be significantly reduced without degrading the $k_{eff}$.

In embodiments, the present foam comprises tubes arranged in a juxtaposed, hexagonal configuration as shown in FIG. 1B in which the tubes in the foam have the following dimensional characteristics: $D_m$ is 50 µm or less, including from 20 µm to 50 µm, from 20 µm to 40 µm, or from 20 µm to 30 µm; t is 10 µm or less, including from 0.1 µm to 10 µm, or from 0.1 µm to 5 µm; and g is 20 µm or less, including from 0 µm to 10 µm, from 0 µm to 5 µm, or 0 µm. It was unexpected that foams comprising tubes having smaller values of t exhibited improved properties.

In embodiments, the present foam comprises tubes arranged in a nested configuration as shown in any of FIGS. 9F-9H in which the tubes have the following dimensional characteristics: $D_{innermost}$ is 50 µm or less, including from 20 µm to 50 µm, from 20 µm to 40 µm, or from 20 µm to 30 µm; t is 10 µm or less, including from 0.1 µm to 10 µm, or from 0.1 µm to 5 µm; g is 20 µm or less, including from 0 µm to 10 µm, from 0 µm to 5 µm, or 0 µm; $g_{cc}$ is 20 µm or less, including from 0.1 µm to 10 µm, or from 0.1 µm to 5 µm; and the number of constituent first-hexagonal-unit tubes is from 2 to 6, including from 2 to 4 or from 2 to 3.0 As demonstrated in Example 2, below, the tunability observed in the deformation modality (from local-shell buckling at smaller $g_{cc}$ to global column buckling at larger $g_{cc}$) was unexpected.

In embodiments, the present foam comprises tubes arranged in a nested configuration as shown in any of FIGS. 21D-21F in which the tubes of the first hexagonal units have the following dimensional characteristics: $D_{in}$ is 50 µin or less, including from 20 µin to 50 µm, from 20 µin to 40 µm, or from 20 µin to 30 µm; t is 10 µin or less, including from 0.1 µin to 10 µm, or from 0.1 µin to 5 µm; g is 20 µin or less, including from 0 µin to 10 µm, from 0 µin to 5 µm, or 0 µm; and the number of sets of boundary tubes (i.e., hierarchical level k) in the foam is from 1 to 3, from 1 to 2, or 1. Regarding the boundary tubes, the gaps between neighboring boundary tubes in the foam may be within the ranges of g provided above, including 0 µm; the gaps between boundary tubes and neighboring first-hexagonal-unit tubes in the foam may be within the ranges of g provided above, including 0 µm; and the thicknesses of boundary tubes in the foam may be within the ranges of t provided above.

Methods of the making the present foams can comprise a first step of preparing a solid substrate for growth of carbon nanotubes in a pattern substantially matching a cross-sectional pattern of the tubes. The methods can further comprise a second step of depositing carbon on the solid substrate to grow carbon nanotubes having the cross-sectional pattern, whereby the growth occurs in the first direction. The solid substrate can comprise a silicon wafer or other solid substrate suitable for growing carbon nanotubes. Patterning the substrate can comprise activating areas for carbon nanotube growth in accordance with the pattern intended for growth or masking areas of the substrate around the pattern intended for growth. Depositing the carbon can comprise floating catalyst thermal chemical vapor deposition (tCVD) or other methods known in the art. In cases in which the gap between tubes is 0 µm and the walls of respective tubes are in contact or entangled with each other, the solid substrate can be removed from the tubes. In such cases, the foam remains intact by virtue of the entanglement of and van der Waal attractive forces between carbon nanotubes from which tube walls are composed. Exemplary methods are described in the following Examples. Various solid substrates, patterning methods, and carbon deposition methods for growing carbon nanotubes are known in the art. See, e.g., U.S. Pat. Nos.

7,473,411 B2, 8,202,505 B2, 9,499,903 B2, 9,616,635 B2, and US 2017/0029274 A1, among others.

The elements and method steps described herein can be used in any combination whether explicitly described or not.

The present foams may be used in any application in which mechanically strong foams are generally used. This includes incorporating any of the present foams into articles of manufacture configured to cover a least a portion of (including contain) an object and to attenuate an external force acting on the object. Such external forces may originate from impacts of any kind with external bodies of any kind in any environment. In embodiments, the impact is an oblique impact generating both (e.g., simultaneously) linear and rotational accelerations. In embodiments, the object is a human (e.g., a human head). Illustrative articles of manufacture include, e.g., helmets, vests, armor, shields, etc. for humans; packaging for fragile objects such as electronics; structural components of buildings, vehicles, etc. such as walls, doors, windows, etc. In such articles of manufacture, any of the present foams may be used as a component thereof, e.g., as a liner or a sublayer.

Figures 27A, 27B, 27C:
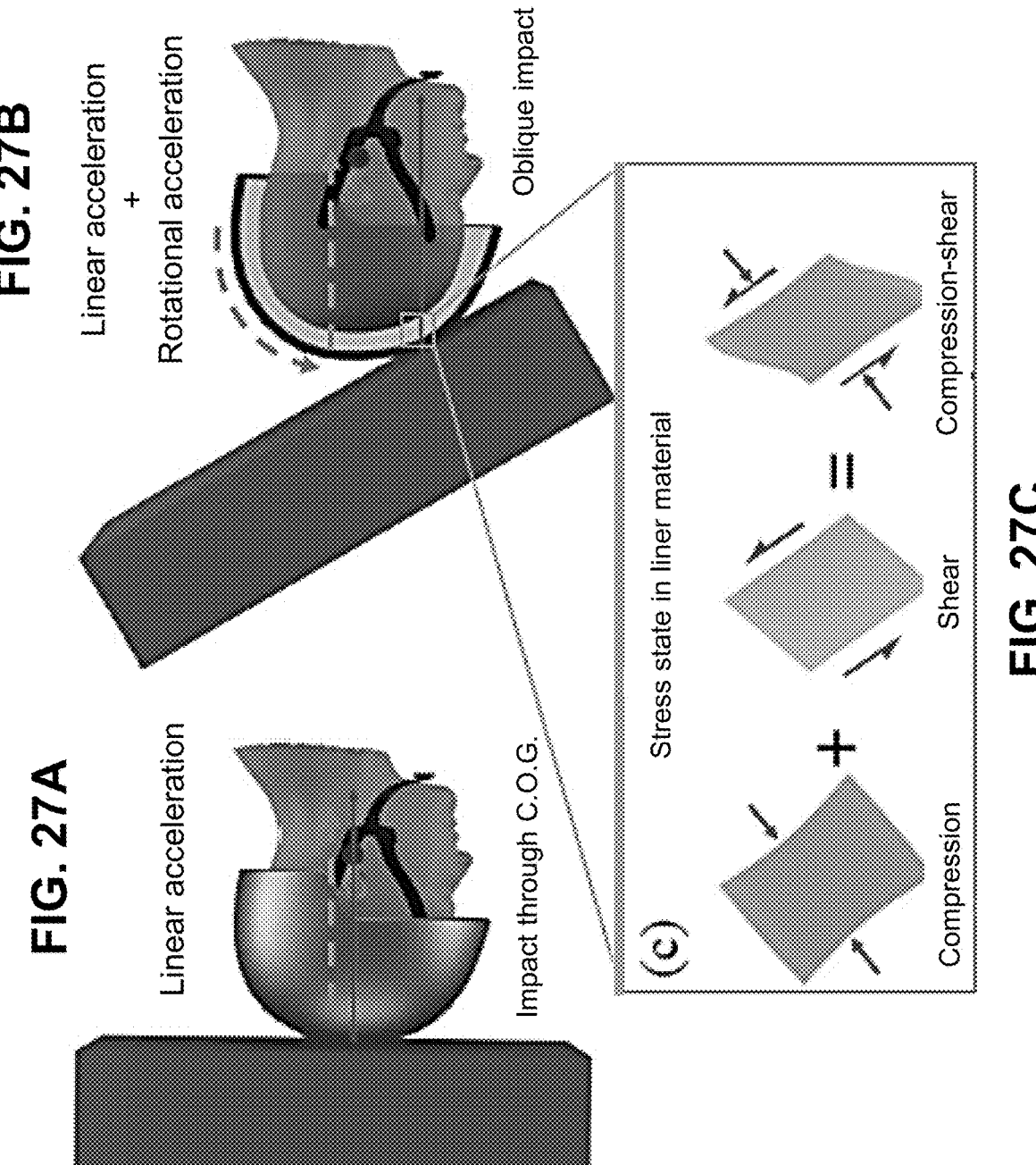
FIGS. 27A-27C illustrate head helmet impact kinetics and deformations induced on a protective liner in the helmet. The liner may comprise or consist of any of the present foams.

By way of example, a helmet (into which any of the present foams may be incorporated, e.g., as a liner), is shown in FIG. 27A, illustrating the use of the helmet to contain and protect a human head from impacts with external bodies (e.g., a wall) by attenuating the external force acting on the human head due to the impact. The present foams exhibiting the desirable mechanical and thermal properties described above are particularly advantageous in attenuating both linear and rotational accelerations from oblique impacts, e.g., by accommodating large shear strains at low shear stress levels under large compression-shear loadings. In particular, the configuration of at least some embodiments of the present forms enables them to attenuate linear and rotational accelerations from oblique impacts. This is critical to preventing traumatic brain injury from such impacts.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

As used herein, "one or more" encompasses "all."

As used herein, "same" means "substantially the same" rather than perfectly the same. As noted above, the term "substantially" allows for small deviations in the relevant characteristic which may be unavoidable and are inherent to the synthetic techniques used to fabricate the present foams Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

It is understood that the present disclosure is not confined to the particular construction and arrangement of parts herein illustrated and described, but embraces such modified forms thereof as come within the scope of the claims.

EXAMPLES

Example 1

Superior Mechanical Properties by Exploiting Size-Effects and Multiscale Interactions in Hierarchically Architected Foams Introduction In this Example, we report synergistic improvement in specific elastic modulus, specific energy absorption, and specific compressive strength in architected vertically aligned carbon nanotube (VACNT) foams. The VACNT foams have a hierarchical structure with feature sizes ranging from a few angstroms to several millimeters. Individual carbon nanotubes have a multiwalled structure at the nanoscale which assemble into an entangled forest-like morphology in microscale that further forms into vertically aligned bundles in mesoscale, resulting in collective sequentially progressive buckling under compressive loading and exhibit bulk strain recovery of over 80%. They also exhibit superior thermal stability of their mechanical properties from −196 to 1000° C. In this Example, we introduced an additional level of structural hierarchy in our VACNT samples through an architected hexagonally packed lattice of hollow cylinders in mesoscale (on the order of 100 μm) (FIGS. 1A-1E). Hollow cylinders provide additional structural rigidity to the samples and the hexagonal pattern allows close packing that enhances interactions among the neighboring cylinders. We design, synthesize, and analyze multiple samples by varying and intermixing the three geometrical parameters—the inner diameter of cylinders ($D_{in}$), the thickness of cylinders (t), and the gap between the outer walls of neighboring cylinders (g).

To achieve simultaneous improvement in mechanical properties of the architected VACNT samples, we used a full factorial design of experiments (DoE) approach with $D_{in}$, t, and g as our design variables. In contrast to the one variable at a time (OVAT) approach, where changing one variable leaves the effect of other variables and their interconnectivity unforeseen, full factorial design allows more comprehensive multivariable study and reveals the correlation between design variables. We choose specific energy absorption (SEA), specific modulus (E*), and specific peak stress $$(\sigma_p^*)$$

calculated from quasistatic stress-strain curve as our response variables (objectives). We observe synergistic improvement in SEA, E*, and $$\sigma_p^*$$

owing to morphology changes due to geometrically-confined CNTs growth (size effects), lateral interactions among adjacent cylinders, and the relationship among design variables revealed by fitted Analysis of Variance (ANOVA) models. The resulting materials transcend the traditional requirements for protective applications and demonstrates a design template for architected materials to achieve desired properties.

Architected Design

We adopt a full factorial design of experiments (DoE) approach to optimize the mechanical performance of architected VACNT foams as a function of the geometric parameters. FIGS. 1A-1E show electron microscopy images of an architected VACNT foam sample with hexagonal close-packed cylindrical architecture synthesized in a floating-catalyst chemical vapor deposition (CVD) process. The multilevel hierarchy is apparent from the continuum-like appearance of structural features at each subsequently larger length scale—a distinction that separates hierarchical materials from conventional materials. To synthesize these samples, we used a floating catalyst CVD method to grow nearly vertically aligned bundles of MWCNTs (FIGS. 1D-1E) on a photolithographically pre-patterned substrate (See Methods). Synthesized samples reached a bulk height of ~1.6 mm (FIG. 1A) with a mesoscale cylindrical architecture having cross-sectional dimensions defined by the pre-patterned substrate.

Figure 2A:
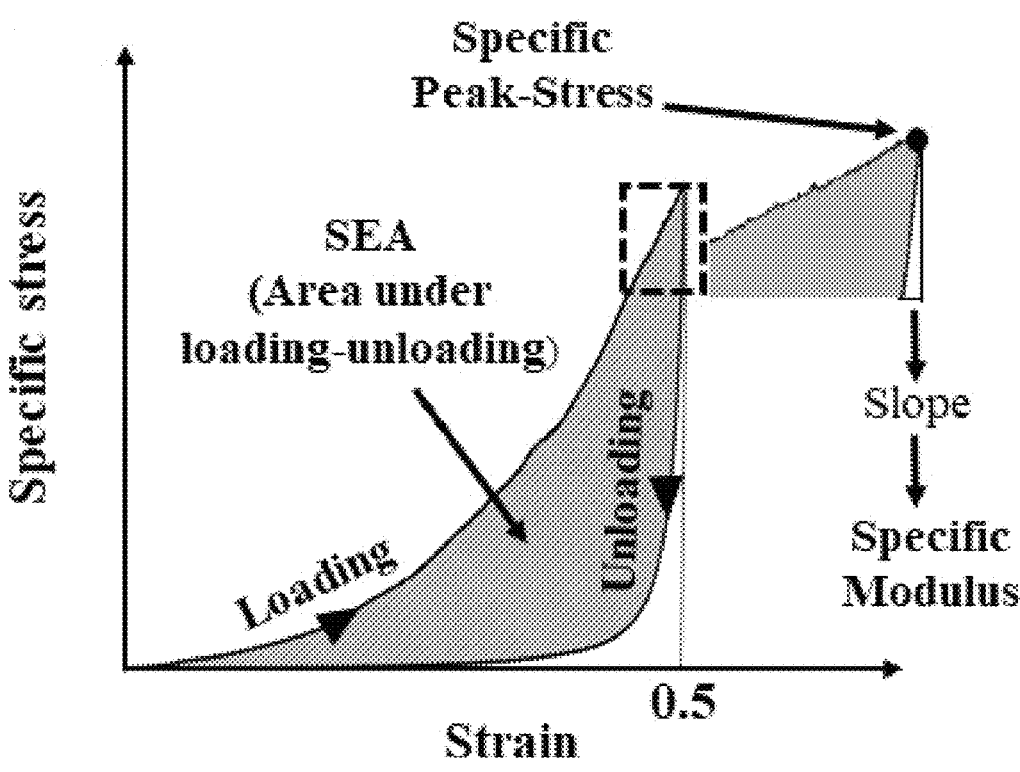
FIG. 2A shows the specific stress-strain response of a VACNT sample and mechanical properties—SEA, $\sigma_p^*$, and $E^*$.
Figure 2B:
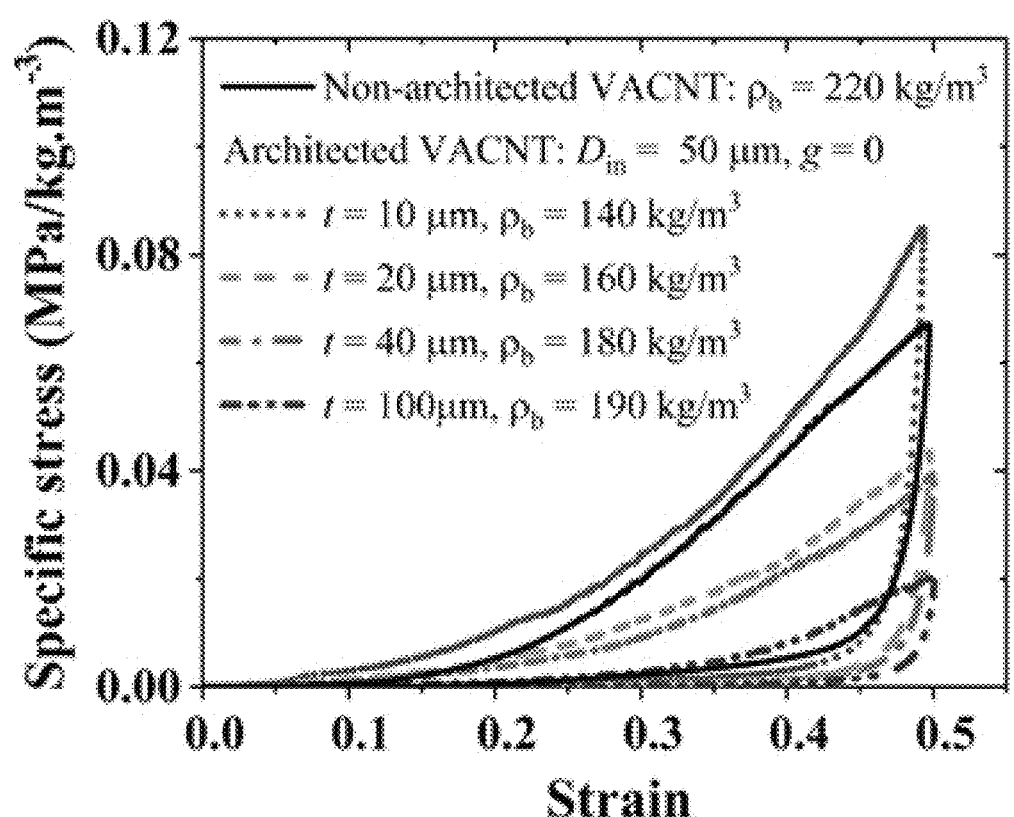
FIG. 2B shows the specific stress-strain response as a function of t for $D_{in}50$ μm and g=0 as compared to that of a non-architected VACNT sample.
Figure 2C:
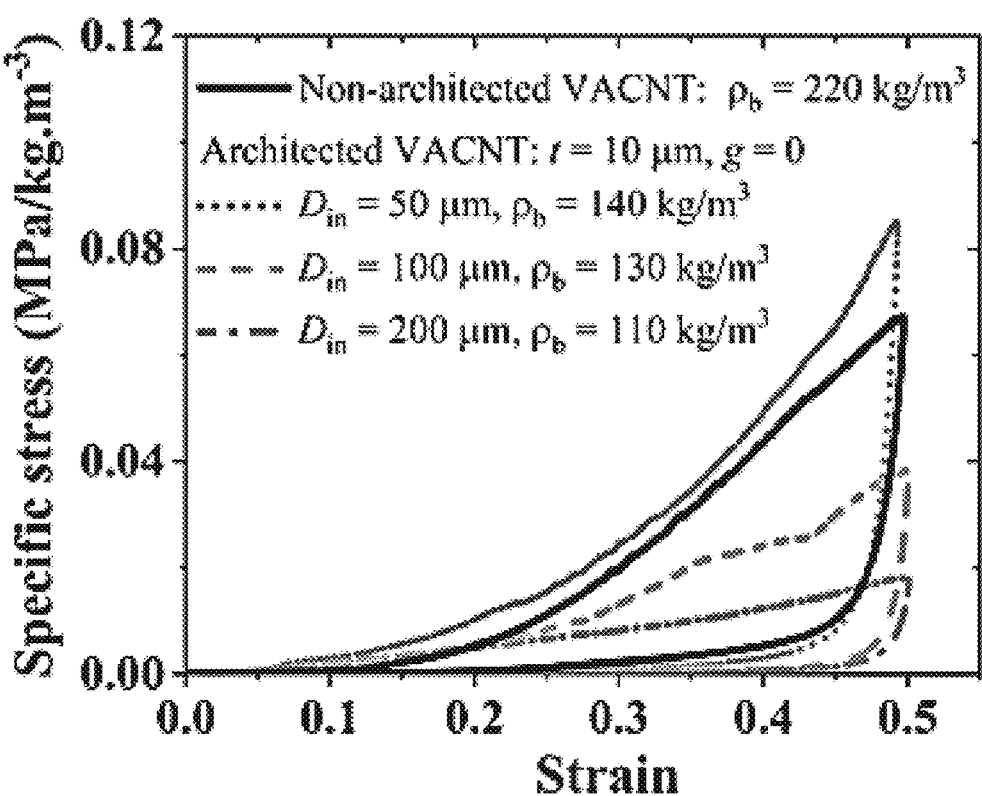
FIG. 2C shows specific stress-strain response as a function of $D_{in}$ for t=10 μm and g=0 as compared to that of a non-architected VACNT sample.
Figure 2D:
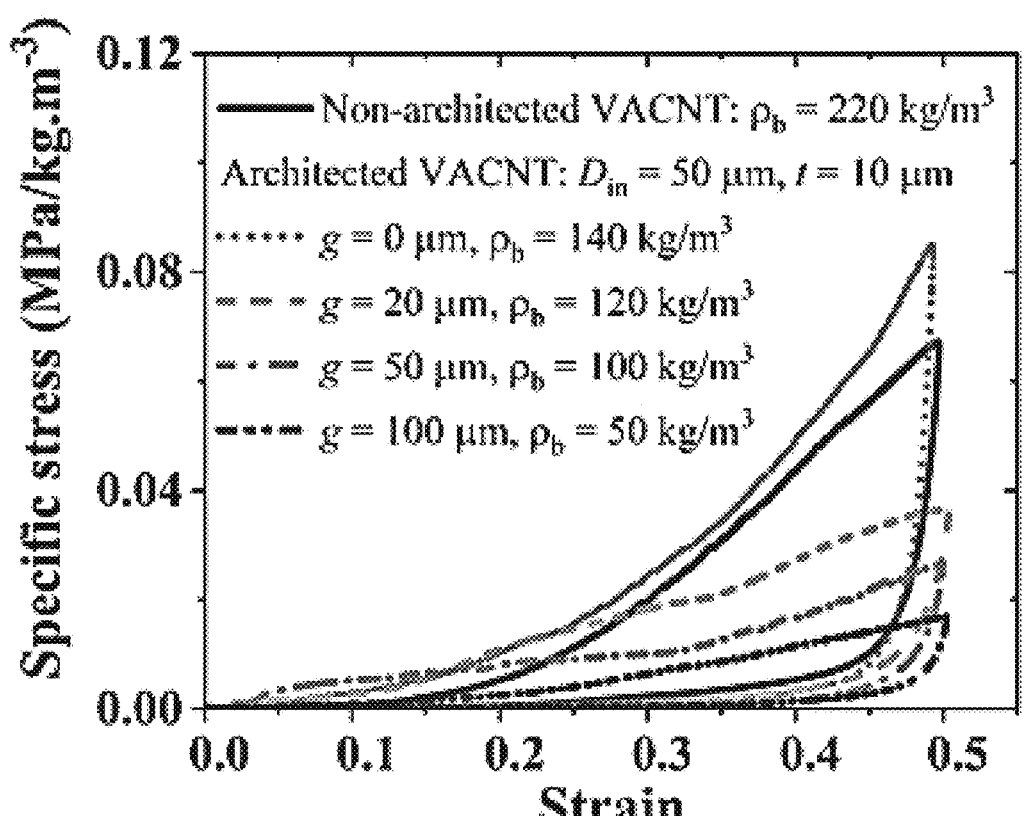
FIG. 2D shows specific stress-strain response as a function of g for $D_{in}50$ μm and t=10 μm as compared to that of a non-architected VACNT sample. Stress-strain responses without density normalization are given in FIGS. 7A-7C.

The design variables we adopted for our DoE study—internal diameter ($D_{in}$), thickness (t), and gap between cylinders (g) are shown in FIG. 1C. We synthesized 180 samples with three in each of the 60 different combinations of $D_{in}$, t, and g listed in Table 1. The three tested samples in each unique combination of design variables allow us to characterize any variability in the microstructure of CNTs within cylinders resulting from the CVD synthesis process and mechanical testing. These variations are represented by error bars in the data presented in figures. Multiple levels (Table 1) considered for each design variable allow us to study both their individual and combined effects on the stress-strain responses and associated mechanical properties. We performed cyclic quasi-static (strain rate: 0.01 $sec^{-1}$) compressions of up to 50% strain on all samples using an Instron Electropulse E3000 apparatus to characterize the stress-strain behavior. FIG. 2A shows a typical stress-strain response with energy dissipated given by the hysteresis area enclosed by the loading-unloading curves. Protective applications require high specific properties, i.e., higher properties at low densities, so we normalized stress by the bulk density ($\rho_b$) of the sample to measure the specific stress response with compressive strain (FIGS. 2A-2D). We pursued three functional objectives (or response variables) to simultaneously maximize—specific energy absorption (SEA), specific peak stress $$(\sigma_p^*)$$

and specific modulus (E*)—which are measured from the specific stress-strain curve (FIGS. 2A-2D). We measure the SEA from the specific stress-strain hysteresis corresponding to the cyclic compression up to 50% strain, which is much less than the typical densification strain (~65-70%) in VACNTs.

$$\sigma_p^*$$

indicates the specific compressive stress corresponding to the 50% strain. It should be noted that the compressive trength—the stress at which the material permanently fails—of the VACNT foams is much higher as they have the ability to withstand and near completely recover from 80% or higher strains. E* denotes the specific modulus typically measured from the elastic unloading of the foam-like materials. We evaluate E* by calculating the average slope of the unloading curve for the first 30% of unloading in stress.

TABLE 1

| Design variables and their different levels. | |
| --- | --- |
| Design Variables | Levels |
| $D_{in}$ (μm) | 50, 100, 200 |
| t (μm) | 10, 20, 40, 100 |
| g (μm) | 0, 20, 50, 100, 200 |

Methods

First, a standard 100 mm diameter (100 crystal orientation) p-type silicon wafer was spin-coated with 10 microns thick S1813 photoresist at 3000 rpm for 30 sec and pre-baked on a hot plate at 110° C. for 45 sec to remove any solvents. After spin coating, the wafer was partially diced through the thickness (30% of the thickness of the wafer) into 5 mm×5 mm squares. Next, the diced wafer was exposed to ultraviolet (UV) light through a chrome/soda-lime photomask to transfer the micropattern. The photomask was designed with cylindrical micropatterns of various combinations of $D_{in}$, t, and g and manufactured by Photo Sciences (Torrance, CA). After 8 sec of exposure with 405 nm UV light (exposure dose of 10 mW/cm$^2$), the unexposed photoresist was removed in the 30 sec MF321 developer bath. After the developer bath, a 20 nm chromium thin film was evaporated using a metal evaporator. The remaining photoresist (exposed to UV light previously) was removed in an acetone bath, leaving a chromium film on the substrate, which prevented the growth of CNTs in the designated areas on the substrate (inverse of the architecture).

We synthesized architected VACNTs on diced patterned substrates using a floating catalyst thermal chemical vapor deposition (tCVD) process. We used a syringe pump to inject a feedstock solution of ferrocene (catalyst precursor) in toluene (carbon source) ([w/v]=0.01 g/ml) at a rate of 0.8 ml/min into a furnace tube maintained at a temperature of 827° C. (1100K). A mixture of argon (95%) and hydrogen (5%) flowing at 800 sccm carried toluene vapors inside the furnace, where nanotubes grew on the patterned silicon wafer. After synthesis, we removed the architected VACNT film from the furnace and cut it into squares of 5 mm×5 mm—each square having an architecture with a specific combination of $D_{in}$, t, and g—for mechanical characterization.

Non-architected VACNTs were also synthesized using the same tCVD process using unpatterned substrates. In non-architected VACNTs, the individual CNTs are free to grow across the entire surface of the unpatterned substrate, resulting in a continuous forest of entangled, but substantially vertically aligned, CNTs (see FIG. 20A).

Results

When compressed, VACNT bundles start to buckle in the bottom region (less dense and less stiff region close to the substrate) and then the buckles sequentially propagate upwards, causing local densification and nonlinear stiffening—a response typically described by a series of bi-stable elements consisting of an unstable phase in between or by hardening-softening-hardening plasticity. This progressive sequential buckling response in VACNTs synthesized by floating-catalyst CVD is strongly governed by the mass density gradient across the height of the samples resulting from synthesis. That is, the evolution of the entangled morphology and increasing CNT population by continuous nucleation of new CNTs as the sample grows lead to the local mass density to increase from the substrate towards the top of the sample. Upon unloading, the sample recovers almost completely, exhibiting an enormous amount of hysteretic energy dissipation, ~83% of total energy, corresponding to a damping capacity of 83%. In our architected VACNT samples, the damping capacity of ~83% persists for all combinations of $D_{in}$, t, and g, which suggests that the bulk mechanical performance of VACNT foams can be enhanced by introducing the mesoscale architecture without affecting the damping capacity.

Figures 3A, 3B, 3C:
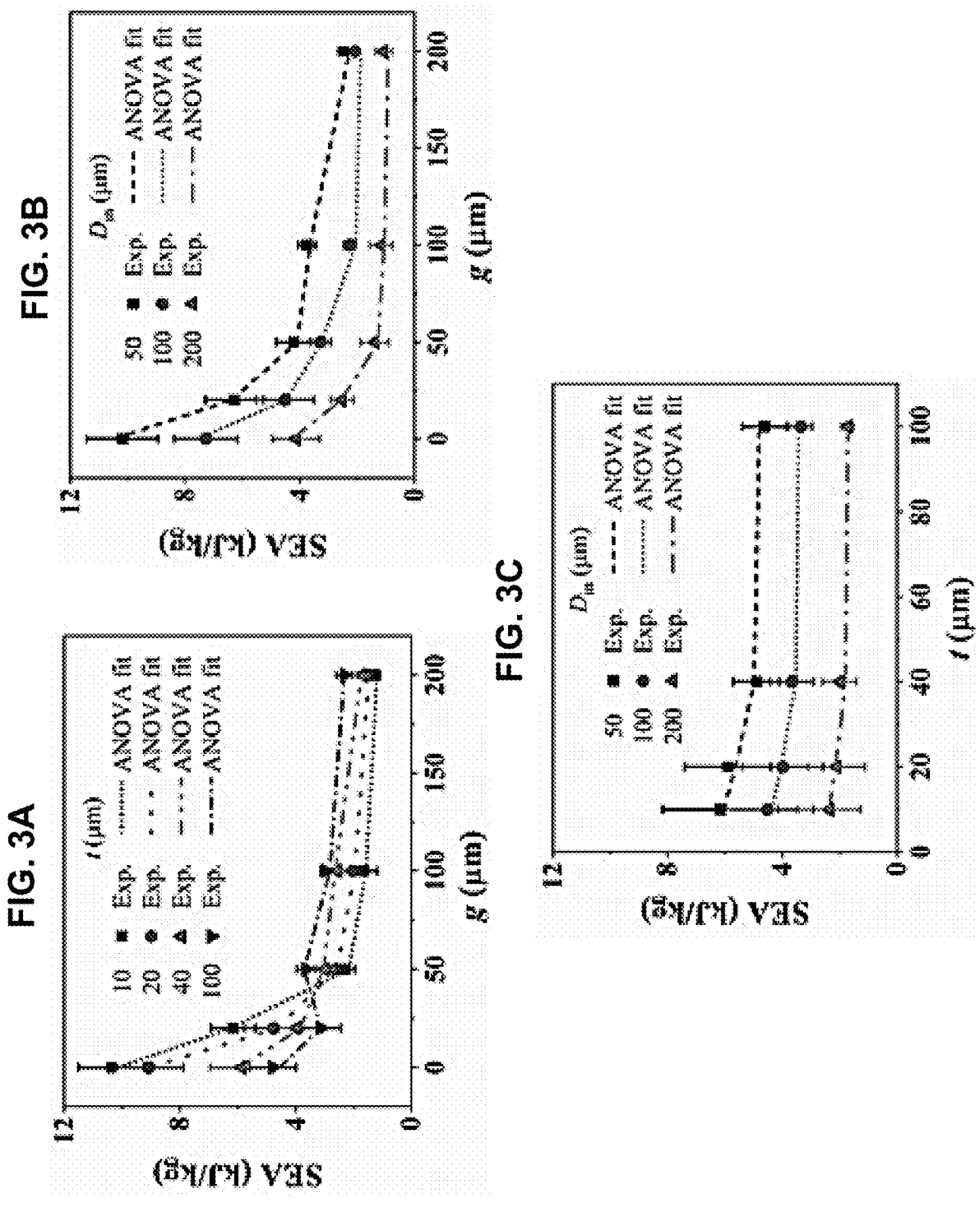
FIGS. 3A-3C show the combined effects of design variables t:g (FIG. 3A), $D_{in}$:g (FIG. 3B), and $D_{in}$:t (FIG. 3C) on the response variable SEA.

Following the quasistatic compression experiments, we modeled the experimental data using the Analysis of Variance (ANOVA) method to identify the most significant design variables and their interactions. From FIGS. 2B-2D, it is clear that individual design variables significantly affect the quasistatic specific stress-strain response of the VACNT foam sample. It is noteworthy that the SEA, $\sigma^*_p$, and E* of the architected VACNT foam with $D_{in}$=50 μm, t=10 μm, and g=0 is even higher than non-architected VACNTs. In FIGS. 3A-3C, we plot the SEA to show the effects of different combinations of design variables (in each interaction plot, SEA values are averaged over the third design variable). For lower values of gap, it is noticeable from the region to the left of the horizontal dashed line in FIG. 3A that SEA is decreasing with an increase in thickness. However, as the g increases above g>40 μm, the trend reverses such that higher SEA occurs at higher thicknesses. This interaction between gap and thickness (t:g interaction) for SEA persists for all levels of $D_{in}$. This trend reversal is arising from competing effects between CNT morphology changes resulting from the size-confined CNT growth (depending on the t) and lateral interactions among adjacent cylinders (depending on both t and g).

To elucidate this intriguing effect, we calculate the intrinsic density ($\rho_i$) of architected VACNT foams by dividing the measured bulk density ($\rho_b$) by the fill factor of the cylindrical pattern $$\left(\rho_i = \frac{\rho_b}{V_f}\right).$$

Figures 4A, 4B, 4C:
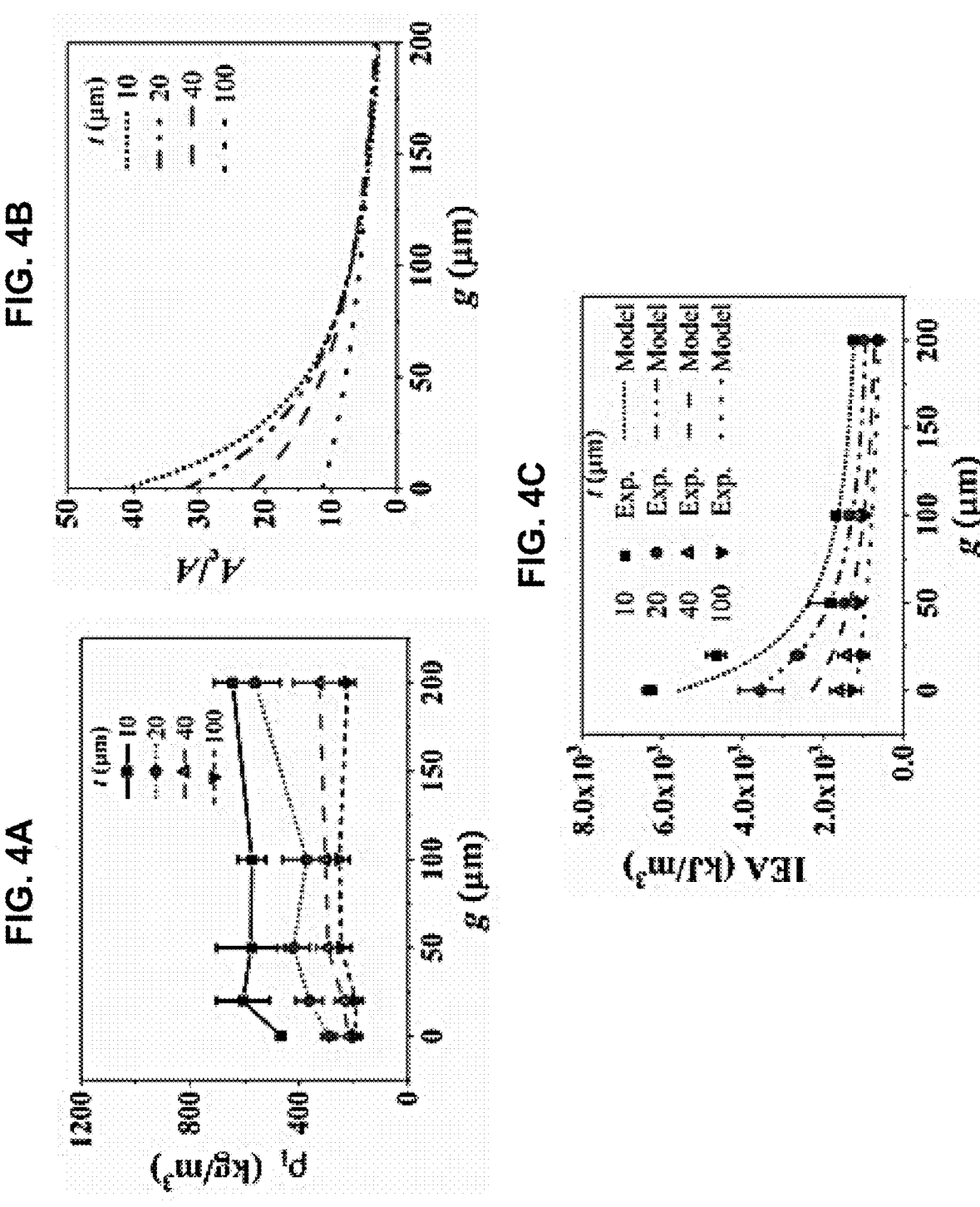
FIG. 4A shows intrinsic density of architected VACNT foams as a function of thickness (t) and gap (g) for $D_{in}50$ μm.
FIG. 4B shows normalized total outer curved surface area of cylinders as a function of gap and thickness for $D_{in}$=50 μm.
FIG. 4C shows intrinsic energy absorption (IEA) as a function of thickness and gap for $D_{in}$=50 μm.
Figure 4J:
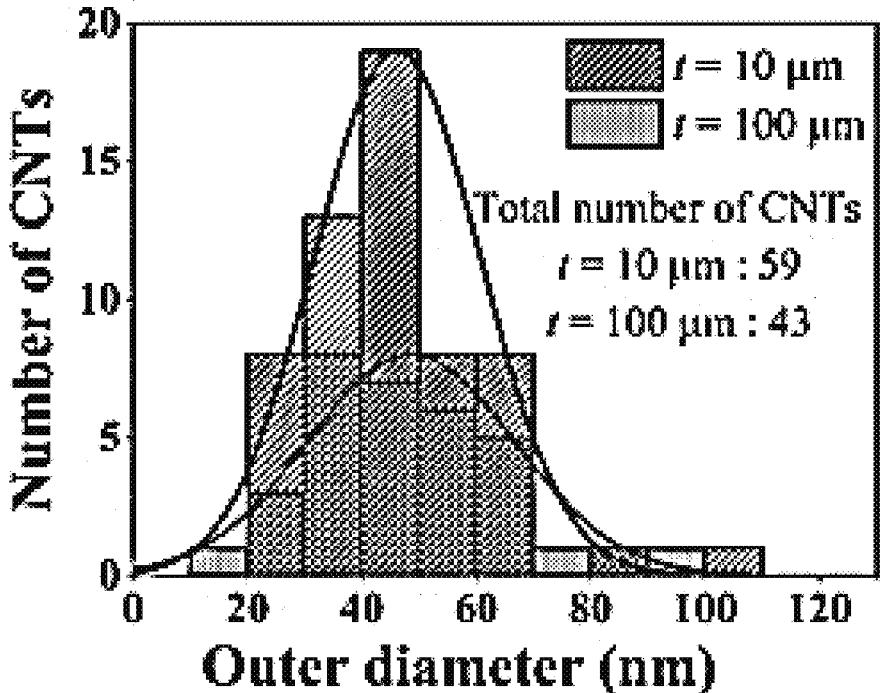
FIG. 4J shows the distribution of outer diameters of individual MWCNTs measured from SEM images.

$\rho_i$ characterizes the mass density of CNTs within the cylinder wall region i.e., excluding the volume associated with hollow and gap regions. Intrinsic density increases with decreasing thickness, signifying the emergence of a size effect. FIG. 4A shows the effect of both gap and thickness on $\rho_i$. While the gap does not have a significant effect, the effect of thickness on $\rho_i$ is clearly evident. Examining the SEM images of samples for two extreme thickness values, i.e., t=10 μm and t=100 μm, a clear difference in morphology is seen (FIGS. 4D-4I). For t=10 μm, the CNTs are more vertically aligned and packed more densely due to size-confined CVD growth, resulting in higher intrinsic density (FIGS. 4D-4F). For t=100 μm, CNTs are wavier and less dense (FIGS. 4G-4I). While the average diameter of individual CNTs is similar for t=100 μm and t=10 μm (FIG. 4J), the number density is much higher for t=10 μm, resulting in higher intrinsic density.

In addition to the improvement of properties from aforementioned size-effects, we further enhance the properties by exploiting increased lateral interactions among adjacent mesoscale cylinders. For a particular design thickness, dramatic increase in SEA at smaller gaps is a consequence of these enhanced lateral interactions among adjacent cylinders (FIG. 3A). They also result in an overall increase of specific stress due to constrained deformation of individual cylinders. We hypothesize that the total amount of lateral interactions between cylinders must be proportional to the total cylindrical outer surface area ($A_c$). In FIG. 4B, we plot $$\frac{A_c}{A}$$

(cylindrical outer surface area normalized by the total cross-sectional area of the sample i.e., A=5 mm×5 mm) as a function of gap for different values of thickness. To model the combined effects of intrinsic density (arising from size-effect) and lateral interactions, we derive the following expression for SEA, $$SEA = \frac{1}{\rho_i}\delta\left[\underbrace{2\rho_i}_{Morphology} + \underbrace{30.29\left(\frac{A_c}{A}\right)^{1.125}}_{Lateral\ Interactions}\right] \quad (1)$$

Intrinsic energy absorption (IEA)—energy dissipated (in kJ) normalized by the volume of CNTs (in m³) (i.e., volume of architected VACNT foam after excluding the volume of empty spaces) is given as, $$IEA = SEA \times \rho_i = \delta\left[2\rho_i + 30.29\left(\frac{A_c}{A}\right)^{1.125}\right] \quad (2)$$

Where δ≈0.83±0.04 is the damping capacity (ratio of hysteretic energy dissipated in the loading-unloading cycle to the total work done on the material during loading), which we observed to be almost constant with changing architecture. Energy dissipation in VACNT foams is a property believed to be encrypted in the atomic scale frictional interactions between nanotubes. Thus, damping capacity does not change with mesoscale architecture. The intrinsic density $\rho_i$ is only a function of thickness, whereas $A_c$ is a function of both thickness and gap (for constant $D_{in}$). For g→0, the contribution of the $$\frac{A_c}{A}$$

term becomes much larger than $\rho_i$, causing higher SEA to occur at lesser thickness (FIG. 4B). However, for g>100 μm, the value of $$\frac{A_c}{A}$$

becomes almost constant (FIG. 4B), and the effect of $\rho_i$ dominates, causing the trend reversal of SEA seen in FIG. 3A. In FIG. 4C, a good agreement is observed between the experimental data and our model for IEA (Eq. 2). Also, there is no trend reversal for IEA, indicating the critical role of intrinsic density in making the order switch for SEA.

The intrinsic density and lateral interactions also alter the effect of the D/t ratio—a dimensionless parameter commonly used to evaluate the load carrying capacity of hollow cylindrical structures towards crashworthy applications. D/t ratio governs the deformation mechanism for compression of cylinders and consequently affects the specific energy absorption. SEA has been observed to decrease with increasing D/t ratio for compression of metallic cylinders, fiber reinforced composite cylinders, and cylinders embedded in a foam matrix. In our samples, when the cylinders are far apart (g>40 μm), the SEA also increases with increasing thickness (decreasing D/t ratio) (FIG. 3A). However, SEA stays almost constant with the D/t ratio when cylinders are tightly packed and undergoing lateral interactions (plot not shown).

While the parameter interaction effects of t:g is apparent from FIG. 3A, the other potential parameter interactions ($D_{in}$:m:g, $D_{in}$:t and $D_{in}$:t:g) are not obvious from FIGS. 3B and 3C. To evaluate the significance of these parameter interactions, we devise a best fit ANOVA model for SEA with significance of terms adjudged by their associated p-values. A small p-value (typically less than 0.05) implies that the corresponding parameter interaction term significantly influences the response variable (SEA). As parsimonious models increase the ease of interpretation, in this Example we drop lower-level parameter interaction terms if higher level parameter interaction terms are significant. Further, residuals from the fitted model must pass the diagnosis test of normality, homoscedasticity, and non-correlation. It was observed that residuals from simple ANOVA models failed to pass the diagnosis tests and thus appropriate transformations were applied over the response variable using the renowned Box-Cox transformation. The transformation applied over the response variable helps it to adhere to the assumptions of ANOVA models (plot not shown). Our ANOVA model for response variable SEA is given in Eq. (3).

$$\frac{SEA^{0.18}-1}{0.18} = -0.118 + \alpha_{g_j:t_k} + \beta_{D_{in_i}:g_j} \quad (3)$$

TABLE 2

| ANOVA results for SEA. | | | | |
|---|---|---|---|---|
| Source | Sum Square | Df | F | p - value |
| t:g | 18.998 | 15 | 22.462 | $2.2 \times 10^{-16}$ |
| $D_{in}$:g | 125.639 | 14 | 159.158 | $2.2 \times 10^{-16}$ |

In the above ANOVA model for SEA, the parameter interaction $D_{in}$:g also came out to be significant along with t:g (Table 3). In contrast to the t:g, $D_{in}$:g has no trend reversal (FIG. 3B). However, it can be noticed that at g=0, the SEA values are more spaced apart for different $D_{in}$ than for g=200 μm, which could be the reason why $D_{in}$:g parameter interaction is also significant. The p-values for t:g and $D_{in}$:g are listed in Table 2.

FIGS. 5A-5F show parameter interaction plots for response variables—specific peak stress ($\sigma^*_p$) and specific modulus (E*). The parameter interaction between thickness and gap is very apparent and shows order switching, similar to that of SEA (FIGS. 5A and 5D). To check the significance of other parameter interactions, we use a similar strategy by formulating a simplified best fit ANOVA model with only higher-level parameter interaction terms. Analysis of residuals from simple ANOVA fits for E* and $$\sigma_p^*$$

also failed to pass the model diagnosis tests. This implies the need for appropriate transformations of response variables to better adhere to the assumptions of ANOVA model. In Eq. (4), we show the final ANOVA model for E*. The model implies that a third order parameter interaction $D_{in}$:g:t is significant and thus all lower level parameter interaction terms are dropped. The reason for significance of third order parameter interaction could be traced to by looking at FIG. 5C, which implies high variation in E* at lower levels of t with respect to $D_{in}$. The best fit ANOVA model for $$\sigma_p^*$$

is given in Eq. (5), which has a similar inference as that of E*. As suggested by FIG. 5F, the variation in $$\sigma_p^*$$

for lower levels of t with each level of $D_{in}$ is also significant. Thus, the third order parameter interaction term turns out to be significant.

$$\frac{E^{*0626} - 1}{0.626} = -0.175 + \gamma_{D_{in_i}:g_j:t_k} \qquad (4)$$

$$\frac{\sigma_p^{*-0141} - 1}{-0.141} = 1.743 + \phi_{D_{in_i}:g_j:t_k}$$

In contrast, for SEA, $D_{in}$ and t don't seem to interact (FIG. 3C), which is also reflected in Eq. (3), where the simplified best fit ANOVA model has two second-order parameter interaction terms and cannot be further simplified to achieve the third-order parameter interaction. To investigate the absence of $D_{in}$:t parameter interaction in SEA data, we derive the following approximate relationship among our three response variables—SEA, $$\sigma_p^*,$$

and E*.

$$SEA = \frac{\delta}{1 - \delta} \times \left[ \sigma_p^* \left[ \frac{2\epsilon_{max} - \epsilon_m - \epsilon_p}{2} \right] - E^* \left[ \frac{(\epsilon_{max} - \epsilon_m)(\epsilon_{max} - \epsilon_p)}{2} \right] \right] \qquad (6)$$

24 where, $\epsilon_{max}=0.5$, $0.48<\epsilon_m<0.49$, and $\epsilon_p$ is the amount of unrecovered permanent strain measured from the stress-strain response. In Eq. 6, the negative sign in the second term indicates that E* has a contrasting opposite effect on SEA compared to $$\sigma_p^*.$$

The absence of parameter interactions between $D_{in}$ and t for SEA is likely due to cancelling of $D_{in}$:t parameter interaction effects between $$\sigma_p^*$$

and E*. Since the gap dramatically affects $$\sigma_p^*$$

more than E*, the other two parameter interactions are significant for SEA.

It is evident from parameter interaction plots and ANOVA models that we are able to achieve synergistic scaling in SEA, E*, and $$\sigma_p^*$$

as functions of design variables. At the low levels of gap, all three response variables simultaneously maximize for low levels of both thickness and internal diameter. However, at the higher levels of gap, the maximization occurs for higher thickness and lesser diameters. This intriguing interplay among design variables allows drastic tailoring of mechanical properties to achieve lightweight foams for protective applications. In FIGS. 6A-6D, we compare specific properties of architected and non-architected VACNT foams from this study with protective foam-like materials found in the literature (all properties calculated from stress-strain responses up to 50% strain if data is not provided in literature). From FIGS. 6A and 6B, it is clear that architected VACNT foams outperform non-architected VACNT foams, polymeric foams, metallic foams, and even other architected foams by exhibiting simultaneously improved SEA and E*—two often conflicting properties in materials—while being less dense. The present architected VACNTs also achieve high specific compressive strength, which allows them to withstand loads without failure (FIG. 6D). In addition, architected VACNT foams have a higher range of tailorability of SEA as a function of different design variables. As seen in FIG. 6B, the density and SEA are interdependent in commercial foams. Softer polymeric foams such as polyurethane, and polyethylene, are less dense and have lesser SEA. Metallic foams such as steel, aluminum, and nickel have higher SEA but are denser. However, the present architected VACNT foams surpass these limitations by exploiting structural hierarchy, size-effects from geometrically-confined CNT growth, and lateral interactions among adjacent mesoscale cylinders. For example, compared to the Zorbium (polyurethane) foams that are currently used in advanced combat helmet liners (Ruan, D., et al.

*Composite structures* 57, 331-336 (2002)), the present architected VACNT foams exhibit ~18 times higher SEA, ~160 times higher E*, and ~45 times higher $\sigma_p$* at 50% strain and at same quasistatic strain rate. The present architected VACNT foams additionally provide exceptional thermal stability of their properties, a feature not possible with polymeric foams.

Stress-Strain Curves as Functions of $D_{in}$, t, and g

Figures 7A, 7B, 7C:
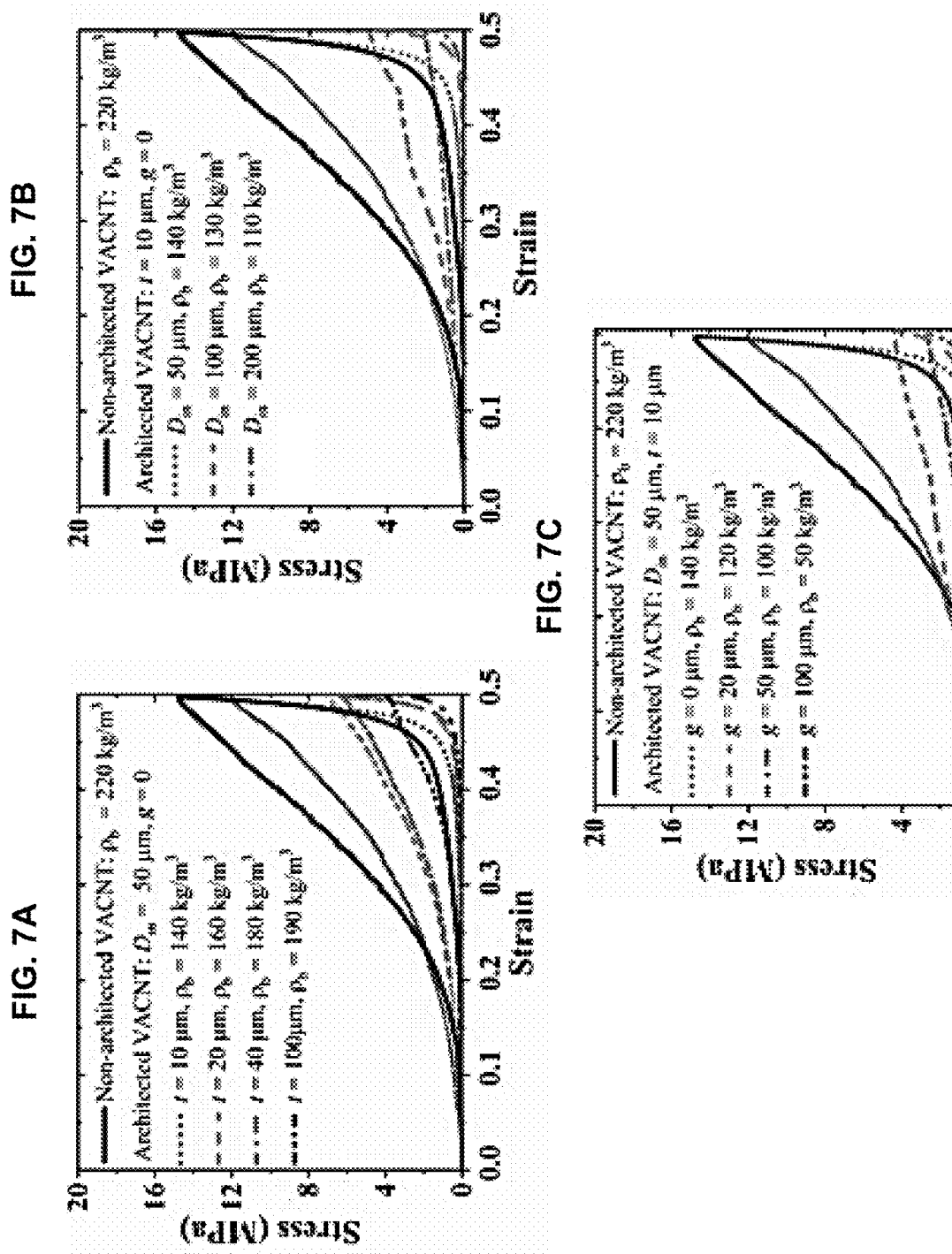
FIG. 7A shows stress-strain curves as a function of t for $D_{in}$=50 μm and g=0 as compared to a non-architected VACNT sample.
FIG. 7B shows stress-strain curves as a function of $D_{in}$ for t=10 μm and g=0 as compared to a non-architected VACNT sample.
FIG. 7C shows stress-strain curves as a function of g for $D_{in}$=50 μm and t=10 μm as compared to a non-architected VACNT sample.

Stress-strain curves as functions of $D_{in}$, t, and g without density normalization are shown in FIGS. 7A-7C.

Effect of Intrinsic Density and Lateral Interactions on SEA

Damping capacity $\delta$ is the ratio of energy dissipated $W_{dis}$ (area enclosed within the loading-unloading curve) to the total work done on the material $W_L$ (area under the loading curve).

$$\delta = \frac{W_{dis}}{W_L} \qquad (7)$$

We found the damping capacity $\delta \approx 0.83 \pm 0.04$ for all architected VACNT foam samples independent of thickness, gap, and internal-diameter of the mesoscale cylinders. In Eq. (7), $W_{dis}$ and $W_L$ are in kJ/m$^3$, whereas $\delta$ is a dimensionless quantity. If the bulk density of architected VACNT foam sample is $\rho_b$, then the specific energy absorption is defined as, $$SEA = \frac{W_{dis}}{\rho_b} = \delta \frac{W_L}{\rho_b}$$

$$SEA = \delta \frac{1}{\rho_b} \int_0^{\epsilon_{max}} \sigma_L d\epsilon$$

where, $\sigma_L$ is the stress response of architected VACNT foam during loading, $\epsilon$ is the bulk strain, and $\epsilon_{max}$ is the maximum compressive strain (0.5 in our experiments).

$$SEA = \delta \frac{1}{\rho_b} \int_0^{\epsilon_{max}} \frac{F_L}{A} d\epsilon \qquad (8)$$

where, $F_L$ is the force response of the architected VACNT foam and A is the total cross-section area (25 mm$^2$). Assuming $F_c$ is the force response from compression of an isolated cylinder and $F_i$ is the contribution from lateral interactions with neighboring cylinders (due to cylinder's outer surface), then the total force ($F_L$) is written as $$F_L = nF_c + nF_i$$

where, n is the total number of cylinders in the sample. Substituting this in Eq. (8) yields, $$SEA = \delta \frac{1}{\rho_b} \int_0^{\epsilon_{max}} \frac{nF_c + nF_i}{A} d\epsilon$$

$$SEA = \delta \frac{1}{\rho_b} \int_0^{\epsilon_{max}} \frac{nC_A}{A} (\sigma_c + \sigma_i) d\epsilon$$

where, $C_A$ is the cross-section area of an individual cylinder, $\sigma_c$ and $\sigma_i$ are the equivalent stresses for $F_c$ and $F_i$, respectively, and $$\frac{nC_A}{A} = V_f$$

is the till factor. Substituting $V_f$ yields, $$SEA = \delta \frac{V_f}{\rho_b} \int_0^{\epsilon_{max}} (\sigma_c + \sigma_i) d\epsilon$$

$$SEA = \delta \frac{1}{\rho_i} \int_0^{\epsilon_{max}} (\sigma_c + \sigma_i) d\epsilon$$

where, $$\rho_i = \frac{\rho_b}{V_f}$$

is the intrinsic density or CNT cylinders (i.e., density of VACNT forest within the cylinders' wall region), which we found to be a function of thickness but independent of gap and internal diameter.

$$SEA = \delta \frac{1}{\rho_i} \left[ \int_0^{\epsilon_{max}} \sigma_c d\epsilon \right] + \delta \frac{1}{\rho_i} \left[ \int_0^{\epsilon_{max}} \sigma_i d\epsilon \right] \qquad (9)$$

Since VACNT foams exhibit a nonlinear stress response in compression, we assume $\sigma_c = f_1(\sigma_i) f_2(\epsilon)$, where $f_1(\sigma_i)$ accounts for dependency of elastic modulus on intrinsic density and $f_2$ (E) accounts for nonlinearity. We hypothesize that the stress ($\sigma_1$) due to lateral interactions between outer walls of neighboring cylinders must be a function of normalized outer curved surface area $$\left( \frac{A_c}{A} \right).$$

So, we assume $$\sigma_i = g_1 \left( \frac{A_c}{A} \right) g_2(\epsilon),$$

where $$g_1 \left( \frac{A_c}{A} \right)$$

accounts for lateral interactions and $g_2$ ($\epsilon$) accounts for nonlinearities. Substituting these in Eq. (9) yields, $$SEA = \delta f_1(\rho_i) \frac{1}{\rho_i} \int_0^{\epsilon_{max}} f_2(\epsilon) d\epsilon + \delta g_1 \left( \frac{A_c}{A} \right) \frac{1}{\rho_i} \int_0^{\epsilon_{max}} g_2(\epsilon) d\epsilon$$

27

Integrals $$\int_0^{\epsilon_{max}} f_2(\epsilon)d\epsilon \text{ and } \int_0^{\epsilon_{max}} g_2(\epsilon)d\epsilon$$

are independent of design variables (t, g, $D_{in}$), so assuming them to be constants, i.e., $$SEA = \delta f_1(\rho_i)\frac{C_1}{\rho_i} + \delta g_1\left(\frac{A_c}{A}\right)\frac{C_2}{\rho_i} \tag{10}$$

$$IEA = \rho_i \times SEA = \delta\left[C_1 f_1(\rho_i) + C_2 g_1\left(\frac{A_c}{A}\right)\right]$$

$$SEA = \delta f_1(\rho_i)\frac{C_1}{\rho_i} + \delta g_1\left(\frac{A_c}{A}\right)\frac{C_2}{\rho_i} \tag{10}$$

$$IEA = \rho_i \times SEA = \delta\left[C_1 f_1(\rho_i) + C_2 g_1\left(\frac{A_c}{A}\right)\right]$$

where, IEA is the intrinsic energy absorption. On fitting the experimental data for $D_{in}$=50 μm, we found $C_1 \approx 2$, $C_2 \approx 30.29$, $f_1(\rho_i)=\rho_i$, and $$g_2\left(\frac{A_c}{A}\right) = \left(\frac{A_c}{A}\right)^{1.125}.$$

Normalized Curved Surface Area of Cylinders Can be Calculated as Follows

Total number of cylinders in the sample (FIG. 8A), $$n = \frac{2A}{\sqrt{3}(D_{in} + 2t + g)^2}$$

Figure 8B:
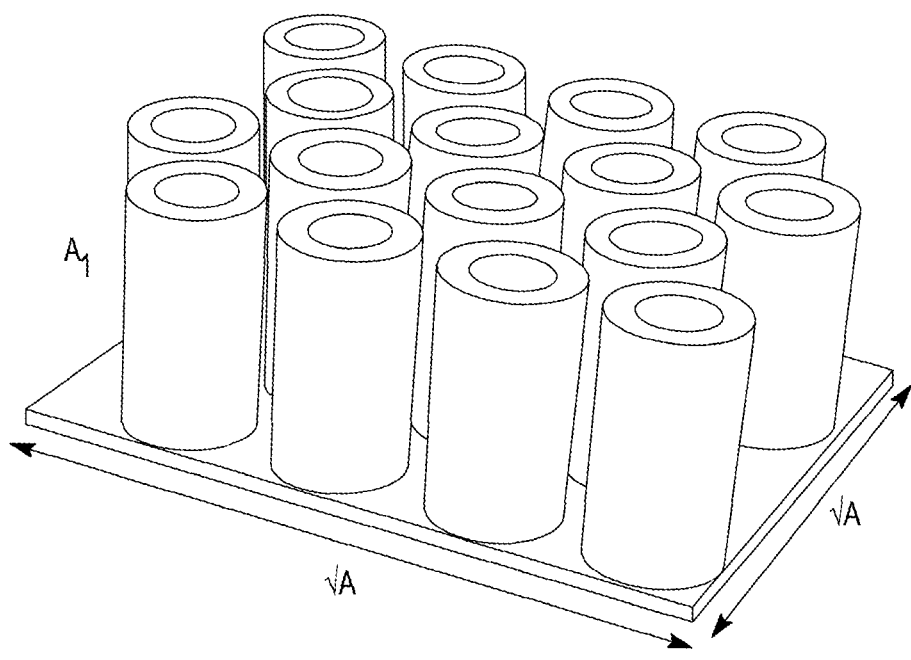
FIG. 8B shows the total outer curved surface area of cylinders ($A_1$) and total area of the sample (A).

Total outer curved surface area (FIG. 8B), $$A_1 = \underbrace{\frac{2A}{\sqrt{3}(D_{in} + 2t + g)^2}}_{} \times \underbrace{\pi(D_{in} + 2t)h}_{Curved\ Surface\ Area}$$

Cylinders on the boundaries only touch four other cylinders, so ⅓ of the curved surface area of cylinders on the boundaries must be subtracted. The total area needed to be subtracted is, $$A_2 = \underbrace{4}_{Total\ boundaries} \times \frac{1}{3} \times \frac{\sqrt{A}}{(D_{in} + 2t + g)} \times \pi(D_{in} + 2t)h \times 0.5$$

where, factor of 0.5 is taken to account if cylinders at the boundary are sliced.

$$\frac{A_1 - A_2}{A} =$$

$$\pi(D_{in} + 2t)h\left[\frac{2}{\sqrt{3}(D_{in} + 2t + g)^2} - \pi(D_{in} + 2t)h\frac{2}{3\sqrt{A}}\frac{1}{(D_{in} + 2t + g)}\right]$$

28

Contact curved surface area between cylinders will be half of total area $$\frac{A_c}{A} = \frac{A_1 - A_2}{2A} = \pi(D_{in} + 2t)h\left[\frac{1}{\sqrt{3}(g + D_{in} + 2t)^2} - \frac{1}{3\sqrt{A}}\frac{1}{(D_{in} + 2t + g)}\right]$$

Scaled Modulus and Scaled Peak Stress

Similar to SEA, the trend reversal in t:g parameter interaction plots of E* and $$\sigma_p^*$$

disappears after multiplying them by the intrinsic density ($\rho_i$), underscoring the competing effects between size-effect and the effect of interaction among adjacent cylinders. Scaled modulus (=E*×$\rho_i$) and scaled peak stress $$\left(= \sigma_p^* \times \rho_i\right)$$

were plotted (not shown).

Relationship Between SEA, $\sigma_p^*$, and E*

Let the area under the unloading curve (work done by the material) be $W_{UL}$, then $$W_L = W_{dis} + W_{UL}$$

$$\frac{W_L}{W_{dis}} = 1 + \frac{W_{UL}}{W_{dis}}$$

$$\frac{1}{\delta} = 1 + \frac{W_{UL}}{W_{dis}}$$

$$\frac{SEA \times \rho_b}{W_{UL}} = \frac{\delta}{1 - \delta}$$

$$(W_{dis} = SEA \times \rho_b)$$

$W_{UL}$ can be calculated by adding the area under the unloading curve in three different regimes of strain as shown in a plot of stress versus strain (not shown).

$$W_{UL} = \int_0^{\epsilon_p} 0 \times d\epsilon + \int_{\epsilon_p}^{\epsilon_m} \sigma_1 d\epsilon + \int_{\epsilon_m}^{\epsilon_{max}} \sigma_2 d\epsilon$$

Where $\epsilon_p$ is the permanent strain, $\epsilon_m$ is the strain at the intersection of two approximated linear regimes ($0.48 < \epsilon_m < 0.49$), and $\epsilon_{max}$ is the maximum compressive strain ($\epsilon_{max}=0.5$)

$$\sigma_1 = (\epsilon - \epsilon_p)\frac{(\sigma_p + E_{UL}(\epsilon_m - \epsilon_{max}))}{(\epsilon_m - \epsilon_p)},$$

$$\sigma_2 = \sigma_p + E_{UL}(\epsilon - \epsilon_{max})$$

where, $\sigma_1$ is the linear fit for stress as a function of strain in the first linear regime and $\sigma_2$ is the linear fit for stress as a function of strain in the second linear regime. $E_{UL}$ is the unloading modulus and $\sigma_p$ is the peak stress.

$$W_{UL} = \sigma_p \left[ \frac{2\epsilon_{max} - \epsilon_m - \epsilon_p}{2} \right] - E_{UL} \left[ \frac{(\epsilon_{max} - \epsilon_m)(\epsilon_{max} - \epsilon_p)}{2} \right] \quad (11)$$

$$SEA = \frac{\delta}{1 - \delta} \times \left[ \sigma_p^* \left[ \frac{2\epsilon_{max} - \epsilon_m - \epsilon_p}{2} \right] - E^* \left[ \frac{(\epsilon_{max} - \epsilon_m)(\epsilon_{max} - \epsilon_p)}{2} \right] \right]$$

where, $$\sigma_p^* = \frac{\sigma_p}{\rho_b}$$

is the specific peak stress and $$E^* = \frac{E_{UL}}{\rho_b}$$

is the specific modulus.

Steps to Develop Statistical Model for SEA

We study the dependence of response variables on design variables using Analysis of Variance (ANOVA) model. The choice of using ANOVA is appropriate as we discretize the continuous design variables at fixed levels in our experimental setup while synthesizing VACNT samples. Here, we provide a step-by-step guide of selecting the best ANOVA model for response variable SEA. As we have three repetitions for each combination of design variables (such as internal diameter ($D_{in}$), thickness (t) and Gap (g)), we begin the analysis by generating full factor ANOVA model where all interactions terms are allowed to exist in the model. Please note that the term 'design variable' is also denoted by 'independent variable' or 'treatment variable' in statistical literature. Statistically, interaction is said to occur when the effect of a given independent design variable (for instance $D_{in}$) over the response (dependent) variable (for instance SEA) changes depending on the levels of another independent variable (for instance g). In layman's terms this could be interpreted as a crossover effect between different design (treatment) variables. As a simple example, in a weight loss study it would make more sense to interpret the effects of diet and exercise together on weight-loss.

We did not consider any transformation of the response variable in the initial full model. Table 3 shows that all the factors and interaction terms for the full factor ANOVA model without transformation are statistically significant. A factor variable (such as D in) consisting of multiple levels (50, 100, 200) is said to be statistically significant if any of the group mean of the response variable (SEA) (grouped by different levels of factor variable) is significantly different than the overall group mean of the response variable. The statistical significance of the design variable is evaluated by its corresponding p-value in the ANOVA table. The p-value helps to confirm that the difference between any of the group mean than the overall group mean is not by chance. The p-value test the null hypothesis that there is no difference in any of the group mean. When p-value is less than a predefined threshold then the null hypothesis is rejected, and it is believed that there is indeed some statistical difference within the group means.

However, the statistical significance of independent variables is not sufficient to judge the quality of fit of the proposed model over the observed data. Instead, we need to diagnose the full model by generating diagnostic plots (not shown). For a good ANOVA model, it is important that all the assumptions of ANOVA are met appropriately. The diagnostic plots help to visualize the discrepancy faced in meeting the assumption of ANOVA model. As was seen from the plots, the assumption of 'homoscedasticity of residuals' was violated by the initial full ANOVA model. The term 'homoscedasticity of residuals' implies that residuals (which are the difference between observed and the predicted response (SEA) variable) have unequal variance thus questioning the quality of fit of the proposed model. One of the plots showed the comparison between quantiles of normal variable and quantiles of residuals. A straight line would imply that the residuals are normally distributed. But, as seen in the plot, the residuals were not 'normally distributed'. The residuals may have some linear dependency among them, which may violate the assumption of 'independence of residuals' and is tested by Durbin-Watson test as explained below. Further, one of the plots was a plot of Cooks distance calculated for each collected data point. A larger Cooks distance implies that the data point may be a suspicious outlier. The plot suggested that there could be a suspicious outlier in the dataset. However, it was concluded that this did not make sense for the present experimental setup. Rather, this is more likely a result of poor model fitting by the full model without appropriate transformations.

TABLE 3

ANOVA table for full factor model without transformation.

| | SumSq | Df | Fvalue | Pr(>F) | Significance |
|---|---|---|---|---|---|
| Intercept | 2577.0 | 1 | 3648.00 | <2.2e−16 | *** |
| Din | 338.0 | 2 | 239.26 | <2.2e−16 | *** |
| t | 31.2 | 3 | 14.74 | 3.13E−08 | *** |
| Gap | 788.1 | 4 | 278.92 | <2.2e−16 | *** |
| Din:t | 8.2 | 6 | 1.94 | 0.08002 | . |
| Din:Gap | 86.5 | 8 | 15.31 | 2.50E−15 | *** |
| t:Gap | 221.9 | 12 | 26.17 | <2.2e−16 | *** |
| Din:t:Gap | 33.6 | 24 | 1.98 | 0.0086 | ** |
| Residuals | 84.8 | 120 | | | |

As ANOVA assumptions are not met appropriately in the initial model, we improved the same by considering different transformations for the response variables and eliminating the lower-level interaction terms to honor model parsimony. We consider log transformation and Box-Cox transformation for the response variable. Our major goal was to improve model fit by selecting a model that best meets ANOVA assumptions. To quantify how well each model meets ANOVA assumption, we made use of the following statistical tests.

1. Durbin-Watson Test: This test helps to check if there is some trend or autocorrelation in the residual. A good fit ANOVA model does not have autocorrelation of residuals. We perform the test in R programing language where the null hypothesis is that residuals do not have correlation. A p-value >0.05 implies insufficient evidence to reject null hypothesis and thus implies absence of autocorrelation.

2. Breusch-Pagan (BP) Test: We used this test to check homoscedasticity of residuals. The null hypothesis of the BP-Test assumes homoscedasticity of residuals and if the p-value is larger than an appropriate threshold (>0.05), then we fail to reject the null hypothesis and conclude that residuals adhere to the assumption of homoscedasticity.

3. Shapiro-Wilk Test: We used this test to check if the residuals are normally distributed or not. The null hypothesis for the test is that data that is normally distributed and having a p-value above a threshold (>0.05) would imply normality of residuals.

We evaluate p-values for all the tests mentioned above for different models as shown in Table 4. The reduced models are achieved by only selecting statistically significant terms from the ANOVA of the full model. For instance, Table 5 shows ANOVA table for full model after Box-Cox transformation. To obtain the reduced model, we drop the insignificant design variables like thickness (t), the second order interaction between internal Diameter and thickness ($D_{in}$:t) and the third order interaction term ($D_{in}$:t:g) to obtain the reduced model. Finally, if higher order interactions are significant, we only select them instead of lower order terms to respect model parsimony and ease model interpretation. In the presence of significant interaction terms, it is usually advised to interpret the interaction terms rather than individual independent variables when interaction terms too have physical interpretation. As mentioned earlier regarding the weight loss study, it would make more sense to identify the amount of weight loss occurred for combined levels of diet and exercise together, which would help to suggest the appropriate level of exercise and diet simultaneously for a subject. In the present Example, as second order interaction terms ($D_{in}$:g, t:g) are significant, we interpret only them in the parsimonious model. Please also note that even though the variable t is non-significant (implying that difference between groups formed by each level of thickness are not significantly different) its crossover with Gap has a significant effect over the response variable SEA (implying that difference between groups formed by combined levels of thickness and Gap (t:g) differ significantly). As can be seen from Table 4, reduced model with Box-Cox transformation and Parsimonious Model with only higher order interaction terms give positive results for all the three tests validating ANOVA assumption. Finally, the diagnostic plot of the best fit model (Parsimonious model with Box-Cox transformation) was plotted (not shown) showing much improved results and affirming the best fit model.

TABLE 5

ANOVA table for full factor model after Box-Cox transformation.

| | SumSq | Df | F-value | Pr(>F) | Significance |
|---|---|---|---|---|---|
| Intercept | 271.19 | 1 | 5230.51 | <2.2E−16 | *** |
| Din | 47.69 | 2 | 459.92 | <2.2E−16 | *** |
| t | 0.02 | 3 | 0.12 | 0.9498 | |
| Gap | 76.58 | 4 | 369.25 | <2.2E−16 | *** |
| Din:t | 0.66 | 6 | 2.12 | 0.0560 | . |
| Din:Gap | 1.37 | 8 | 3.30 | 0.0019 | ** |
| t:Gap | 18.98 | 12 | 30.51 | <2.2E−16 | *** |
| Din:t:Gap | 1.58 | 24 | 1.27 | 0.2015 | |
| Residuals | 6.22 | 120 | | | |

Conclusions

We demonstrated synergistic improvement of specific properties—compressive modulus, compressive strength, and energy absorption—by exploiting structural hierarchy, size-effects, and nanoscale inter-tube interactions in architected VACNTs. Guided by the full-factorial design of experiments (DOE) approach and the statistical analysis of variance (ANOVA) method, we found higher-order interactions among design variable of the mesoscale cylindrical architecture—leading to regimes with synergistically enhanced mechanical properties. We also showed that these intriguing parameter interactions arise from size (thickness)-dependent morphology evolutions of CNTs (number density and alignment) arising from geometrically-confined CVD synthesis and lateral interactions among adjacent cylinders tailored by the gap between them. This unique structure-property relation also disrupts the commonly known effects of D/t ratio on thin-walled structures made of common materials and show us a novel pathway to synergistically enhance mechanical properties. Our architected VACNT foams outperform commercial polymeric, metallic, and other architected foams in terms of energy absorption, modulus, and compressive strength at ultra-lightweight.

Additional information, including data, plots, etc. referenced as "not shown" above, may be found in U.S. Ser. No. 63/402,719, filed Aug. 31, 2022, which is hereby incorporated by reference in its entirety.

TABLE 4

Model selection using tests for validating ANOVA assumptions.

| Model Type | Transformation | Durbin Watson Test | Breusch Pagan Test | Shapiro wilks test | Independent Variables |
|---|---|---|---|---|---|
| Full-Model | — | 0.00200 | 0.00000 | 0.00000 | |
| Full-Model | Logarithm | 0.16800 | 0.00334 | 0.00038 | |
| Reduced-Model | Logarithm | 0.08200 | 0.02703 | 0.03170 | Din + Gap + t:Gap + Din:t + Din:Gap |
| Full-Model | Box-Cox | 0.12800 | 0.93623 | 0.00736 | |
| Reduced-Model | Box-Cox | 0.09600 | 0.57578 | 0.67743 | Din + Gap + Din:Gap + t:Gap |
| Model with higher order interaction | Box-Cox | 0.08800 | 0.57578 | 0.67743 | Din:Gap + t:Gap |

Example 2

Lightweight Concentric Cylindrically Architected
Carbon Nanotube Foams with Tailored Mechanical
Properties Introduction In Example 1, we introduced an additional level of
structural hierarchy in VACNTs through an architected hex-
agonally packed lattice of hollow cylinders. We synthesized
samples by varying and combining three geometrical design
parameters—the inner diameter ($D_{in}$), thickness (t) of cyl-
inders, and the gap (g) between the neighboring cylinders.
We measured specific energy absorption (SEA), specific
modulus (E*), and specific strength $$\left(\sigma_p^*\right)$$

from the quasi-static stress-strain curve as response vari-
ables. We used a full-factorial design for an in-depth under-
standing of the correlation among design parameters and to
determine the best design parameters for maximal improve-
ment in properties. We demonstrated synergistic improve-
ment in SEA, E*, $$\sigma_p^*$$

owing to geometrically confined CNTs growth (tailored by
$D_{in}$ and t of cylinders), lateral interactions among adjacent
cylinders (tailored by the gap g between them), and corre-
lation among the design variables. The cylindrically archi-
tected foam outperformed commercial polymeric, metallic,
and other architected foams in terms of SEA, E* and $$\sigma_p^*.$$

This Example 2 is a further step forward in achieving
synergistic improvement in properties at a much lighter
weight by arranging cylinders concentrically while exploit-
ing the size effects and lateral interactions. Specifically, we
designed and synthesized hexagonally closed-packed con-
centric cylindrically architected foam samples with varying
innermost diameters ($D_{innermost}$), thickness (t) of concentric
cylinders, the gap between adjacent concentric cylinders
($g_{cc}$), and the number of concentric cylinders (n). We show
that organizing cylinders concentrically along with tuning
their design parameters demonstrate tailorable density over
a broad range while preserving their mechanical response as
compared to non-architected VACNTs. The concentric
cylindrically architected VACNTs exhibit higher specific
properties than polymeric, metallic, and other protective
foam-like materials.

Concentric Architected VACNT Design

As noted above, in Example 1, we designed and synthe-
sized mesoscale cylindrically architected VACNTs and opti-
mized their mechanical performance as a function of geo-
metric parameters—$D_{in}$, t, and g using a full factorial design
of experiments (DoE) approach. We revealed that at a lower
value of gap g, properties can be maximized by decreasing
both $D_{in}$ and t owing to geometrically size confined CNT
growth and enhanced lateral interactions among neighboring cylinders. The properties were unaltered with decrease in
$D_{in}$ <50 µm and t<10 µm (for a constant $D_{in}$/t=5). However,
at very large gaps, e.g., a few hundred microns (low-density
sample), the properties were less than the non-architected
VACNTs due to the absence of lateral interactions between
adjacent cylinders. This Example 2 is a step forward for
improving the previous design by arranging VACNT cylin-
ders concentrically to make them much lighter while main-
taining desirable SEA, E*, and $$\sigma_p^*.$$

The design variables for the concentric cylindrically archi-
tected VACNTs included $D_{innermost}$, t, n, and $g_{cc}$ as listed in
Table 6.

FIGS. 9A-9H shows the scanning electron microscopy
(SEM) images of hexagonally closed-packed concentric
cylindrically architected sample synthesized using the float-
ing catalyst chemical vapor deposition (CVD) on a photo-
lithographically pre-patterned substrate. This synthesis was
carried out as described in Example 1. However, in this
Example 2, we designed concentric cylindrically architected
VACNT with $D_{innermost}$ as 25 µm, 50 µm and t as 5 µm, 10
µm (to exploit size effects), and zero gap between the
outermost adjacent cylinders (to maximize lateral interac-
tions). To further tailor the density, the number of concentric
cylinders (n) was varied as 2, 4, and 6 (see FIGS. 9F-9H))
and the gap between the adjacent concentric cylinders ($g_{cc}$)
was varied as 5 µm, 20 µm and 50 µm. We synthesized 54
samples with three of each 18 different combinations of
$D_{innermost}$, t, n, and $g_{cc}$. Three samples in each combination
enabled us to characterize any microstructural variability
that arose from both the synthesis process as well as testing
which is represented by error bars in the figures. The
samples were grown with an average thickness of 1.65±0.21
mm. Non-architected VACNTs are those synthesized and
tested in Example 1, above.

TABLE 6

| Design parameters for concentric cylindrically architected VACNTs. | |
| --- | --- |
| Design Variables | Levels |
| $D_{innermost}$(µm) & t(µm) | 25 & 5 |
| | 50 & 10 |
| n | 2, 4, 6 |
| $g_{cc}$(µm) | 5, 20,50 |

Results and Discussion

Figure 10A:
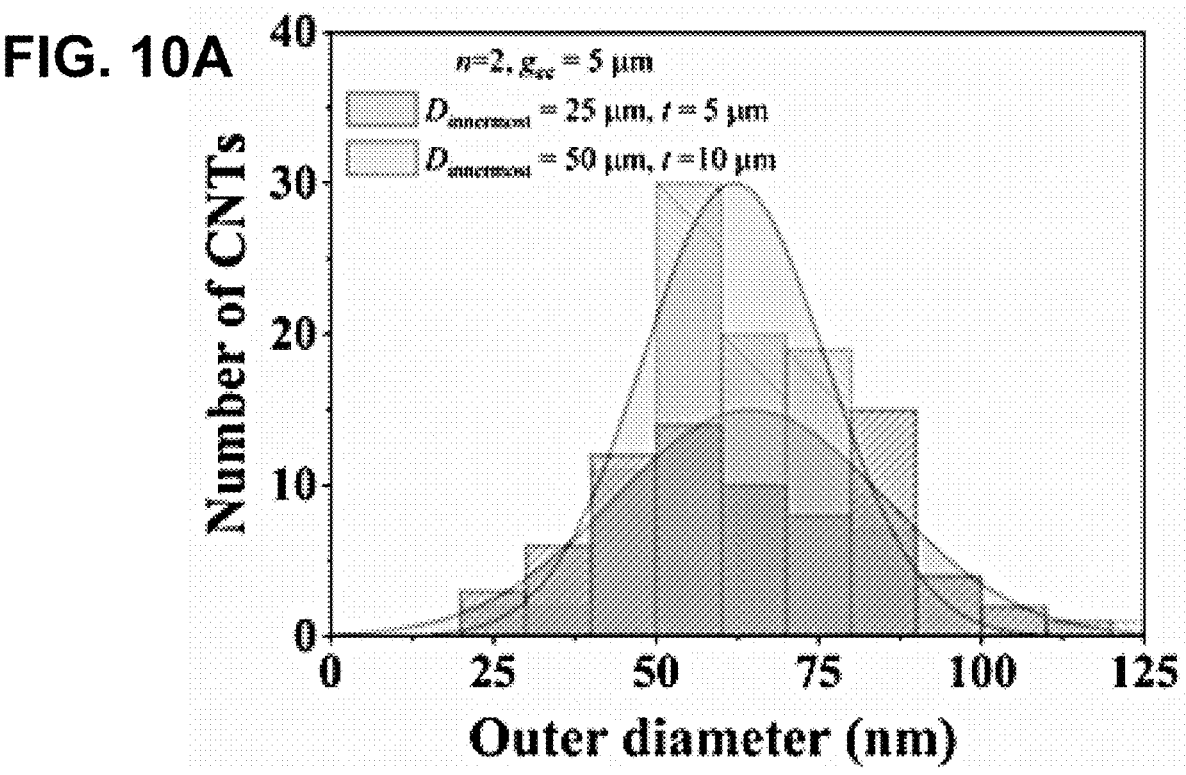
FIGS. 10A-10B show the distribution of average outer diameter of individual MWCNTs measured from SEM images as a function of $D_{innermost}$, t for (FIG. 10A) n=2 and (FIG. 10B) n=6.
Figure 10B:
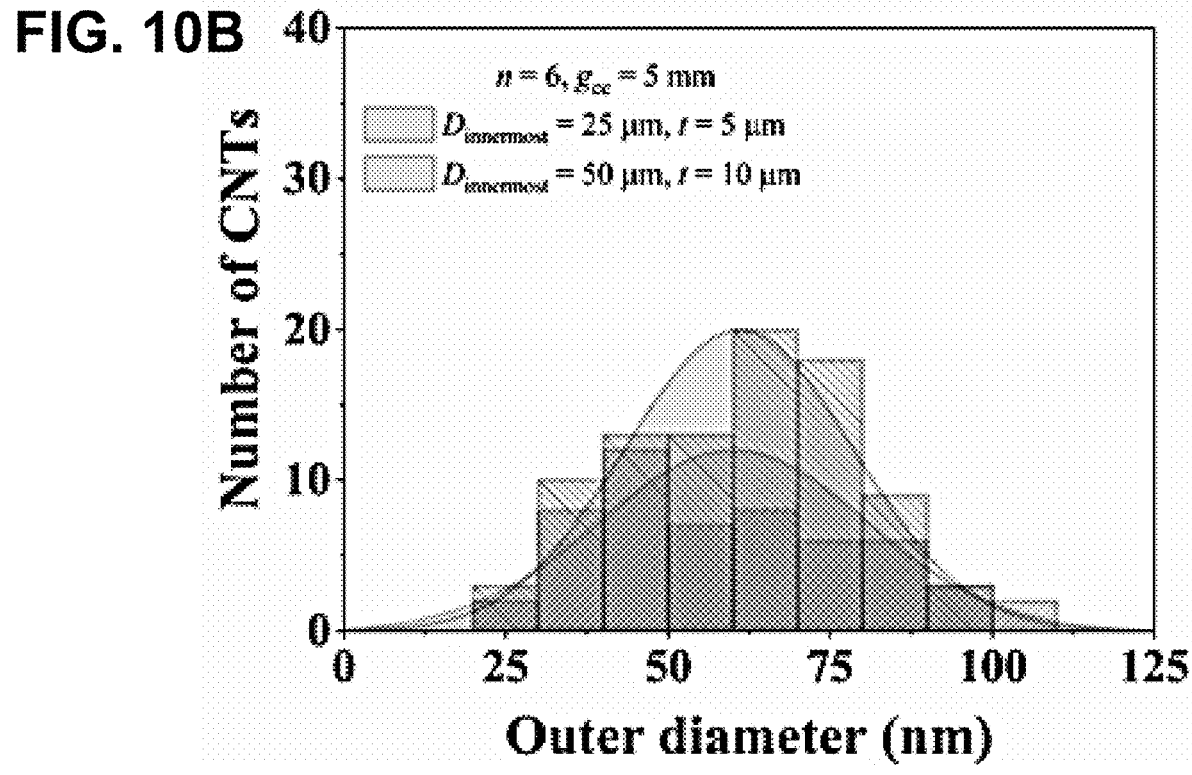
Figure 10C:
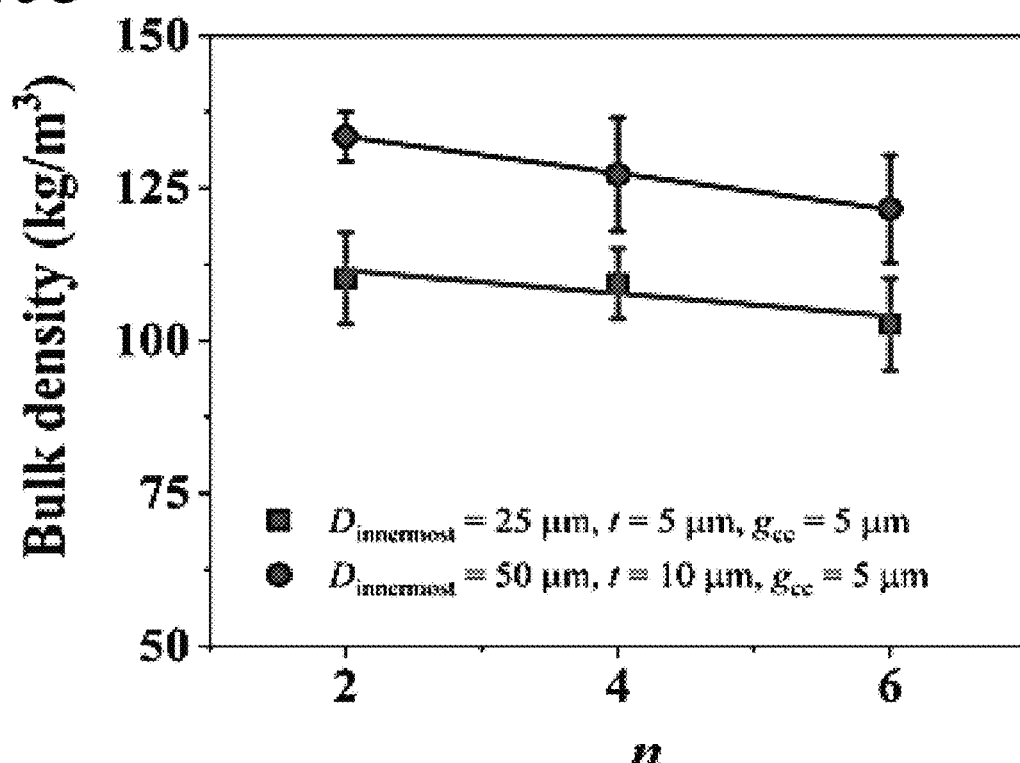
FIG. 10C shows the average bulk density and FIG. 10D shows the average number of CNTs as a function of $D_{innermost}$, t, and n.
Figure 10D:
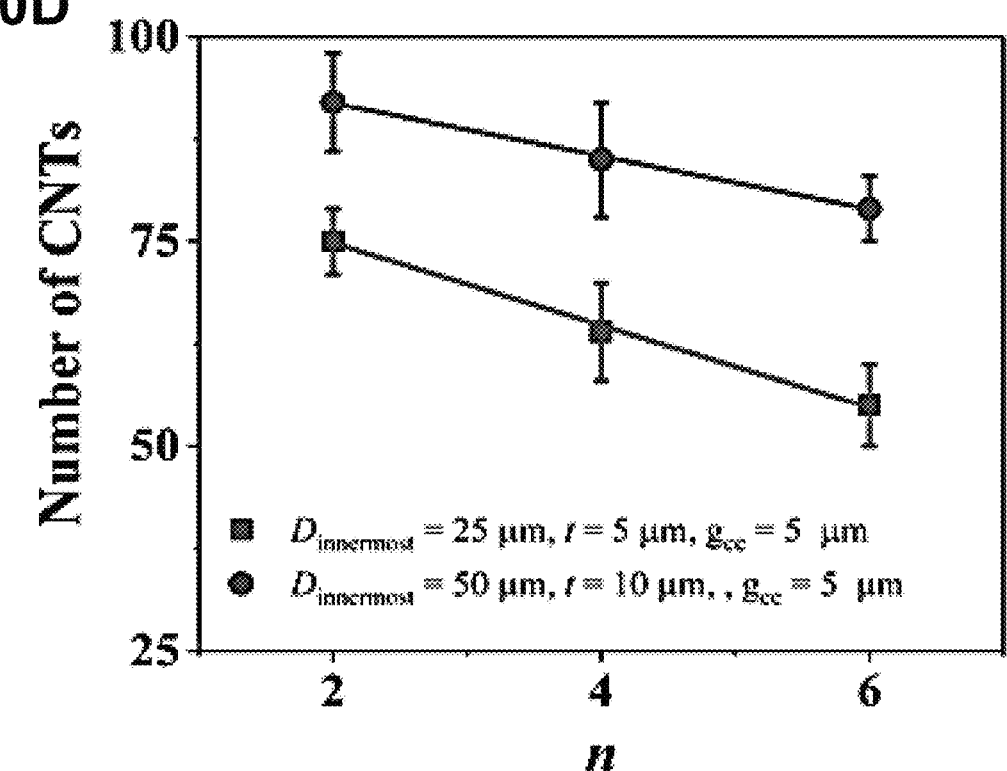
Figures 11A, 11B, 11C, 11D, 11E, 11F:
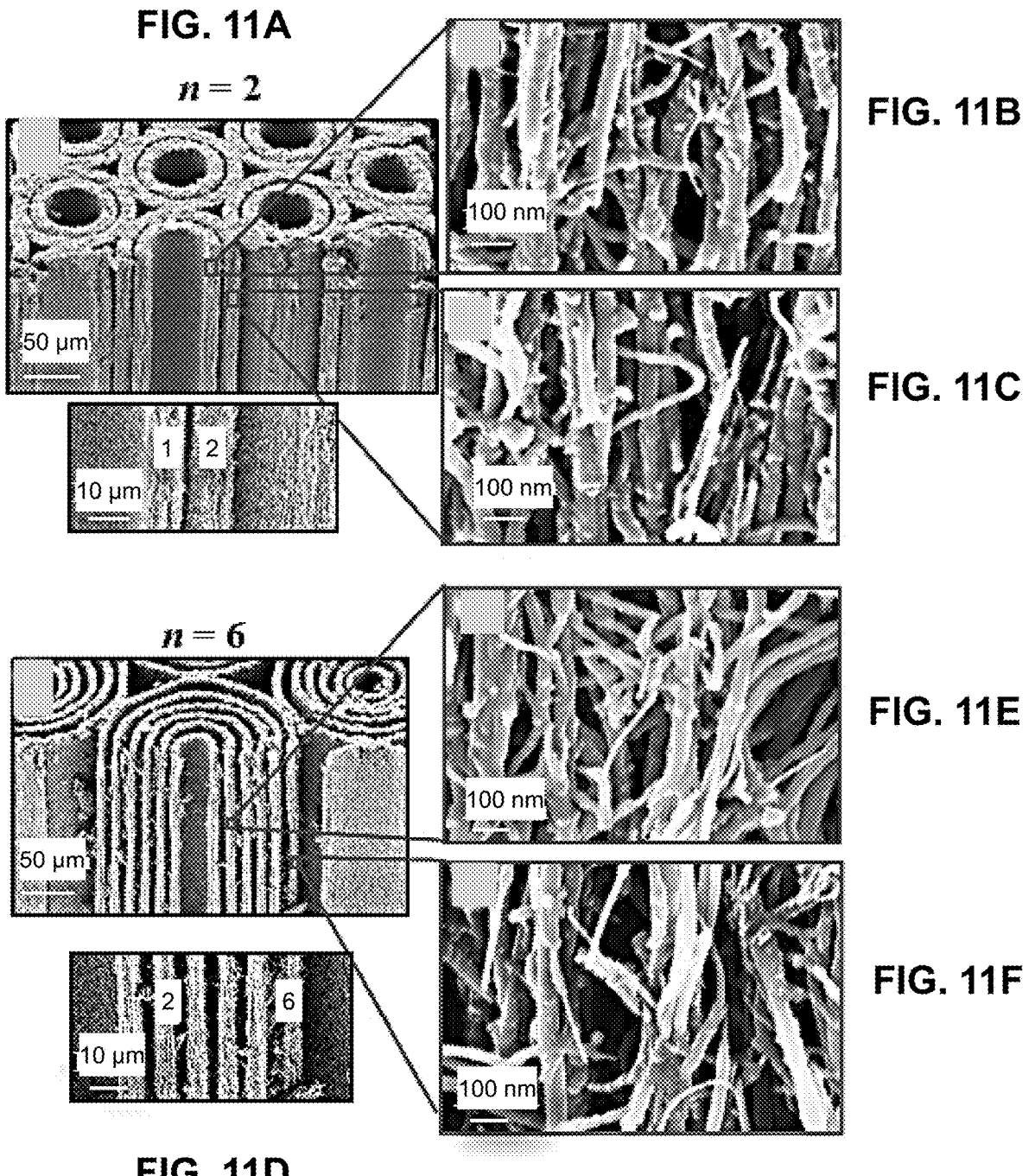
FIGS. 11A-11F show SEM images of pristine samples radially across different concentric cylinder thickness regions and their enlarged views for (FIGS. 11A-11C) n=2 and (FIGS. 11D-11F) n=6.
Figures 11G, 11H:
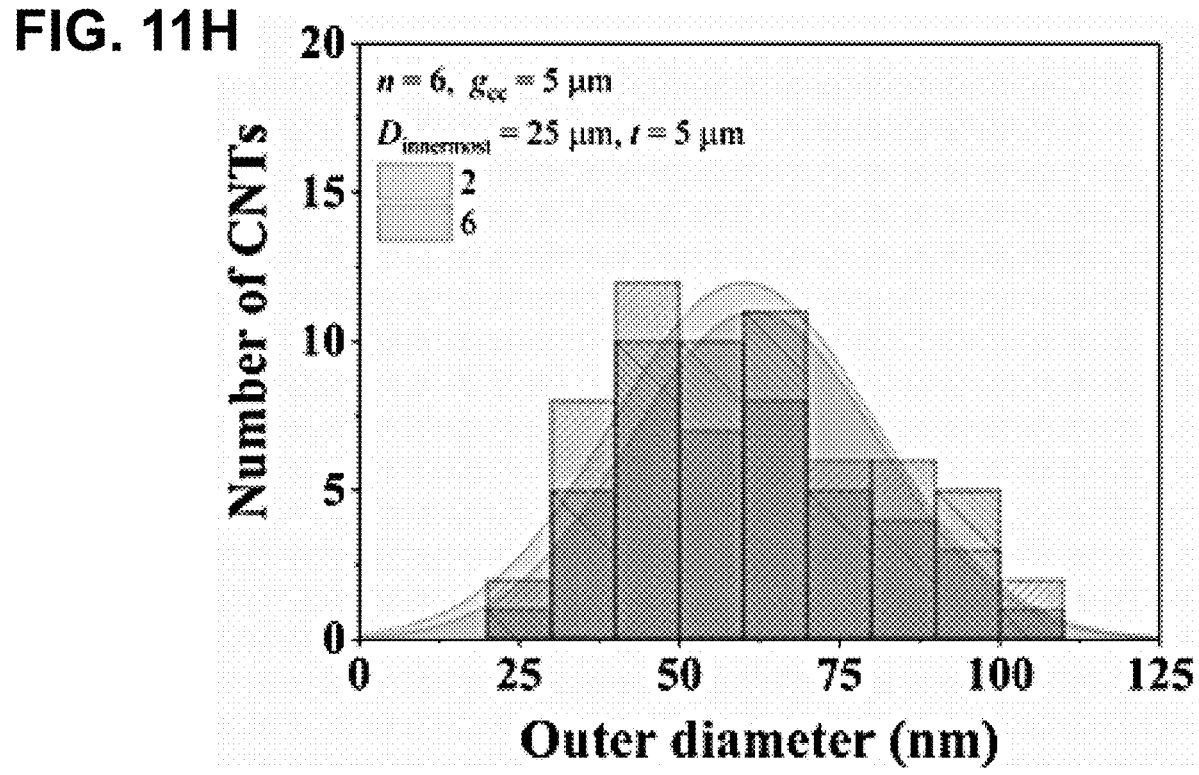
FIGS. 11G-11H show the distribution of the average outer diameter of individual MWCNTs measured from SEM images across different concentric cylinder thickness regions.
Figure 12A:
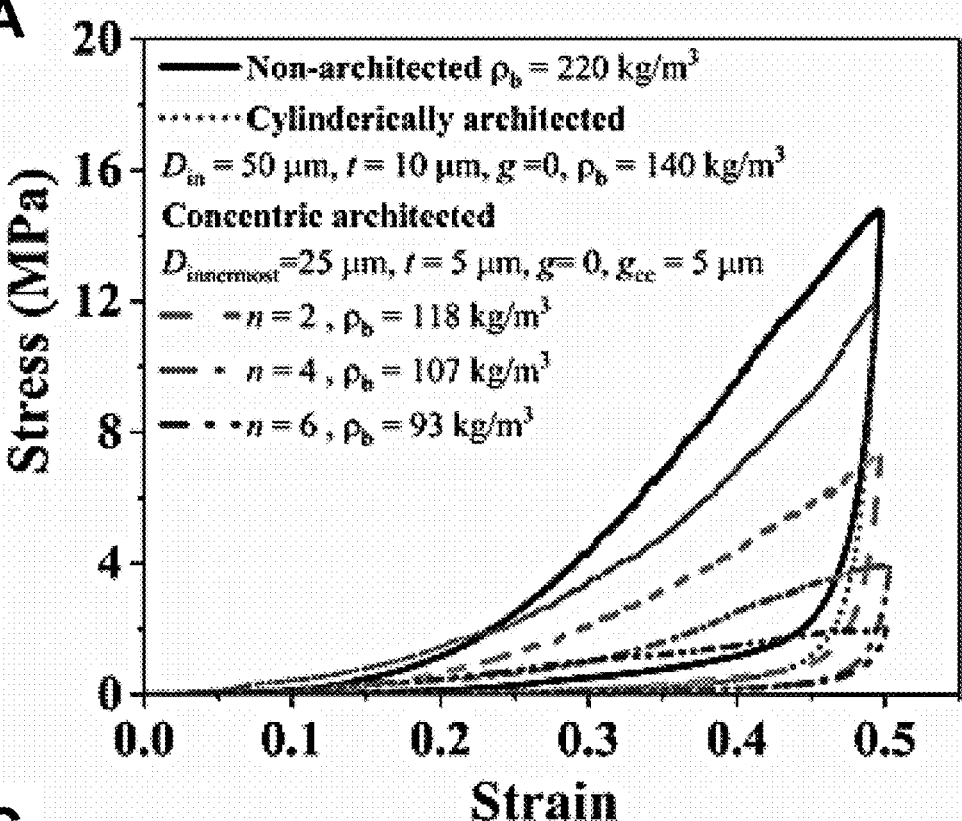
FIGS. 12A-12D show stress-strain response as a function of the number of concentric cylinders (n) in architected VACNTs as compared to non-architected VACNTs and cylindrically architected VACNTs (Example 1) for (FIG. 12A) $D_{innermost}$=25 μm, t=5 μm, $g_{cc}$=5 μm (FIG. 12B) $D_{innermost}$=50 μm, t=10 μm, $g_{cc}$=5 μm.
Figure 12C:
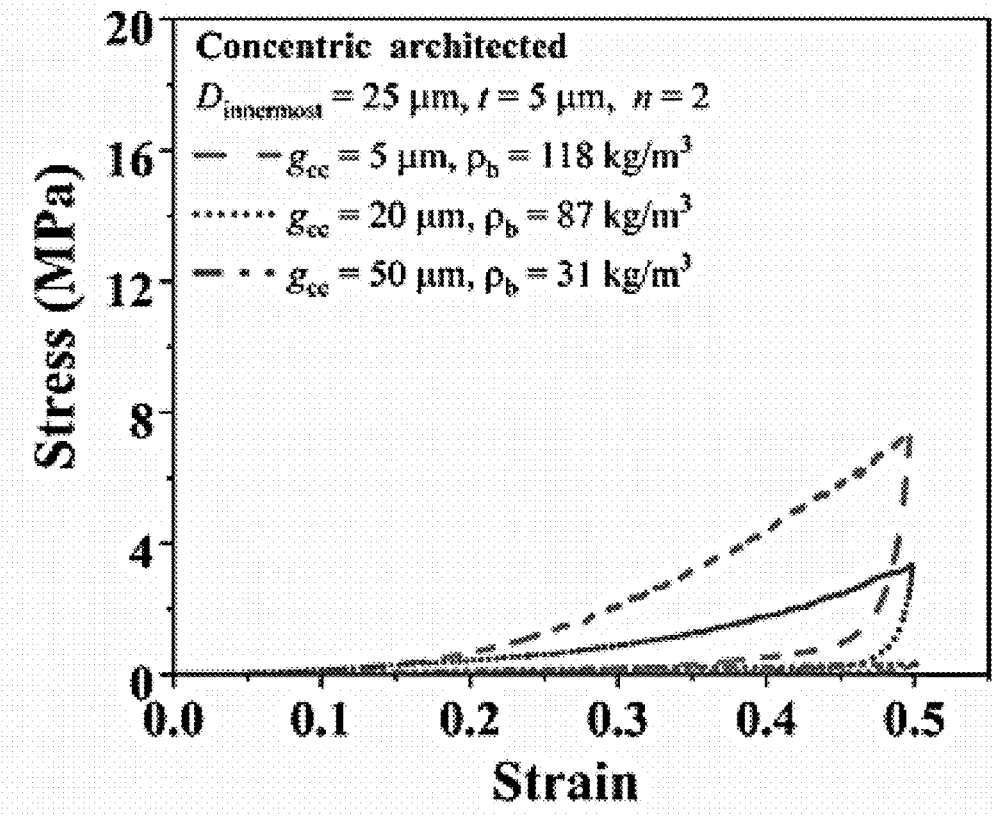
Figure 12B:
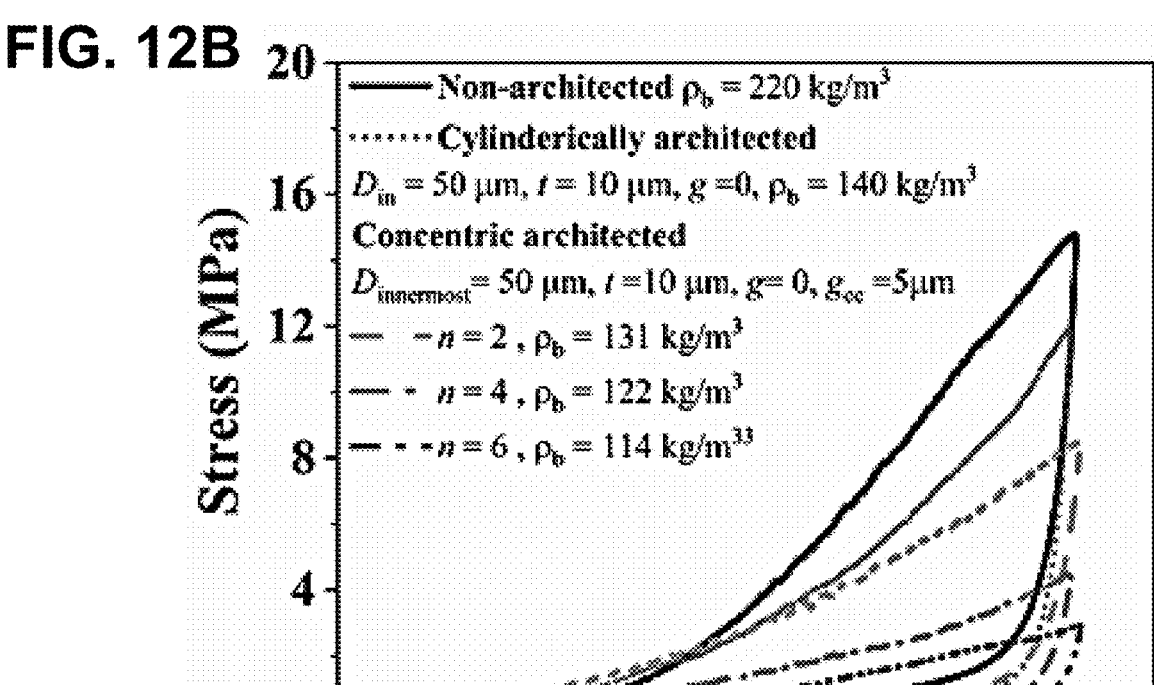
Figure 12D:
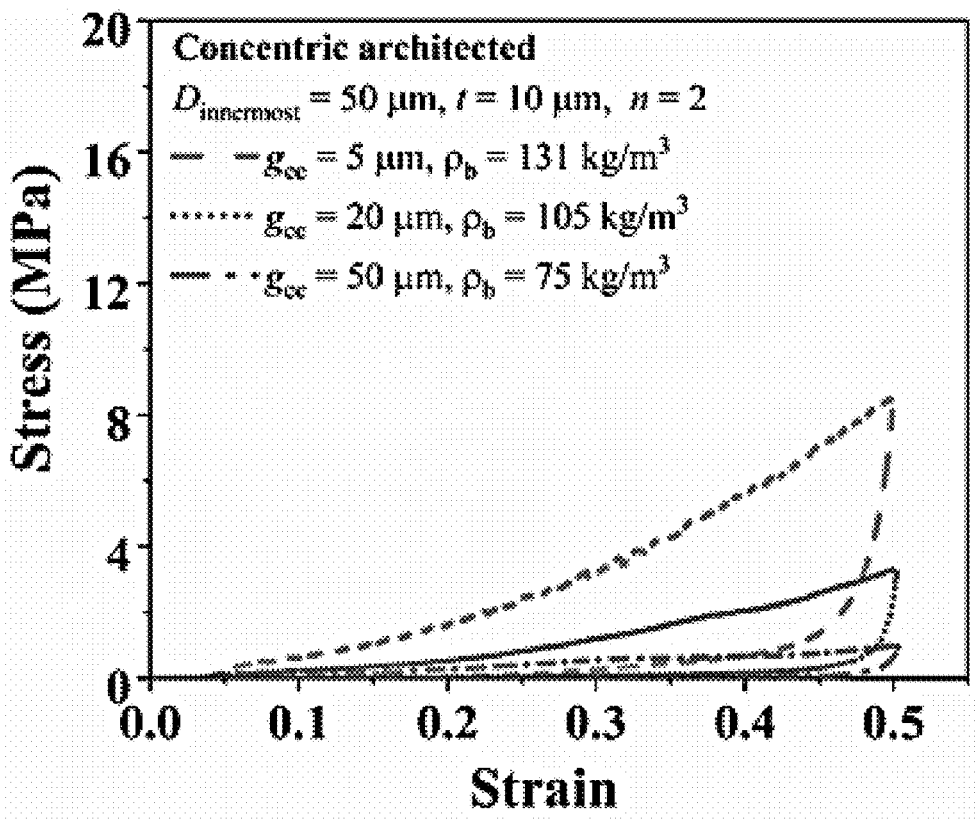
Figure 13A:
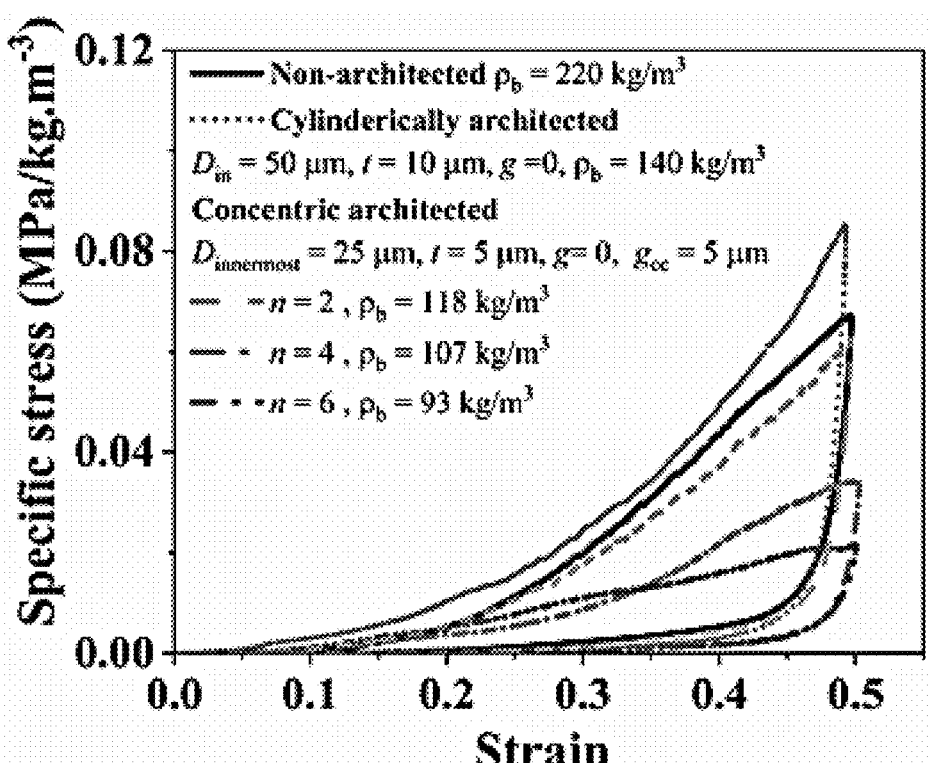
Figure 13C:
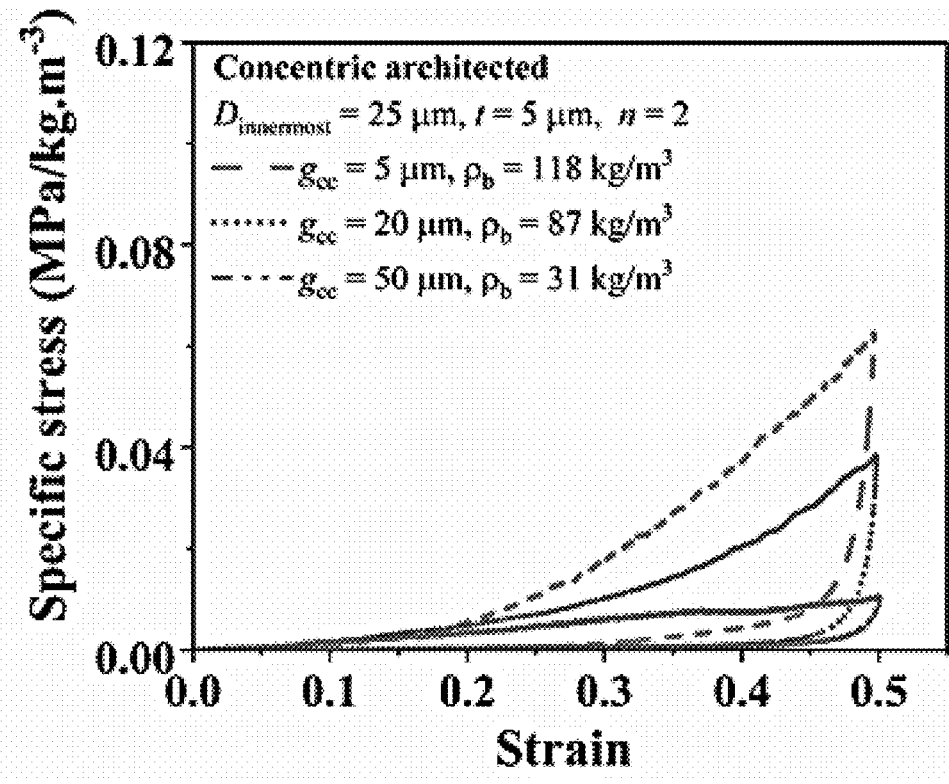
Figure 13B:
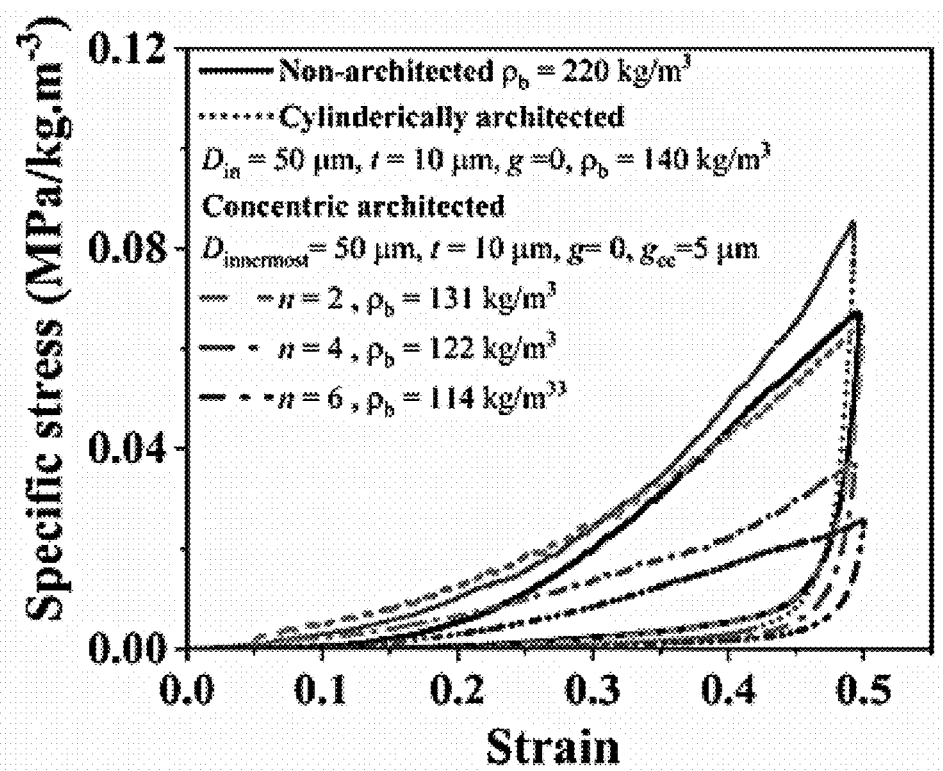
Figure 13D:
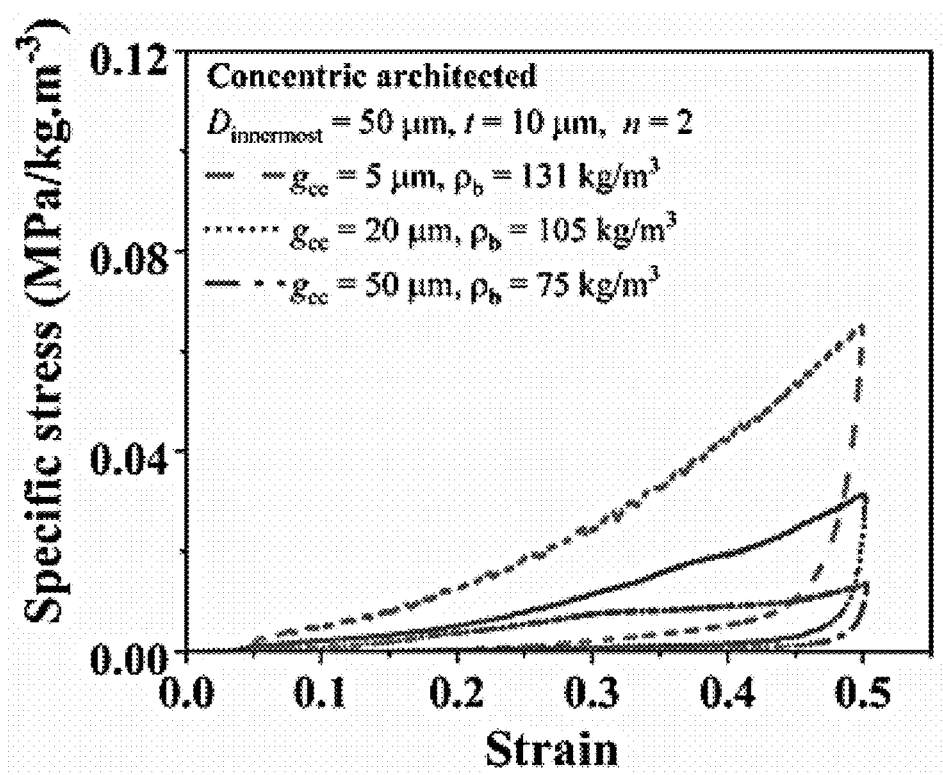
Figure 14A:
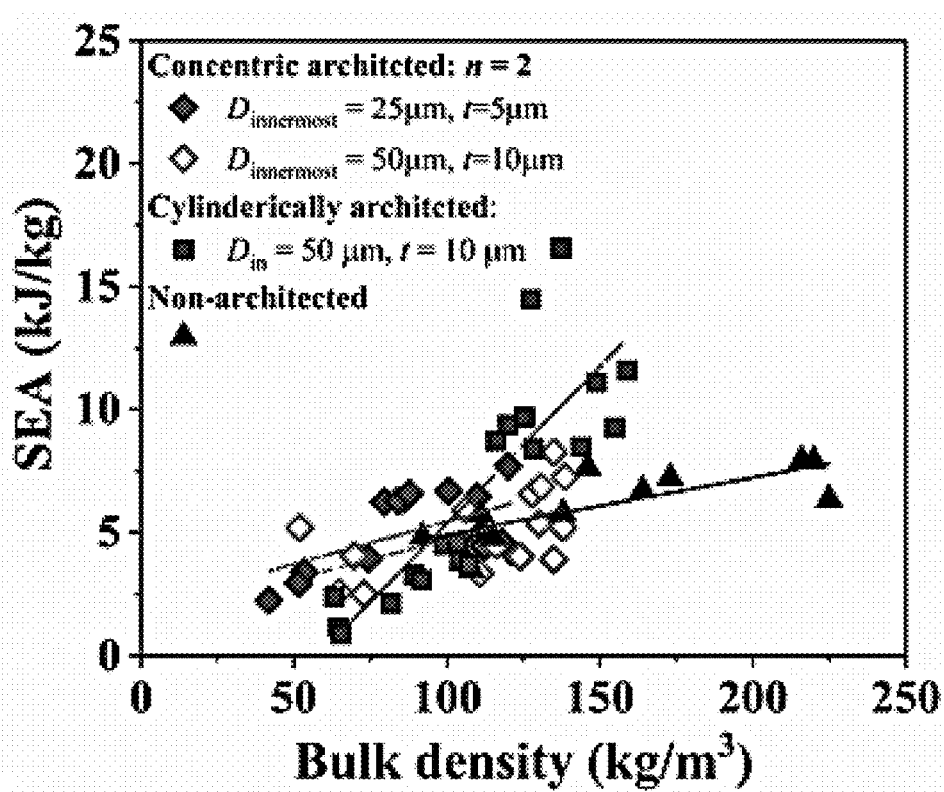
Figure 14C:
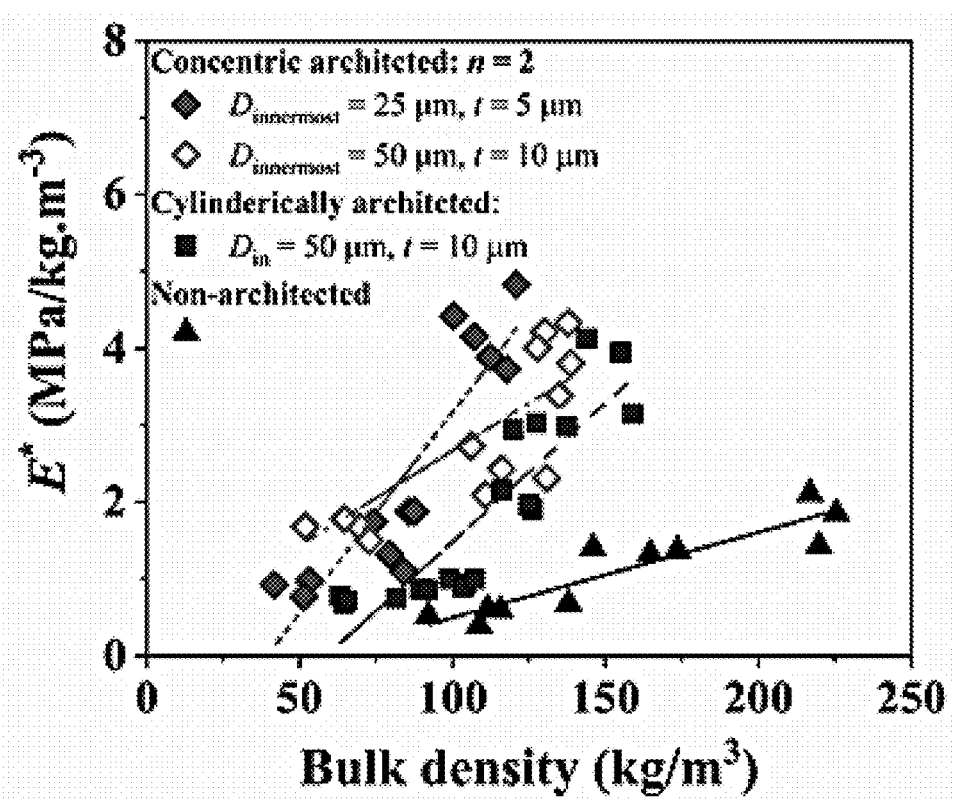
Figure 14B:
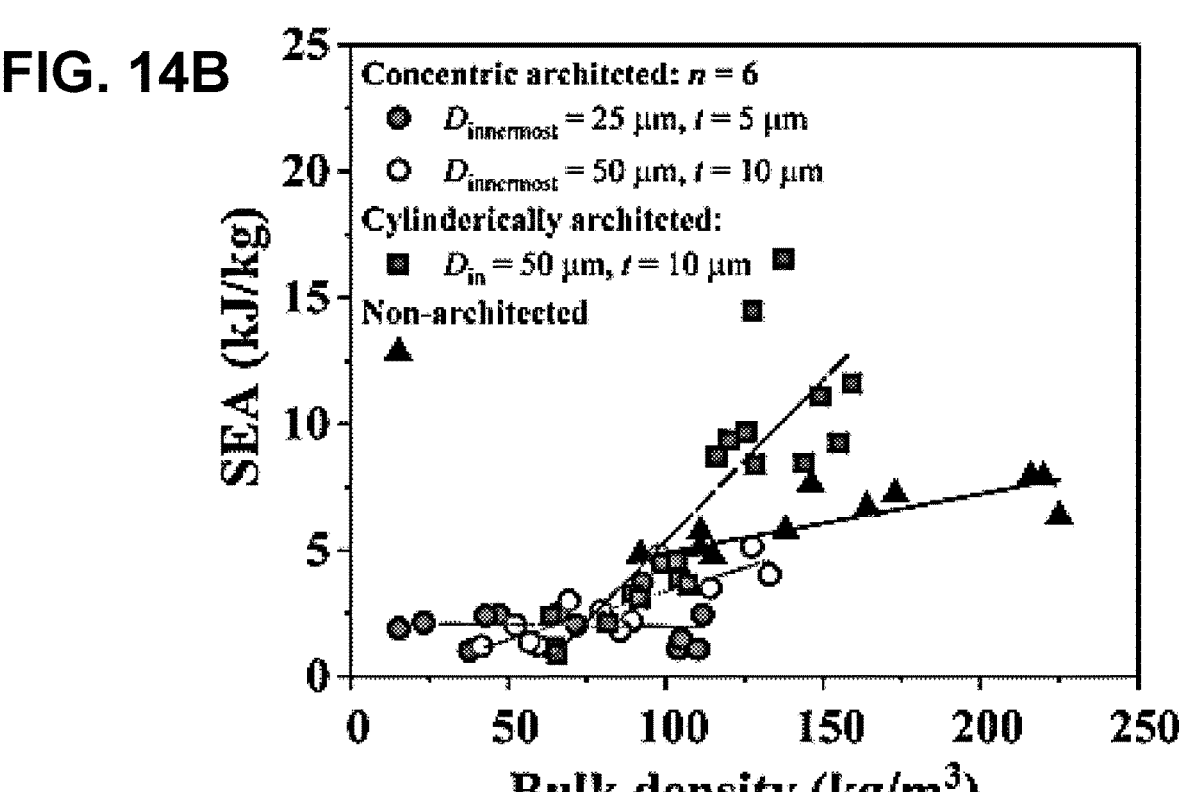
Figure 14D:
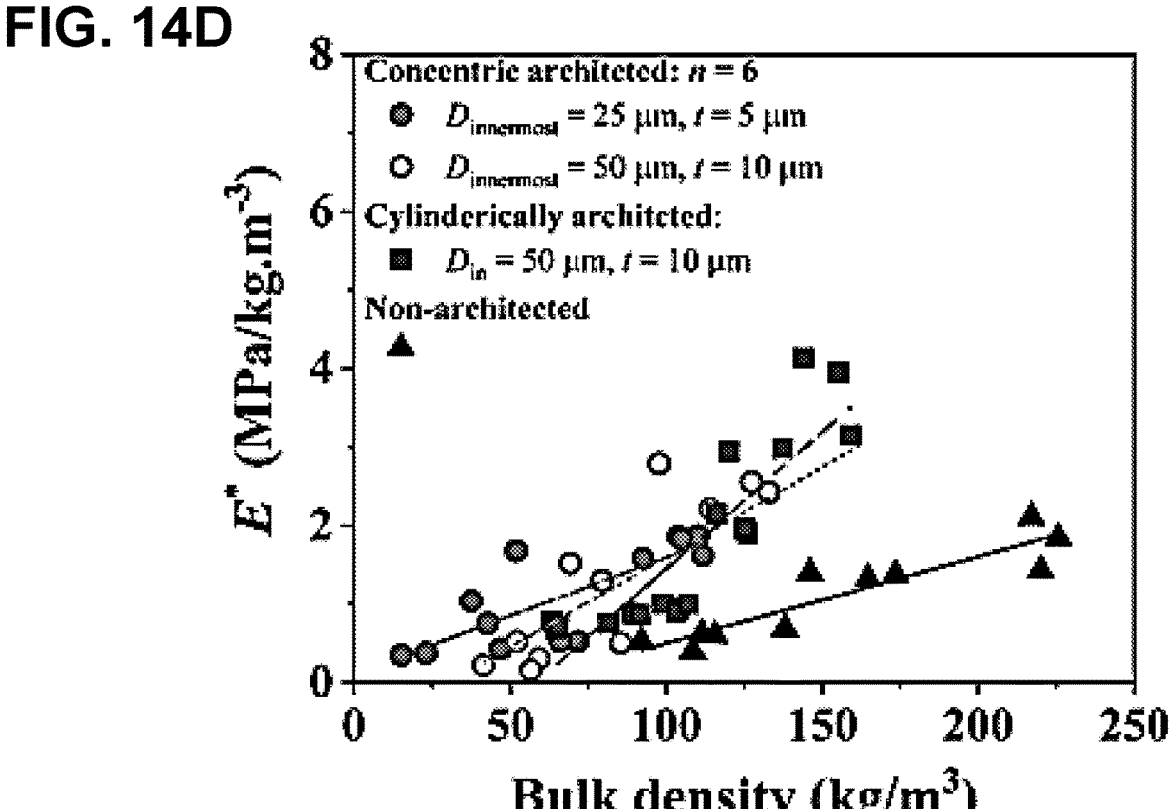

After synthesis, samples were characterized using SEM as
a function of design parameters—$D_{innermost}$, t and n. SEM
images (not shown) of a sectional view of the innermost
cylinder's thickness region revealed a clear increase in the
number of CNTs as the $D_{innermost}$ & t are increased and
decreased with an increase in n. However, the average outer
diameter of CNTs does not change significantly with either
of $D_{innermost}$ & t, n as listed in Table 7. (See also FIGS.
10A-10D.) For consistency, we obtained images at the
vertical midpoint of the growth direction from the same
location in every sample to measure the number of CNTs
and their diameter. We noticed no significant change in the
number of CNTs and diameter by changing the cylinder's location radially within concentric region (see FIGS. 11A-11H). The average number of CNTs for each combination of $D_{innermost}$ & t and n is determined by measuring the average count over five images (see FIG. 10D). The average bulk density for each combination of $D_{innermost}$ & t and n is determined by measuring average density over three samples (see FIG. 10C). It is evident that the increase in the number of CNTs (with an increase in $D_{innermost}$ & t and decrease in n) is reflected as an increase in the average bulk density of samples. We obtained the fill fraction for each combination of $D_{innermost}$ & t and n by dividing the area occupied by CNTs (i.e., excluding the area associated with hollow and gap regions) by the total sample area as listed in Table 7. The fill fraction increased with an increase in $D_{innermost}$ & t and decrease in n, implying that an increase in bulk density is the result of both an increase in the number of CNTs as well as the increase in the fill fraction.

TABLE 7

Fill fraction and number of CNTs as a function of design variables
for concentric cylindrically architected VACNTs.

| Design Variables | n | Fill fraction | Number of CNTs | Avg. CNT diameter |
|---|---|---|---|---|
| $D_{innermost}$ = 25 μm, | 2 | 0.499 | 75 ± 4 | 62.39 ± 1.05 |
| t = 5 μm, $g_{cc}$ = 5 μm | 4 | 0.482 | 64 ± 6 | 60.05 ± 0.98 |
| | 6 | 0.477 | 55 ± 5 | 59.98 ± 0.67 |
| $D_{innermost}$ = 50 μm, | 2 | 0.544 | 92 ± 4 | 60.05 ± 1.05 |
| t = 10 μm, $g_{cc}$ = 5 μm | 4 | 0.515 | 85 ± 2 | 59.74 ± 1.56 |
| | 6 | 0.507 | 79 ± 4 | 59.87 ± 1.32 |

FIGS. 12A-12D show the stress-strain curves for concentric cylindrically architected as a function of n for compressive strain up to 50%. When compressed, VACNT bundles start to buckle from the bottom (low-density and less stiff region close to the substrate) and sequentially progresses towards the top dense region of the sample causing nonlinear stress to rise with strain. The progressive buckling is governed by the intrinsic density gradient across the height of the sample resulting from synthesis-induced entangled morphology and continuous nucleation of new CNTs as the sample grows from bottom to top. SEM images of sectional views of cylinders' thickness after compression reveals the progressive buckling of CNTs (images not shown). Enlarged views show periodic buckles of approximately same size within concentric cylinders demonstrating strong lateral interaction between adjacent concentric cylinders. Referring back to FIGS. 12A-12D, it is evident that organizing VACNTs into concentric cylinders tuned their bulk density $(\rho_b)$ down to ~30 kg/m³. This is a reduction of a factor of ~7 when compared to non-architected VACNTs. An increase in the peak stress with an increase in $D_{innermost}$ & t and decrease in n was observed which correlates to the higher bulk density. The stress reduces when the gap between the concentric cylinders $(g_{cc})$ increases due to very low fill fractions of CNTs and negligible lateral interactions between adjacent concentric cylinders (see FIGS. 12C-12D).

For a clear comparison with cylindrically architected and non-architected VACNT foams (Example 1) of different densities, we show the specific stress as a function of strain (by normalizing stress with bulk density) in FIGS. 13A-13D. It is noteworthy that organizing VACNTs into hexagonally packed two mesoscale concentric cylinders reduced their density by nearly half ~118 kg/m³ while preserving the specific mechanical response as compared to non-architected VACNTs. In addition, samples reveal ~85% recovery after unloading irrespective of the design parameters. FIGS. 14A-14D show SEA and specific modulus E* (measured from the specific stress-strain curve) as a function of bulk density. It is evident that the concentric cylindrically architected samples (obtained by tuning $D_{innermost}$, t, n and $g_{cc}$) follow a similar trendline of SEA vs. bulk density as non-architected samples (obtained by varying hydrogen concentration). In the low density range i.e., 30-100 kg/m³, the SEA of the concentric cylindrically architected sample is even higher than the cylindrically architected sample (see FIG. 14A). Interestingly, the specific modulus of concentric samples is much higher than the non-architected VACNTs and similar to the cylindrically architected VACNTs for all densities (see FIG. 14C). The samples with two concentric cylinders (n=2) of $D_{innermost}$=50 μm & t=10 μm exhibit slightly higher specific properties achieved at higher bulk density when compared to the n=2 sample with $D_{innermost}$=25 μm & t=5 μm. The reduction in properties with n correlates with a reduction in the bulk density.

Figures 15D, 15E, 15F:
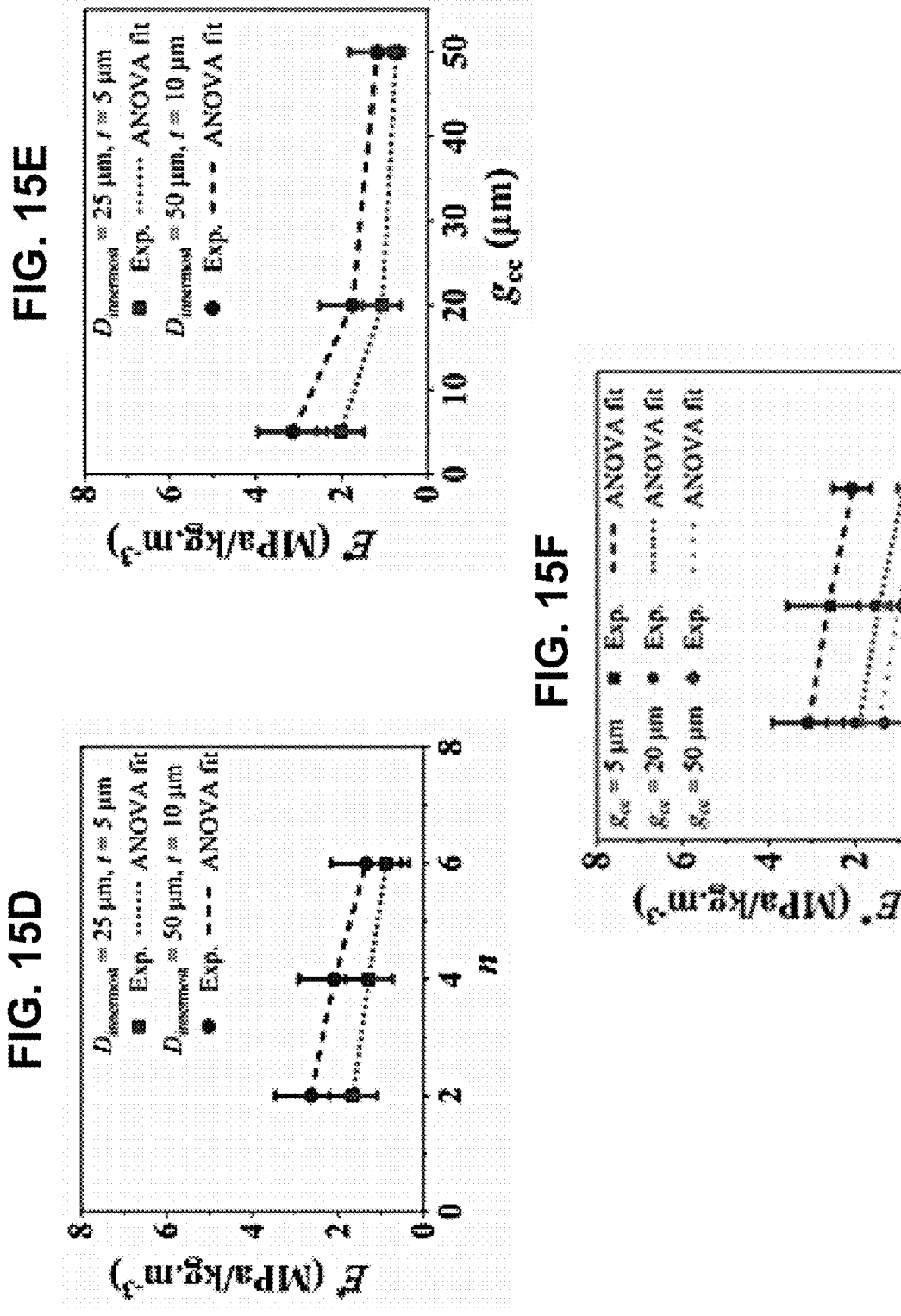

The experimental data from quasi-static compression tests are used for the ANOVA analysis to identify the most significant design variables and their interactions. We start the analysis by constructing a full factor ANOVA model considering all the interaction terms. ANOVA table shows the significance of individual and parameter interaction on each response variable based on p-values (see Table 8). A small-value (<0.05) indicates that the parameter significantly influences the response. From Table 8 and FIGS. 10A-10D through 13A-13D, we show that individual design variables significantly affect the stress-strain response and derived specific properties. FIGS. 15A-15I show the interaction plots of SEA, E*, and σ* for different combinations of design variables (in each plot, properties are averaged over the third variable). For example, for a particular combination of $D_{innermost}$ & t and n, the properties are averaged over different $g_{cc}$. As shown in FIG. 15A, no significant interaction of $D_{innermost}$ & t:n is noticed on SEA as the lines are nearly parallel and overlap with each other. The p-value (≫0.05) in Table 8 confirms the statistical insignificance of $D_{innermost}$ & t:n interaction. As shown in FIG. 15B, a significant interaction of $D_{innermost}$ & t:$g_{cc}$ can be observed i.e., at $g_{cc}$=5 μm, the SEA values are more spaced apart for different $D_{innermost}$ & t than for $g_{cc}$=50 μm. For a particular $D_{innermost}$ & t, the increase in properties at smaller $g_{cc}$ is a result of the enhanced lateral interaction between adjacent concentric cylinders. As shown in FIG. 15C, a significant interaction of n:$g_{cc}$ can be observed i.e., at n=2, the SEA values are more spaced apart for a particular $g_{cc}$ than for n=6. This also shows maximum improvement in SEA values for low levels of n and $g_{cc}$ as a consequence of combined effect of morphology evolution (increase in number density of CNTs arise from geometrically confined synthesis) and enhanced lateral interactions between the adjacent concentric cylinders. The p-values in Table 8 confirm their statistical significance.

To evaluate the significance of the third-order interaction among $D_{innermost}$ & t:$g_{cc}$:n, we plot SEA for each second-order interaction across levels of the third design parameter in FIGS. 17A-17G. None of the second-order interactions differs significantly among the different levels of third variable thus, it is reasonable to assume that the third-order interaction is not as significant as second-order interactions. Therefore, the less significant interaction terms— $D_{innermost}$ & t:n and $D_{innermost}$ & t:$g_{cc}$:n are removed from the full model. ANOVA is repeated for a reduced model by considering only significant interaction terms—$D_{innermost}$ & t:$g_{cc}$ and n:$g_{cc}$. We construct the best fit ANOVA model for SEA by considering only the significant interaction terms expressed as $$SEA = 5.69 + \alpha_{D_{innermost,t}:g_{cc}} + \beta_{n:g_{cc}} \tag{12}$$

For a best ANOVA fit model, the residuals (difference between observed and the predicted response) must satisfy the diagnosis tests for normality, homoscedasticity, and non-correlation. Diagnostic plots for adequacy checking of the reduced ANOVA model were obtained (not shown). The residuals vs. fitted plot suggests that the variance is almost constant and most of the points in the Q-Q plot lie in the diagonal line, suggesting that the error follows a normal distribution. The Shapiro-Wilk test was used to check the normality assumption in R programming language. The insignificant p-value in Table 9 suggests that the data is normally distributed (p-value=0.429). The Breusch-Pagan test was used to check the heteroskedasticity, the p-value=0.412 shows that heteroscedasticity was present in the model. The Durbin-Watson test was used to check some linear dependency or autocorrelation in residuals. The insignificant p-value suggests that the data has no correlation (p-value=0.180). We evaluate p-values for all the tests mentioned above for the reduced model by only selecting statistically significant interaction terms from the full model. We show that the reduced model with only statistically significant interaction terms satisfies all three tests for validating ANOVA assumptions. The SEA values obtained from best fit ANOVA model is plotted as dashed lines in FIGS. 14A-14C, which suggests a good fit with the experimentally obtained values.

Referring back to FIGS. 15D-15F, these show the parameter interaction plots for E*. From these plots, interactions $D_{innermost}$ & t:n and $D_{innermost}$ & t:$g_{cc}$ are significant. For e.g., E* values are more spaced apart at n=2 and $g_{cc}$=5 μm for a particular $D_{innermost}$ & t. The p-values in Table 8 confirm their statistical significance. The n:$g_c$ interaction is insignificant as E* values are equally spaced apart for different values of n and $g_{cc}$. The third-order interaction is insignificant which can be traced by the second-order interaction plots across different levels of third design parameters (see FIGS. 18A-18H). We use a similar strategy of formulating a simplified best fit ANOVA model considering only significant interaction terms and the best fit ANOVA model for E* can be expressed as $$E^* = 1.383 + \lambda_{D_{innermost}:g_{cc}} + \mu_{D_{innermost}:n} \tag{13}$$

Referring back to FIGS. 15G-15I, these show the second order parameter interaction plots for σ* and associated p-values are shown in Table 8. The $D_{innermost}$ & t:$g_{cc}$ interaction is significant for e.g., E* values are more spaced apart at $g_{cc}$=5 μm than $g_{cc}$=50 μm for a particular $D_{innermost}$ & t. Here, the third order interaction is also significant which can be noticed by tracing the noticeable difference in second-order interactions across different levels of the third variable (see FIGS. 19A-19H). For ease of interpretation and respect the model parsimony, we drop the lower order interaction terms when higher order interaction term is significant. Thus, the best fit ANOVA model for σ* considering only the third order interaction term can be expressed as $$\sigma_p^* = 0.0226 + \xi_{D_{innermost}:n:g_{cc}} \tag{14}$$

The insignificant p-values from all three diagnostic tests in Table 8 suggest that the residuals from the fitted model in Eqs. (13-14) satisfy ANOVA assumptions. The SEA values obtained from best fit ANOVA model are plotted as dashed lines in FIGS. 15G-15I, showing a good correlation with the experimentally obtained values. It is clear from the interaction plots that properties can be dramatically tailored by tuning the design variables. At low values of $g_{cc}$, all properties synergistically maximized for low level of n and a high level of $D_{innermost}$ & t while at higher values of $g_{cc}$, the effect of $D_{innermost}$ & t diminishes. The interplay among design variables enables achieving lightweight foams with tailorable mechanical properties, which is desirable for extreme protective applications.

TABLE 8

| | | SEA | | | E* | | | $\sigma_p^*$ | | |
|---|---|---|---|---|---|---|---|---|---|---|
| Parameter | Df | Sum Sq | F | p-value | Sum Sq | F | p-value | Sum Sq | F | p-value |
| $D_{innermost}$, t | 1 | 0.33 | 0.64 | 0.429 | 7.60 | 34.38 | $1.06 \times 10^{-6}$ | 4.98 | 14.41 | 0.000 |
| n | 2 | 47.59 | 46.58 | $1.03 \times 10^{-10}$ | 9.53 | 21.52 | $7.11 \times 10^{-7}$ | 6.58 | 9.53 | 0.000 |
| $g_{cc}$ | 2 | 50.09 | 49.03 | $5.27 \times 10^{-11}$ | 25.53 | 57.68 | $5.93 \times 10^{-7}$ | 2.51 | 36.39 | $2.27 \times 10^{-9}$ |
| $D_{innermost}$, t: n | 2 | 2.57 | 2.52 | 0.194 | 0.65 | 1.48 | 0.241 | 1.11 | 1.61 | 0.214 |
| $D_{innermost}$, t: $g_{cc}$ | 2 | 5.52 | 5.40 | 0.008 | 1.03 | 2.32 | 0.113 | 3.20 | 4.64 | 0.016 |
| n: $g_{cc}$ | 4 | 10.84 | 5.30 | 0.001 | 0.55 | 0.62 | 0.652 | 3.40 | 2.46 | 0.063 |
| $D_{innermost}$, t: $g_{cc}$: n | 4 | 7.67 | 3.75 | 0.112 | 1.28 | 1.44 | 0.240 | 3.18 | 2.30 | 0.077 |
| Residuals | 36 | 18.39 | | | 7.97 | | | 1.24 | | |

ANOVA results for SEA, E *, and σ*.

TABLE 9

Model selection using tests for checking ANOVA model adequacy.

| Response variable | Model | Durbin Watson test | Breush Pagan test | Shapiro wilks test | Independent variables |
|---|---|---|---|---|---|
| SEA | Full | 0.998 | 0.055 | 0.890 | — |
| | Reduced | 0.180 | 0.412 | 0.429 | $D_{innermost}$, t: $g_{cc}$: n: $g_{cc}$ |
| E* | Full | 0.968 | 0.023 | 0.115 | — |
| | Reduced | 0.902 | 0.299 | 0.180 | $D_{innermost}$, t: $g_{cc}$, $D_{innermost}$, t: n |
| $\sigma_p^*$ | Full | 0.610 | 0.025 | 0.273 | — |
| | Reduced | 0.564 | 0.120 | 0.273 | $D_{innermost}$, t: $g_{cc}$: n |

Figure 16A:
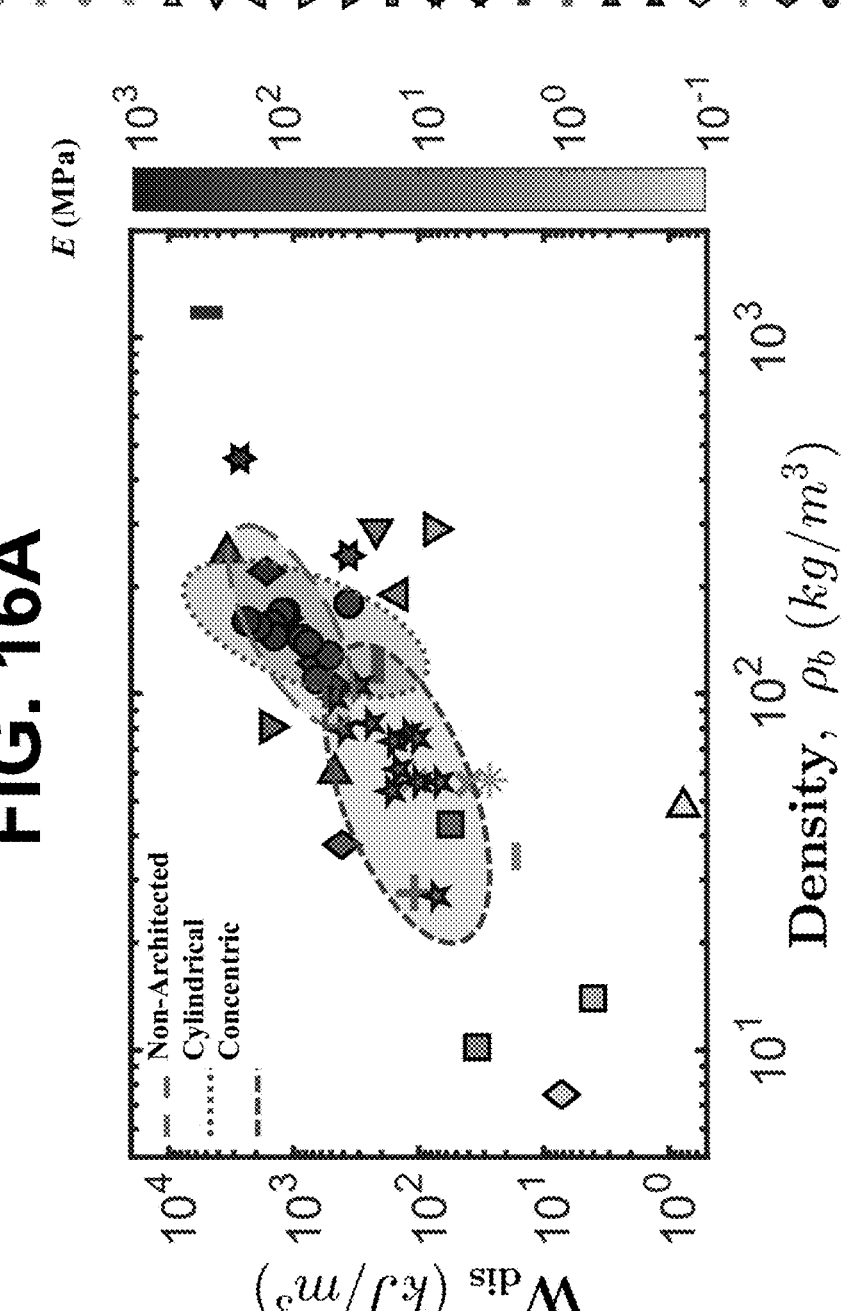
FIG. 16A shows Was-bulk density-E and FIG. 16B shows $W_{dis}$-modulus-($\sigma_p$) properties landscape of concentric cylindrically architected ($g_{cc}$=20 μm, $g_{cc}$=50 μm), cylindrically architected ($D_{in}$=50 μm, t=10 μm), and non-architected VACNTs (Example 1) compared with polymeric foams, metallic foams and other architected materials, showing synergistic property enhancement at low density for the present architected VACNTs.
Figure 16B:
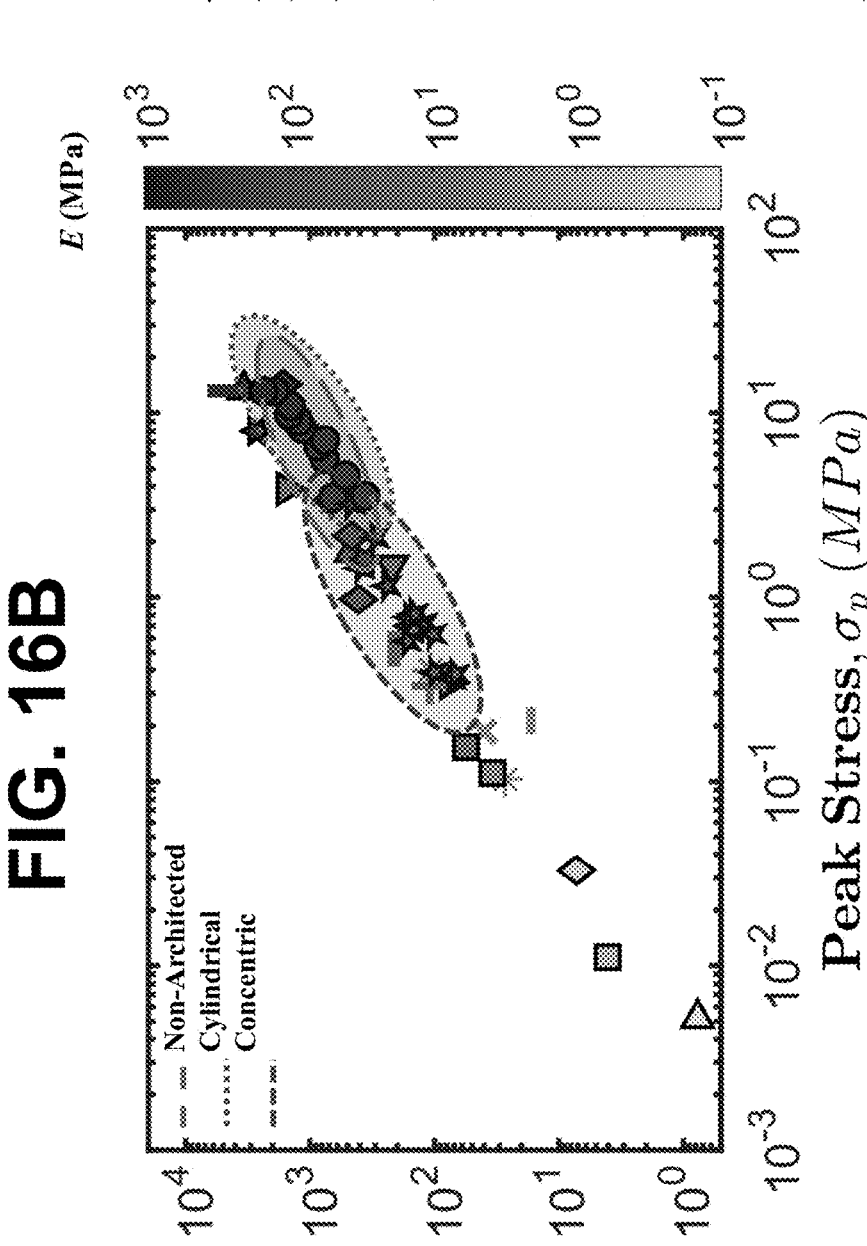
Figure 17H:
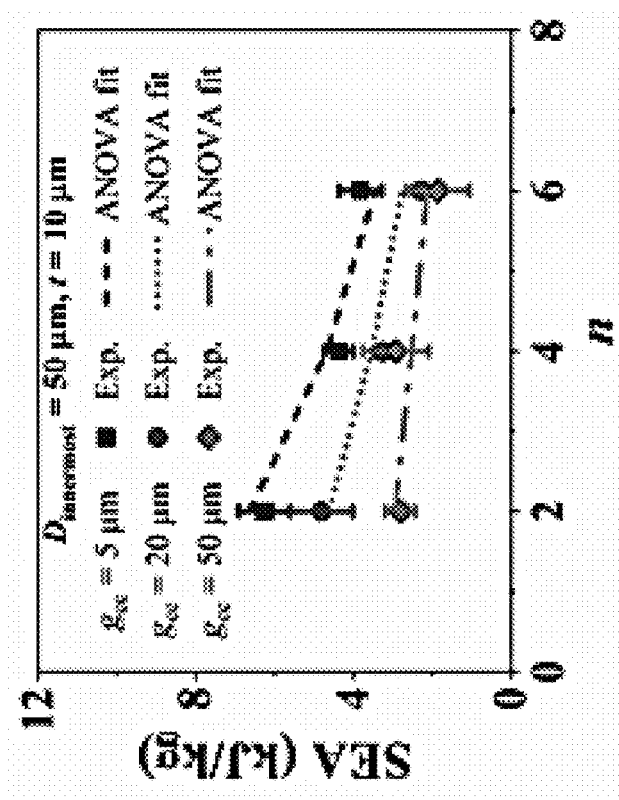
Figure 17G:
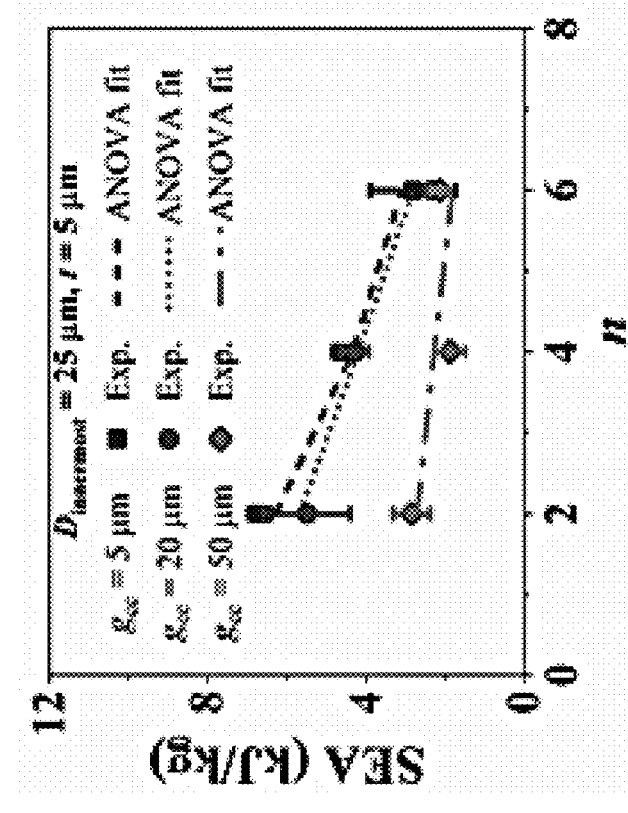
Figures 18A, 18B, 18C:
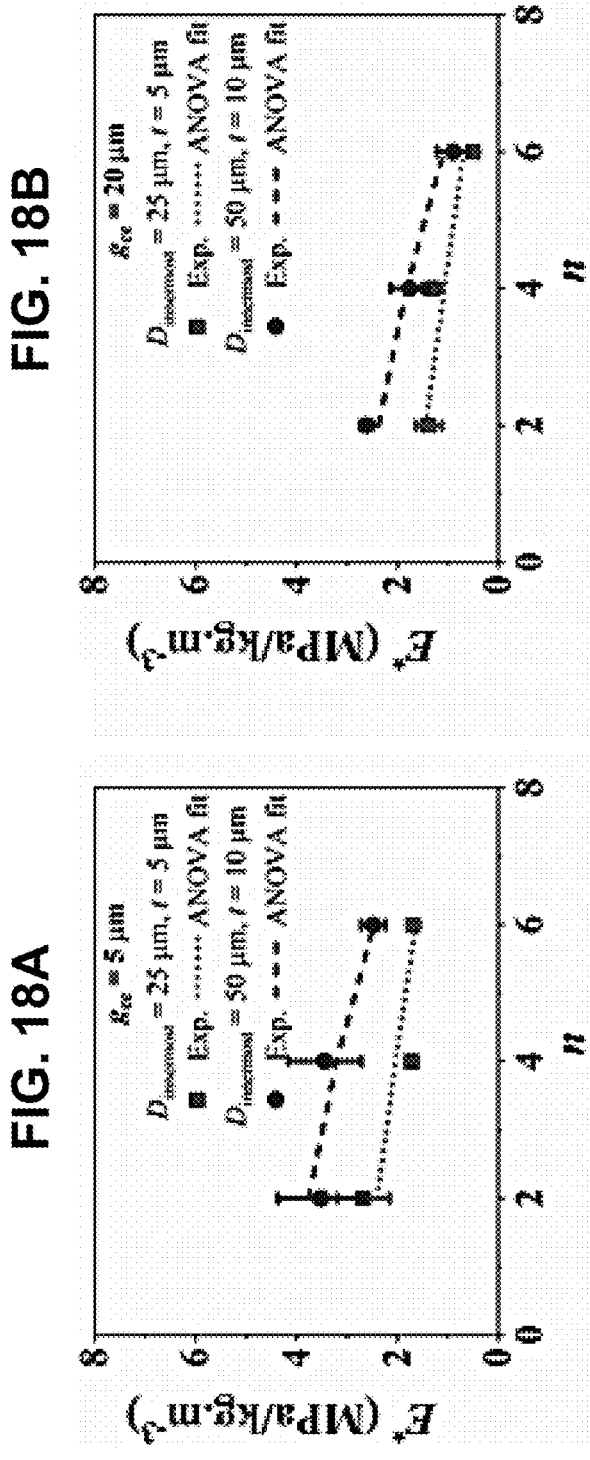
Figure 18H:
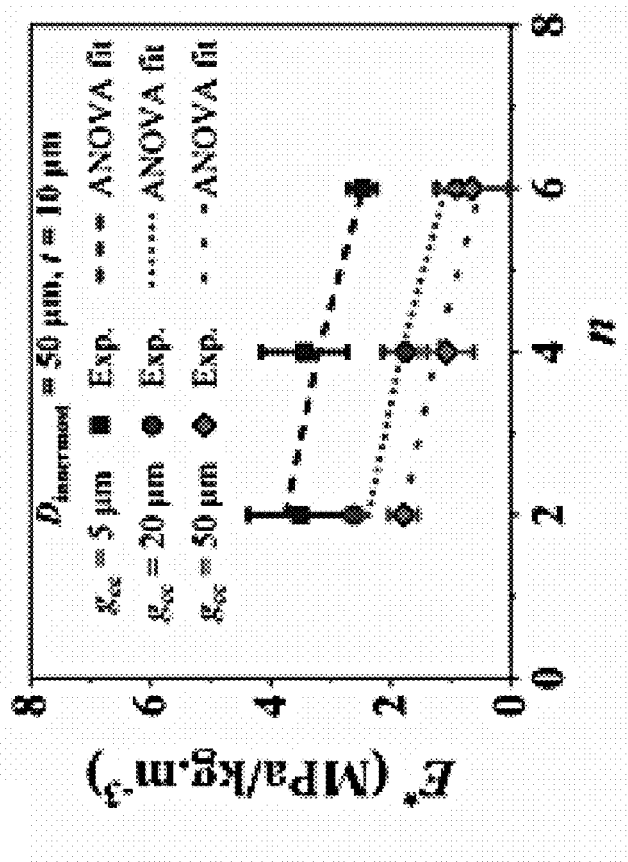
Figure 18G:
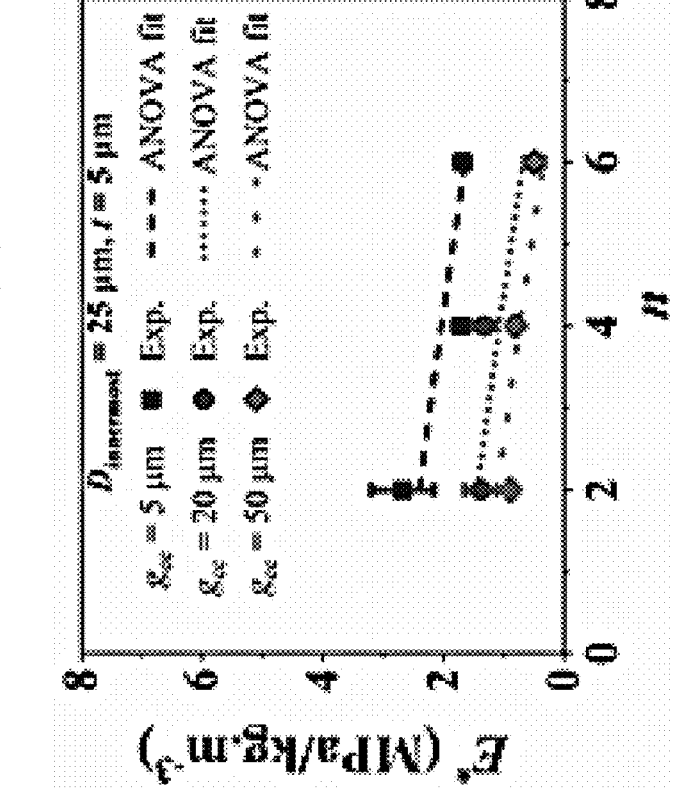
Figure 19H:
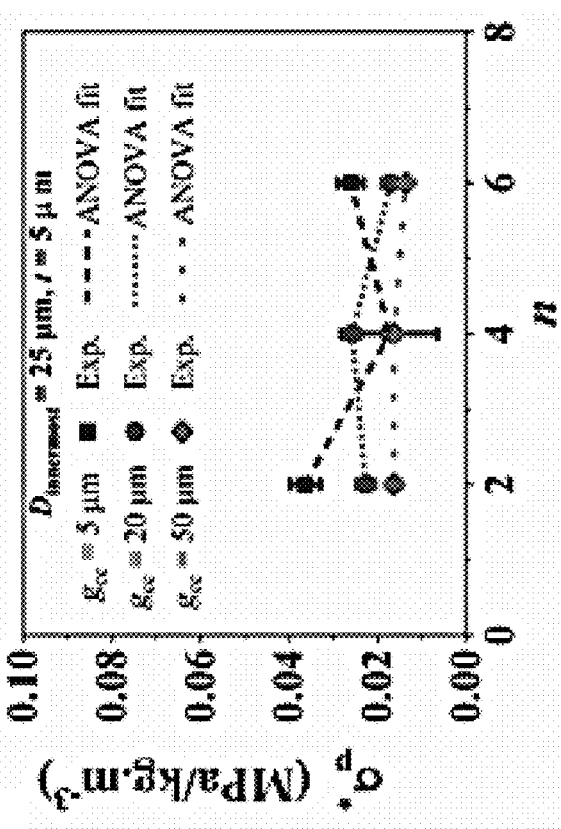
Figure 19G:
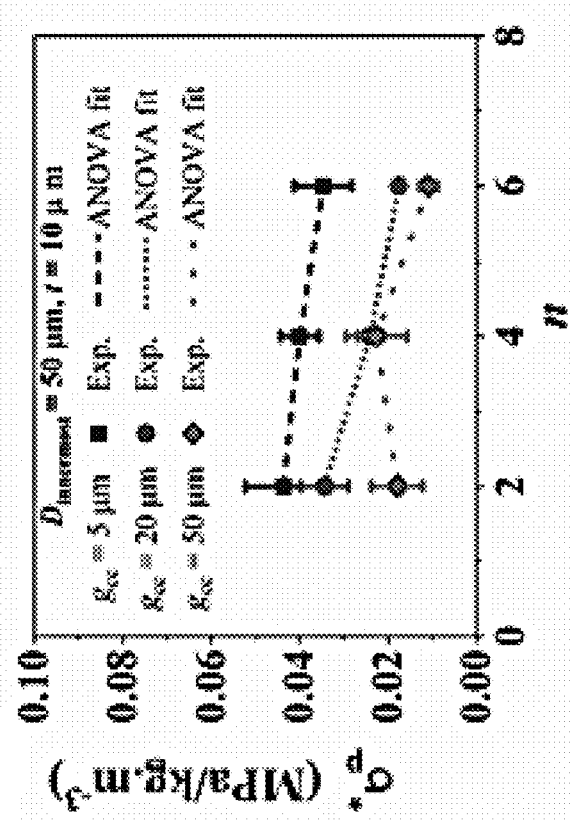

To compare the performance of concentric cylindrically architected VACNTs with cylindrically architected and non-architected (Example 1) and other protective foam-like materials, we show the SEA-bulk density-E* and SEA-$\sigma$*-E* property maps in FIGS. 16A-16B (calculated from stress-strain responses up to 50% strain if data is not provided in literature). This map shows that the present architected VACNTs have the advantage of tailoring SEA, E*, $$\sigma_p^*$$

synergistically at low density which is challenging to achieve in other materials as these properties are typically mutually exclusive. For example, polymeric foams such as polyurethane and polyethylene, are less dense and have lower SEA while metallic foams such as steel and aluminum have better SEA than polymeric foams, but are denser. Cylindrically architected VACNT foams as designed in Example 1 overcome these limitations by exploiting advantages of structural hierarchy, size-effects, and lateral interactions among adjacent cylinders. This Example 2 demonstrates that by organizing VACNT mesoscale cylinders concentrically, mechanical properties can be tailored towards the low-density regime (down to 15 kg/m$^3$). In fact, for the density range from 60-100 kg/m$^3$, concentric cylindrically architected VACNT foam even outperforms the cylindrically architected VACNT foam. It is noteworthy that for the concentric cylindrically architected VACNT foam with n=2, we were able to preserve the mechanical response as non-architected VACNT foams, but at reduced density while n=6 allowed us to achieve much lightweight foam (down to 15 kg/m$^3$) with superior properties as compared to many polymeric, metallic foams and other architected foams of similar densities. Concentric cylindrically architected VACNT foams also demonstrate high specific compressive strength $$\left(\sigma_p^*\right)$$

compared to polymeric foams, metallic foams, and other architected foams (see FIG. 16B). Compared to Zorbium (polyurethane) foams (Ruan, D., et al. *Composite structures* 57, 331-336 (2002)), which are currently used in advanced combat helmet liners, concentric cylindrically architected VACNT foams of similar density (~57 kg/m 3) exhibit 4 times higher SEA, 48 times higher specific modulus, and 10 times higher specific strength at 50% strain and at same quasistatic strain rate along with phenomenal thermal stability.

Conclusions

We achieved synergistic improvement in SEA, specific modulus, and specific strength at much lighter weight by introducing hexagonally closed-packed mesoscale concentric cylindrical architectures in bulk (non-architected) VACNTs. We show that by organizing cylinders concentrically along with tuning their design parameters density may be tailored over a broad range while preserving their mechanical response as non-architected VACNTs. In the low density regime, the concentric cylindrically architected VACNT foam even outperforms the cylindrically architected VACNT foam. From full factorial design of experiments and Analysis of Variance (ANOVA) approach, we observed significant higher order interactions among the design parameters of the concentric cylinders—leading to tailorable density regimes with synergistically improved mechanical properties. We show that these interactions arise from morphology evolution of CNTs number density (tailored by innermost diameter, thickness, and number of concentric cylinders) and lateral interactions among adjacent concentric cylinders (tailored by the gap between them). The concentric cylindrically architected VACNT foams exhibit higher specific properties than commercial polymeric, metallic, and other architected foam materials at lighter weights. The tailorability of the concentric architected VACNT foams enable the design and synthesis of lightweight materials with desired mechanical properties for protective applications.

Additional information, including data, plots, etc. referenced as "not shown" above, may be found in U.S. Ser. No. 63/402,719, filed Aug. 31, 2022, which is hereby incorporated by reference in its entirety.

Example 3

Nested Architected VACNT Foams

Nested architected VACNTs as shown in FIGS. 20D and 21A-21F were constructed by packing seven equal-sized cylinders into a larger cylinder. The number seven was selected as this results in the highest packing density and importantly, each pair among seven cylinders are mutually tangent, exploiting nanoscale lateral interactions between adjacent cylinders. By repeating this process, the higher-order cylindrically architected VACNTs were generated. Design parameters for the nested architected VANCTs are shown in Table 10.

TABLE 10

Design parameters for nested architected VACNTs.

| Design parameters | Values |
|---|---|
| $D_{in}$ & t (μm) | 25 & 5 |
| k | 0, 1, 2, 3 |

Figure 22A:
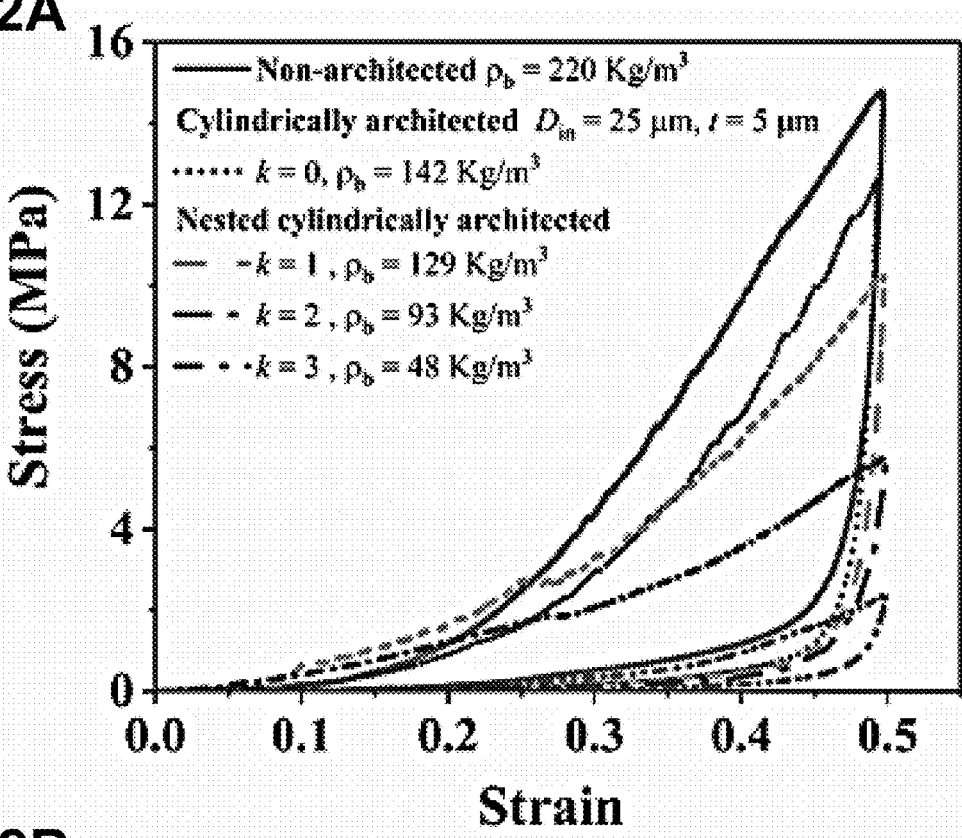
FIGS. 22A-22B show stress-strain curves for nested architected VACNTs.
Figure 22B:
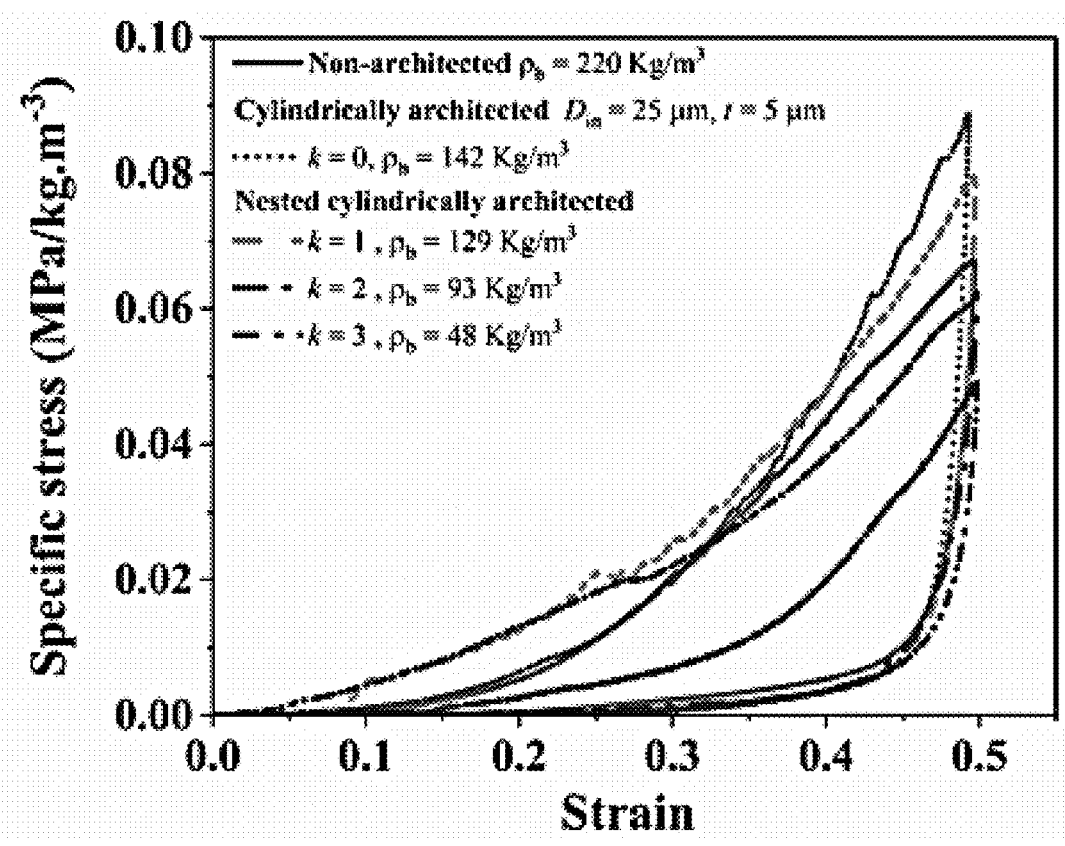
Figure 24A:
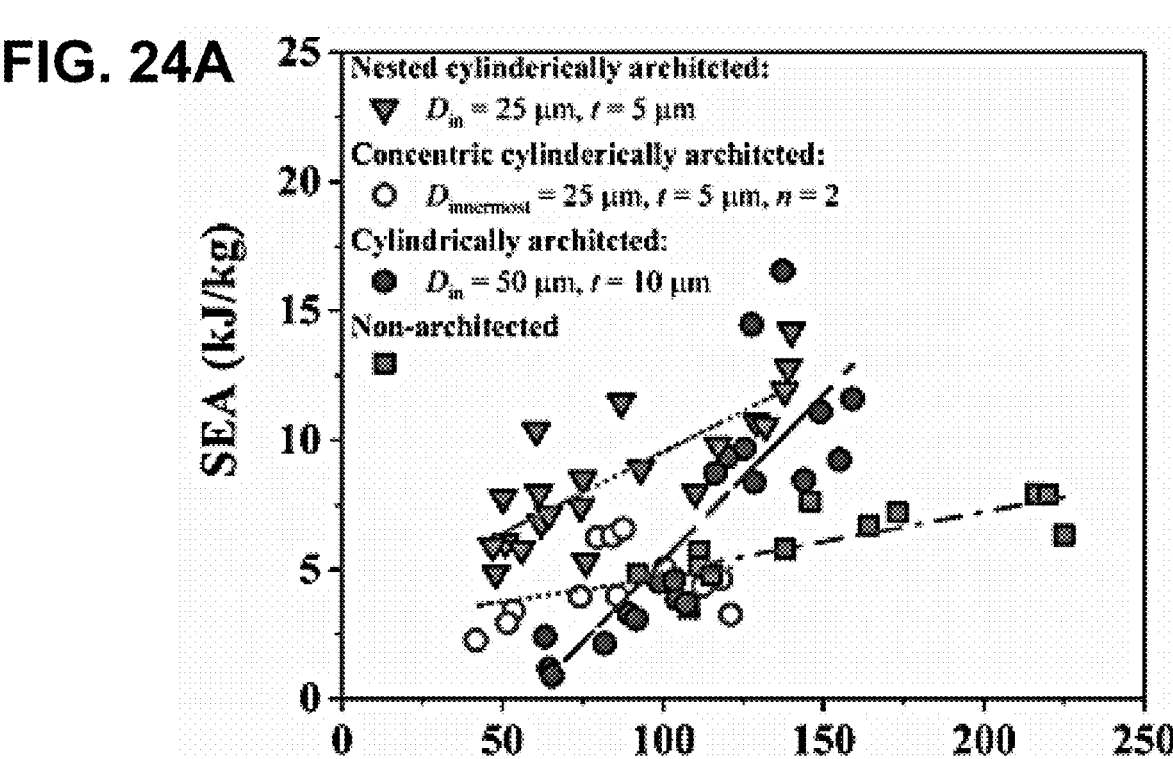
FIGS. 24A-24B show a comparison of SEA and specific modulus for nested architected (Example 3), concentric cylindrically architected (Example 2), cylindrically architected (Example 1) and non-architected (Example 1) VACNTs as a function of bulk density.
Figure 24B:
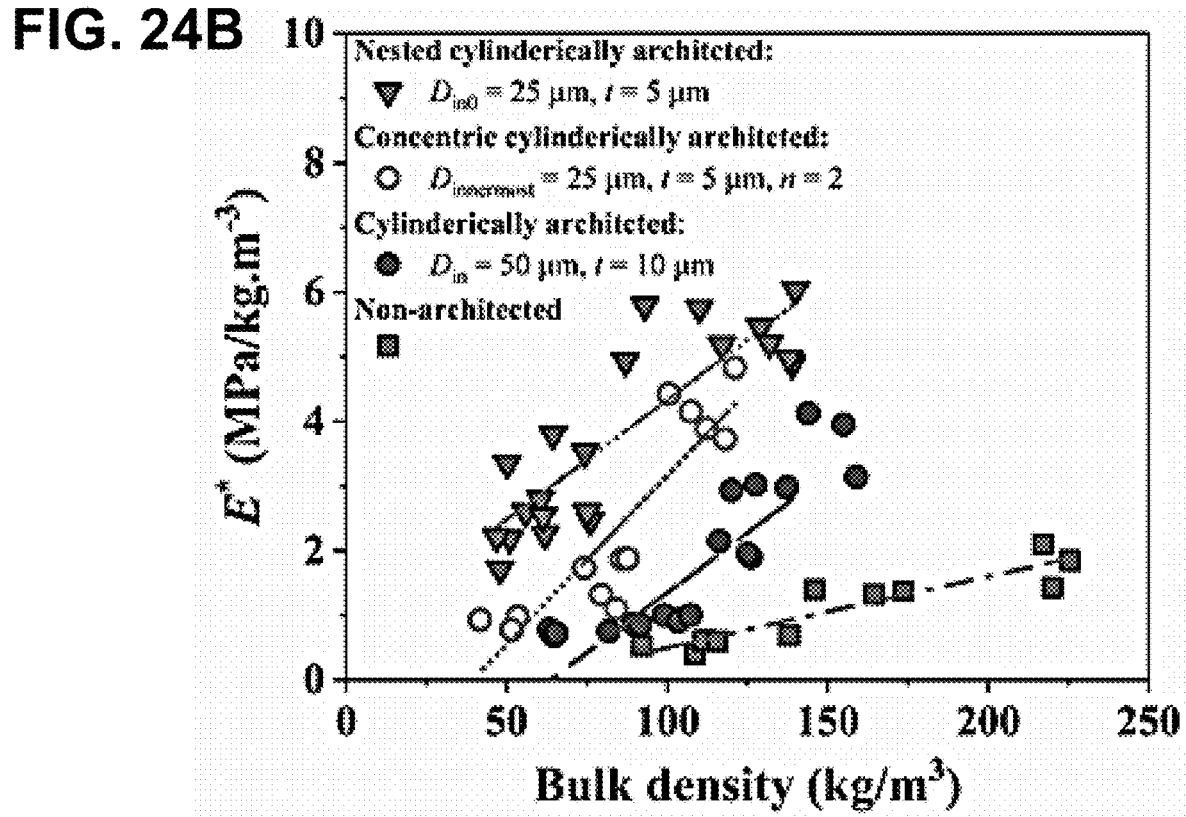
Figure 25A:
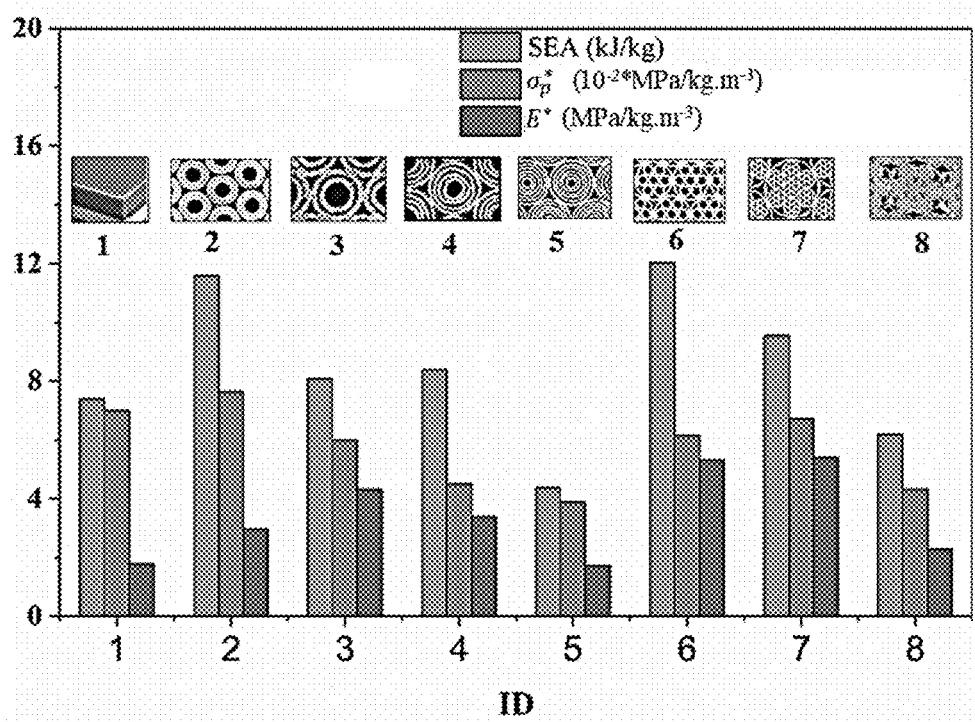
FIGS. 25A-25B show a specific properties comparison for all VACNT designs (FIG. 25A) SEA, specific modulus, and specific compressive strength and (FIG. 25B) bulk density comparison among best cylindrically architected (Example 1), concentric cylindrically architected (Example 2), nested architected (Example 3), and non-architected (Example 1) VACNTs. Columns: (1) non-architected, (2) cylindrically architected, (3) concentric cylindrically architected n=2, (4) concentric cylindrically architected n=4, (5) concentric cylindrically architected n=6, (6) nested architected k=1, (7) nested architected k=2, (8) nested architected k=3.
Figure 25B:
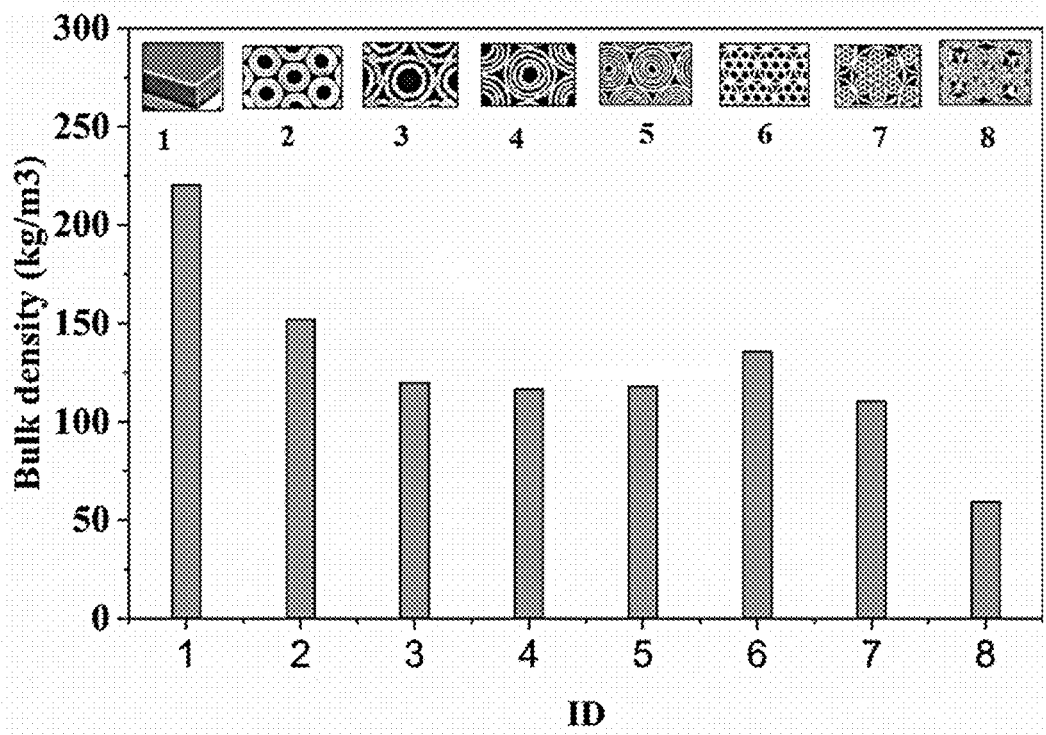

Stress-strain curves for the nested architected VANCTs were generated. As shown in FIGS. 22A-22B, organizing VACNTs into nested cylinders allowed them to be lighter while preserving specific mechanical response as cylindrically architected VACNTs (Example 1). The results show that an increase in k results in lower specific peak stress attributed to a reduction in fill fraction.

Specific properties of the nested architected VANCTs as a function of hierarchical level k were tested. Properties were tailored by nested hierarchical level k. As shown in FIGS. 23A-23C, nested architected VANCTs with level 1 (k=1) exhibited higher SEA, specific modulus, and specific peak stress as level 0 (k=0) but at reduced bulk density. Noteworthy is that the specific modulus for level 1 is 1.85 times higher than level 0 (FIG. 23B).

Specific properties of the nested architected VANCTs compared to designs generated in previous examples were tested. Nested architected VANCTs demonstrated superior properties compared to other architected and non-architected VACNTs at a much lighter weight (FIGS. 24A-24B and 25A-25B). For example, nested architected VACNTs with level 1 exhibited 1.7 times higher SEA, and 3 times higher specific modulus than non-architected VACNTs at 40% reduced density.

The property landscape for nested architected VANCTs was assessed. Specific properties of nested architected (Example 3), concentric cylindrically architected (Example 2), cylindrically architected (Example 1), and non-architected VACNTs (Example 1) were compared with existing protective foam-like materials (calculated from stress-strain responses up to 50% strain if data is not provided in literature) (FIGS. 26A-26B). Nested architected VACNT foams outperformed cylindrically architected, concentric cylindrically architected, and non-architected VACNT foams, polymeric foams, metallic foams, and other architected foams. Compared to Zorbium (polyurethane) foams (Ruan, D., et al. *Composite structures* 57, 331-336 (2002)), which are currently used in advanced combat helmet liners, nested architected VACNT foams of the same density (~57 kg/m$^3$) exhibited 7.2 times higher SEA, 108 times higher specific modulus, and 24 times higher specific compressive strength.

Example 4

Thermal Properties of Architected VACNTS Foams

In this Example, cylindrically architected VACNT foams were synthesized as described in Example 1, with $D_{in}$=50 μm, g=0, and t=10, 20, 40, and 100 μm. Thermal diffusivity (a) was measured across a temperature range of from 25° C. to 200° C. using a laser flash apparatus according to the American Society of Testing and Materials (ASTM) standard E1461-11. Specific heat capacity ($C_p$) was measured across the same temperature range using differential scanning calorimetry (DSC, TA Instruments, model Q100).

Regarding thermal diffusivity, the results showed that α decreases with an increase in temperature from 25° C. to 200° C. The results further show that wall thickness (t) of the cylinders in the architecture does not have a noticeable effect on a. Notably, the VACNTs exhibit up to two orders of magnitude higher a compared to polymeric foams (~0.11-0.17 mm$^2$/s) and an order of magnitude higher a compared to the metallic (~2.64 mm$^2$/s for NiCrAl foam) and ceramic foams (~1.84 mm$^2$/s for Mullite foam) near room temperature.

Regarding specific heat capacity, the $C_p$ measured as a function of temperature demonstrated a linear increase with increasing temperature. The $C_p$ does not show a significant dependence on the architected cylinder wall thickness (t) in architected VACNTs. The VACNTs have much less specific heat capacity (~15-45% less near room temperature) and diffuse heat very fast compared to the polymeric foams such as polyurethane and phenolic, which is desirable for protective applications in extreme environments.

Effective thermal conductivity ($k_{eff}$) was calculated from the relation $k_{eff}$=$\rho C_p \alpha$, where $\rho$ is the bulk density of the sample. The $k_{eff}$ of the present architected VACNT foams and non-architected VACNT foams as a function of $\rho$ and temperature T was compared to those reported in the literature for VACNTs and other polymeric, metallic, ceramic foams, SiC nanowire aerogel and architected lattices. Metallic and ceramic foams such as aluminum (Al) and alumina foams have higher $k_{eff}$ but they are of much higher density while polymer foams have lower density but exhibit poor $k_{eff}$. The VACNTs demonstrate one to two orders of magnitude higher $k_{eff}$ compared to polymeric, metallic, and ceramic foams. In addition, $k_{eff}$ of the present architected VACNT foams is higher (~2.3 times) than that of the multi-walled VACNTs of similar density near room temperature. Notably, the $k_{eff}$ of the present architected VACNT foams is nearly the same as that of graphite but at much lower densities. The mesoscale cylindrical architecture allows tailoring the $k_{eff}$ and $\rho$. The present architected VACNT foams also exhibit a desirable sub-linear scaling of $k_{eff}$ with density with a power exponent 0.92 ($k_{eff}$≡$\rho$0.92) unlike the steeper higher order scaling observed in metallic (Al, $k_{eff}$≡$\rho$1.14) and ceramic (alumina, $k_{eff}$≡$\rho$1.75) foams, and architected nanolattice (alumina, $k_{eff}$≡$\rho$1.17) near room temperature. This sub-linear scaling law shows the unique advantage of the present architected VACNT foams where the density can be significantly reduced without degrading the $k_{eff}$ significantly.

We claim:

1. A foam comprising tubes substantially aligned longitudinally in a first direction, wherein:

each tube defines an outer wall and an inner wall, and each tube comprises an entangled bundle of carbon nanotubes substantially aligned longitudinally in the first direction; and tubes in at least a subset of the tubes are positioned with respect to each other to form one or more first hexagonal units, wherein each first hexagonal unit comprises first-hexagonal-unit tubes, wherein the first-hexagonal-unit tubes comprise six peripheral first-hexagonal-unit tubes and a central first-hexagonal-unit tube, wherein the six peripheral first-hexagonal-unit tubes surround the central first-hexagonal-unit tube in a juxtaposed, hexagonal configuration, wherein the foam further comprises a first boundary tube surrounding at least one first hexagonal unit in a nested configuration to thereby form a first bounded unit.

2. The foam of claim 1, wherein the tubes are in the form of cylinders.

3. The foam of claim 1, wherein the foam comprises multiple first bounded units, wherein the multiple first bounded units are positioned with respect to each other in one or more second hexagonal units, each second hexagonal unit comprising six peripheral first bounded units surrounding a central first bounded unit in a juxtaposed, hexagonal configuration.

4. The foam of claim 3, further comprising a second boundary tube surrounding at least one second hexagonal unit in a nested configuration to thereby form a second bounded unit.

5. The foam of claim 4, wherein the foam comprises multiple second bounded units, wherein the multiple second bounded units are positioned with respect to each other in one or more third hexagonal units, each third hexagonal unit comprising six peripheral second bounded units surrounding a central second bounded unit in a juxtaposed, hexagonal configuration.

6. The foam of claim 5, further comprising a third boundary tube surrounding at least one third hexagonal unit in a nested configuration to thereby form a third bounded unit.

7. The foam of claim 6, wherein the foam comprises multiple third bounded units, wherein the multiple third bounded units are positioned with respect to each other in one or more fourth hexagonal units, wherein each fourth hexagonal unit comprises six peripheral third bounded units surrounding a central third bounded unit in a juxtaposed, hexagonal configuration.

8. The foam of claim 3, wherein the first-hexagonal-unit tubes of each first bounded unit have a diameter $D_{in}$ of from 20 μm to 50 μm, a thickness t of from 0.1 μm to 10 μm, and define a gap g of from 0 μm to 10 μm; further wherein gaps between neighboring first boundary tubes are in a range of from 0 μm to 10 μm, and gaps between neighboring first boundary tubes and first-hexagonal-unit tubes are in a range of from 0 μm to 10 μm.

9. The foam of claim 8, wherein g is 0 μm, gaps between neighboring first boundary tubes are 0 μm, and gaps between neighboring first boundary tubes and first-hexagonal-unit tubes are 0 μm.

10. A foam comprising tubes substantially aligned longitudinally in a first direction, wherein:

each tube defines an outer wall and an inner wall, and each tube comprises an entangled bundle of carbon nanotubes substantially aligned longitudinally in the first direction; and tubes in at least a subset of the tubes are positioned with respect to each other to form one or more first hexagonal units, wherein each first hexagonal unit comprises first-hexagonal-unit tubes, wherein the first-hexagonal-unit tubes comprise six peripheral first-hexagonal-unit tubes and a central first-hexagonal-unit tube, wherein the six peripheral first-hexagonal-unit tubes surround the central first-hexagonal-unit tube in a juxtaposed, hexagonal configuration, wherein the first-hexagonal-unit tubes of each first hexagonal unit define a gap g of no more than 20 μm.

11. The foam of claim 10, wherein g is greater than 0 μm.

12. A helmet comprising a foam comprising tubes substantially aligned longitudinally in a first direction, wherein:

each tube defines an outer wall and an inner wall, and each tube comprises an entangled bundle of carbon nanotubes substantially aligned longitudinally in the first direction; and tubes in at least a subset of the tubes are positioned with respect to each other to form one or more first hexagonal units, wherein each first hexagonal unit comprises first-hexagonal-unit tubes, wherein the first-hexagonal-unit tubes comprise six peripheral first-hexagonal-unit tubes and a central first-hexagonal-unit tube, wherein the six peripheral first-hexagonal-unit tubes surround the central first-hexagonal-unit tube in a juxtaposed, hexagonal configuration, and further wherein:

the helmet is configured to cover at least a portion of an object and to attenuate an external force acting on the object.

13. The helmet of claim 12, wherein the foam is configured to attenuate both linear and rotational accelerations from an oblique impact to the helmet.

14. A foam comprising tubes substantially aligned longitudinally in a first direction, wherein:

each tube defines an outer wall and an inner wall, and each tube comprises an entangled bundle of carbon nanotubes substantially aligned longitudinally in the first direction; and tubes in at least a subset of the tubes are positioned with respect to each other to form one or more first hexagonal units, wherein each first hexagonal unit comprises first-hexagonal-unit tubes, wherein the first-hexagonal-unit tubes comprise six peripheral first-hexagonal-unit tubes and a central first-hexagonal-unit tube, wherein the six peripheral first-hexagonal-unit tubes surround the central first-hexagonal-unit tube in a juxtaposed, hexagonal configuration, further wherein:

each first hexagonal unit comprises first-hexagonal-unit tube sets, wherein each first-hexagonal-unit tube set comprises constituent first-hexagonal-unit tubes, wherein the constituent first-hexagonal-unit tubes comprise a respective first-hexagonal-unit tube of the first-hexagonal-unit tubes and, optionally, one or more internal first-hexagonal-unit tubes wherein each internal first-hexagonal-unit tube is in an entirely immediately nested and concentric configuration with at least one other constituent first-hexagonal-unit tube, further wherein:

each first-hexagonal-unit tube set consists of the respective first-hexagonal-unit tube of the first-hexagonal-unit tubes, further wherein:

the first-hexagonal-unit tubes of each first hexagonal unit have a diameter $D_{in}$ of from 20 μm to 50 μm, a thickness t of from 0.1 μm to 10 μm, and define a gap g of from 0 μm to 10 μm.

15. A foam comprising tubes substantially aligned longitudinally in a first direction, wherein:

each tube defines an outer wall and an inner wall, and each tube comprises an entangled bundle of carbon nanotubes substantially aligned longitudinally in the first direction; and tubes in at least a subset of the tubes are positioned with respect to each other to form one or more first hexagonal units, wherein each first hexagonal unit comprises first-hexagonal-unit tubes, wherein the first-hexagonal-unit tubes comprise six peripheral first-hexagonal-unit tubes and a central first-hexagonal-unit tube, wherein the six peripheral first-hexagonal-unit tubes surround the central first-hexagonal-unit tube in a juxtaposed, hexagonal configuration, further wherein:

each first hexagonal unit comprises first-hexagonal-unit tube sets, wherein each first-hexagonal-unit tube set comprises constituent first-hexagonal-unit tubes, wherein the constituent first-hexagonal-unit tubes comprise a respective first-hexagonal-unit tube of the first-hexagonal-unit tubes and, optionally, one or more internal first-hexagonal-unit tubes wherein each internal first-hexagonal-unit tube is in an entirely immediately nested and concentric configuration with at least one other constituent first-hexagonal-unit tube, further wherein:

the constituent first-hexagonal-unit tubes comprise the respective first-hexagonal-unit tube of the first-hexagonal-unit tubes and the one or more internal first-hexagonal-unit tubes wherein each internal first-hexagonal-unit tube is in the entirely immediately nested and concentric configuration with the at least one other constituent first-hexagonal-unit tube.

16. The foam of claim 15, wherein each first-hexagonal-unit tube set comprises from 2 to 10 constituent first-hexagonal-unit tubes.

17. The foam of claim 15, wherein an innermost constituent first-hexagonal-unit tube in each first-hexagonal tube set has a diameter $D_{innermost}$ of from 20 μm to 50 μm; each constituent first-hexagonal-unit tube in each first-hexagonal tube set has a thickness t of from 0.1 μm to 10 μm; each constituent first-hexagonal-unit tube in each first-hexagonal tube set defines a gap $g_{cc}$ of from of from 0.1 μm to 10 μm; and wherein gaps between neighboring first-hexagonal-unit tube sets are in a range of from of from 0 μm to 10 μm.

18. A method of using an article of manufacture, the method comprising subjecting the article of manufacture to an oblique impact, the article of manufacture comprising a foam comprising tubes substantially aligned longitudinally in a first direction, wherein:

each tube defines an outer wall and an inner wall, and each tube comprises an entangled bundle of carbon nanotubes substantially aligned longitudinally in the first direction; and tubes in at least a subset of the tubes are positioned with respect to each other to form one or more first hexagonal units, wherein each first hexagonal unit comprises first-hexagonal-unit tubes, wherein the first-hexagonal-unit tubes comprise six peripheral first-hexagonal-unit tubes and a central first-hexagonal-unit tube, wherein the six peripheral first-hexagonal-unit tubes surround the central first-hexagonal-unit tube in a juxtaposed, hexagonal configuration, and further wherein:

the article is configured to cover at least a portion of an object and to attenuate an external force acting on the object.

* * * * *